United States Patent
Perry et al.

(10) Patent No.: US 8,712,741 B2
(45) Date of Patent: Apr. 29, 2014

(54) POWER SUPPLY ARCHITECTURE SYSTEM DESIGNER

(75) Inventors: Jeffrey Robert Perry, Cupertino, CA (US); Martin Garrison, San Jose, CA (US); Dien Mac, San Jose, CA (US); Khang Nguyen, Bellevue, WA (US); Ajay Padgaonkar, San Jose, CA (US); Phil Gibson, Sunnyvale, CA (US); Scott Hung, Los Altos, CA (US); Werner Berns, Grasbrunn (DE)

(73) Assignee: National Semiconductor Corporation, Santa Clara, CA (US)

( * ) Notice: Subject to any disclaimer, the term of this patent is extended or adjusted under 35 U.S.C. 154(b) by 281 days.

(21) Appl. No.: 13/169,464

(22) Filed: Jun. 27, 2011

(65) Prior Publication Data

US 2011/0320175 A1 Dec. 29, 2011

Related U.S. Application Data

(60) Provisional application No. 61/359,207, filed on Jun. 28, 2010.

(51) Int. Cl.
*G06F 17/50* (2006.01)

(52) U.S. Cl.
USPC ...... 703/2; 703/5; 703/19; 716/101; 716/102; 716/118; 713/320; 713/324

(58) Field of Classification Search
USPC ............ 703/2, 5, 19; 716/100, 101, 102, 118, 716/119, 132, 138; 713/320, 324
See application file for complete search history.

(56) References Cited

U.S. PATENT DOCUMENTS

| 3,628,004 A | 12/1971 | Claxton |
| 4,546,434 A | 10/1985 | Gioello |

(Continued)

FOREIGN PATENT DOCUMENTS

| EP | 0 302 843 A2 | 2/1989 |
| EP | 0 520 927 A3 | 12/1992 |

(Continued)

OTHER PUBLICATIONS

Deborah L. McGuinness et al. (Jul./Aug. 1998). "An Industrial-Strength Description Logic-Based Configurator Platfom," 1094-7167 *IEEE*,pp, 69-77.

(Continued)

*Primary Examiner* — Thai Phan
(74) *Attorney, Agent, or Firm* — Andrew Viger; Wade J. Brady, III; Frederick J. Telecky, Jr.

(57) ABSTRACT

A system may include a database configured to store information including characteristics of a plurality of components. The system may further include a server in communication with the database and configured to: receive design parameters indicative of a plurality of power supply loads to be powered; determine a plurality of power supply architectures that may be used to provide power supply solutions satisfying the plurality of loads, each power supply architecture including at least one position requiring a component configured to satisfy a load requirement; for each one of at least a subset of the plurality of power supply architectures, determine, based on the characteristics of the plurality of components, at least one component configured to satisfy the corresponding load requirement for each position of the one of the power supply architectures; and generate at least one power supply design in accordance with the power supply architectures and the determined components.

33 Claims, 13 Drawing Sheets

(56) References Cited

U.S. PATENT DOCUMENTS

| | | | |
|---|---|---|---|
| 4,703,423 A | 10/1987 | Bado et al. | |
| 5,138,657 A | 8/1992 | Colton et al. | |
| 5,173,051 A | 12/1992 | May | |
| 5,206,804 A | 4/1993 | Thies | |
| 5,293,479 A | 3/1994 | Quintero et al. | |
| 5,513,116 A | 4/1996 | Buckley | |
| 5,550,746 A | 8/1996 | Jacobs | |
| 5,592,511 A | 1/1997 | Schoen | |
| 5,615,342 A | 3/1997 | Johnson | |
| 5,666,215 A | 9/1997 | Fredlund et al. | |
| 5,708,798 A | 1/1998 | Lynch et al. | |
| 5,745,765 A | 4/1998 | Paseman | |
| 5,751,829 A | 5/1998 | Ringland | |
| 5,825,651 A | 10/1998 | Gupta et al. | |
| 5,838,965 A | 11/1998 | Kavanagh et al. | |
| 5,850,539 A | 12/1998 | Cook | |
| 5,859,414 A | 1/1999 | Grimes et al. | |
| 5,870,719 A | 2/1999 | Maritzen | |
| 5,870,771 A | 2/1999 | Oberg | |
| 5,897,622 A | 4/1999 | Blinn et al. | |
| 5,948,040 A | 9/1999 | DeLorme | |
| 6,038,546 A | 3/2000 | Ferro | |
| 6,052,669 A | 4/2000 | Smith | |
| 6,064,982 A | 5/2000 | Puri | |
| 6,083,267 A | 7/2000 | Motomiya et al. | |
| 6,108,640 A | 8/2000 | Slotznick | |
| 6,125,353 A | 9/2000 | Yagasaki | |
| 6,167,383 A | 12/2000 | Henson | |
| 6,169,992 B1 | 1/2001 | Beall et al. | |
| 6,206,750 B1 | 3/2001 | Barad | |
| 6,215,506 B1 | 4/2001 | Makino | |
| 6,223,094 B1 | 4/2001 | Muehleck | |
| 6,247,128 B1 | 6/2001 | Fisher | |
| 6,275,225 B1 | 8/2001 | Rangarajan | |
| 6,275,869 B1 | 8/2001 | Sieffert | |
| 6,285,986 B1 | 9/2001 | Andrews | |
| 6,295,513 B1 | 9/2001 | Thackston | |
| 6,300,948 B1 | 10/2001 | Gellar et al. | |
| 6,304,855 B1 | 10/2001 | Burke | |
| 6,319,737 B1 | 11/2001 | Putnam et al. | |
| 6,324,534 B1 | 11/2001 | Neal | |
| 6,336,101 B1 | 1/2002 | Dean | |
| 6,353,770 B1 | 3/2002 | Ramsey | |
| 6,360,216 B1 | 3/2002 | Hennessey et al. | |
| 6,370,513 B1 | 4/2002 | Kolawa et al. | |
| 6,414,693 B1 | 7/2002 | Berger | |
| 6,421,612 B1 | 7/2002 | Agrafiotis et al. | |
| 6,437,866 B1 | 8/2002 | Flynn | |
| 6,473,898 B1 | 10/2002 | Waugh | |
| 6,487,713 B1 | 11/2002 | Cohen | |
| 6,530,065 B1 | 3/2003 | McDonald et al. | |
| 6,531,537 B2 | 3/2003 | Friel | |
| 6,535,294 B1 | 3/2003 | Arledge | |
| 6,594,799 B1 | 7/2003 | Robertson et al. | |
| 6,636,837 B1 | 10/2003 | Nardozzi | |
| 6,654,736 B1 | 11/2003 | Ellis et al. | |
| 6,677,160 B1 | 1/2004 | Stockman | |
| 6,735,757 B1 | 5/2004 | Kroening | |
| 6,782,307 B2 | 8/2004 | Wilmott et al. | |
| 6,785,805 B1 | 8/2004 | House et al. | |
| 6,836,752 B2 | 12/2004 | Atasoy | |
| 6,862,563 B1 | 3/2005 | Hakewill | |
| 6,874,146 B1 | 3/2005 | Iyengar | |
| 6,877,033 B1 | 4/2005 | Garrett et al. | |
| 6,882,980 B1 | 4/2005 | Schuller | |
| 6,901,430 B1 | 5/2005 | Smith | |
| 6,937,997 B1 | 8/2005 | Parulski | |
| 6,983,236 B1 | 1/2006 | Karlovac | |
| 6,985,876 B1 | 1/2006 | Lee | |
| 7,003,548 B1 | 2/2006 | Barck et al. | |
| 7,006,985 B1 | 2/2006 | Dean | |
| 7,062,893 B2 | 6/2006 | Lawton | |
| 7,085,729 B1 | 8/2006 | Kennedy | |
| 7,099,731 B2 | 8/2006 | Lopez | |
| 7,105,769 B2 | 9/2006 | Aktas | |
| 7,113,919 B1 | 9/2006 | Norris et al. | |
| 7,136,790 B1 | 11/2006 | Hobbs | |
| 7,191,145 B1 | 3/2007 | Lunetta | |
| 7,233,912 B2 | 6/2007 | Walker | |
| 7,328,171 B2 | 2/2008 | Helot et al. | |
| 2001/0000427 A1 | 4/2001 | Miller | |
| 2001/0042036 A1 | 11/2001 | Sanders | |
| 2002/0004749 A1 | 1/2002 | Froseth et al. | |
| 2002/0055892 A1 | 5/2002 | Brown | |
| 2003/0036087 A1* | 2/2003 | Kaushikkar et al. | 435/6 |
| 2003/0097331 A1 | 5/2003 | Cohen | |
| 2003/0140017 A1 | 7/2003 | Patton | |
| 2004/0030666 A1 | 2/2004 | Marra | |
| 2005/0060197 A1 | 3/2005 | Mayaud | |
| 2006/0253717 A1* | 11/2006 | Fung | 713/300 |
| 2007/0103557 A1 | 5/2007 | Prabhu | |
| 2007/0245165 A1* | 10/2007 | Fung | 713/320 |
| 2007/0294129 A1 | 12/2007 | Froseth | |
| 2009/0235104 A1* | 9/2009 | Fung | 713/324 |
| 2011/0251807 A1* | 10/2011 | Rada et al. | 702/61 |

FOREIGN PATENT DOCUMENTS

| | | |
|---|---|---|
| JP | 2000-020589 | 1/2000 |
| WO | WO 92/08671 | 5/1992 |
| WO | WO 92/17851 | 10/1992 |
| WO | WO 96/02882 | 2/1996 |
| WO | WO 97/15886 | 5/1997 |
| WO | WO 97/43737 | 11/1997 |
| WO | WO 98/15408 | 4/1998 |
| WO | WO 98/15904 | 4/1998 |
| WO | WO 98/37475 | 8/1998 |
| WO | WO 99/28845 | 6/1999 |

OTHER PUBLICATIONS

Jon R. Wright et al. (1993). "A Knowledge-Based Configurator That Supports Sales, Engineering, and Manufacturing at AT&T Network Systems," vol. 14, No. 3, *AI Magazine*, pp. 69-80.

Deborah L. McGuinness at al. (1995). "Description Logic in Practice: A CLASSIC Application," Proceedings of the 14th International Joint Conference on Artificial Intelligence. Archived Web page http://web.archlve.org/web/19971114095933/http://www.research.att.com/sw/tools/classic/papers/jcai-video.ps, providing an extended version at least as early as Nov. 1997. A declaration from Christopher Butler authenticating the archived document is included.

AT&T 365-301-004 "DACS IV Digital Access and Crossconnect System IV," Issue 1, Jun. 1989.

U.S. Appl. No. 60/181,282 to Froseth, filed Feb. 9, 2000.

"Comparing the High Speed Comparators," *National Semiconductor Application Note 87*, Interface Development Group, Jun. 1973 (copyright 1999) (published Feb. 24, 1999), Archived web page http://web.archive.org/web/19991111033822/www.national.com/apnotes/Analog-Comparators_v2.html. A declaration from Christopher Butler authenticating the archived document is included.

"Product Folder LM161". Archived web page http:/web.archive.org/web/19991010013450/http://www.national.com/pf/LM/LM161.html available at least as early as Oct. 1999. A declaration from Christopher Butler authenticating the archived document is included.

"Product Folder 100314". Archived web page http://web.archive.org/web/19990129052202/http://www.national.com/pf/10/100314.html available at least as early as Jan. 1999. A declaration from Christopher Butler authenticating the archived document is included.

Phil Frame (Sep. 17, 1990). "GM Upshifting to Electronics," *Automotive News*, Crain Communications, Inc. 3 pages.

Coutinho et al. (Sep. 13-18, 1998). "Active Catalogs: Integrated Support for Component Engineering," Proceedings of DETC98: 1998 ASME Design Engineering Technical Conference, Atlanta, GA, DETC98/CIE-5521. 9 pages.

Danish et al. (1998) Building Database-Driven Web Catalogs McGraw-Hill. 9 pages.

Nikkei English News (Sep. 17, 1987). "Frontier Kojiro Offers Custom-made PC Kits," 1 page.

"Frontier" archived web pages, available at least as early as Feb. 4, 1999;  (<http:/web.archive.org/web/19981203111515/www.urban.

(56) References Cited

OTHER PUBLICATIONS ne.jp/home/frontier/index.html> <http://web.archive.org/web/1990204024640/www.urban.ne.jp/home/frontier/product/custom/c_kil.html> <http://web.archive.org/web/19990204050917/www.urban.ne.jp/home/frontier/product/custom/c_kit_p5a.html> <http://web.archive.org/web/19990204022165/www.urban.ne.jp/home/frontier/support/motherboard/p5a.html> <http://web.archive.org/web/19990202203220/www.urban.ne.jp/home/frontier/buy.html > <http://web.archive.org/web/19990203005704/www.urban.ne.jp/home/frontier/buy/purchase/purchase.html>). pp. 1-18 (English translation, pp. 20-78). A declaration from Christopher Buller authenticating the archived document (labeled as A1) is provided in NPL No. 9.
"Antique" archived web pages, available at least as early as Mar. 1999: (<http://web.archive.org/web/19990203120130/www.acautos.com/home.html> <http://web.archive.org/web/19990202230012/www.acautos.com/427cobra.html> <http://web.archive.org/web/19990202231632/www.acautos.com/427cobraoptions.html> <http://web.archive.org/web/19990302040225/www.acautos.com/manual.html>). 12 pages. A declaration from Christopher Butler authenticating the archived document (labeled as A2) is provided in NPL No. 9.
"CSG" archived web pages, available at least as early as Nov. 1999: (<http://web.archive.org/web/19990429163122/www.csg2000.com/default.asp> <http://web.archive.org/web/19991128083916/www.csg2000.com/Equipment/amdbere.asp>). 3 pages. A declaration from Christopher Butler authenticating the archived document (labeled as A3) is provided in NPL No. 9.
"Cooking" archived web pages,.available at least as early as Dec. 1999: (<http://web.archive.org/web/19990210110820/www.cooking.com/products/> <http://web.archive.org/web/19990830161517/www.cooking.com/products/shbrowre.as p?cat=sf> <http://web.archive.org/web/19991130165751/www.cooking.com/products/shprodll.asp?DepINo=8000&ClassNo=0830> <http://web.archive.org/web/19991204090519/www.cooking.com/products/shprodde.asp?SKU=105559> < http://web.archive.org/web/19990921224423/www.cooking.com/products/gastance.asp> <http://web.archive.org/web/19991016233610/www.cooking.com/products/shwelcom.asp>). 11 pages. A declaration from Christopher Buller authenticating the archived document (labeled as A4) is provided in NPL No. 9.
A declaration dated Jul. 13, 2010, from Christopher Butler authenticating "Frontier" (NPL No. 5), "Antique" (NPL No. 6), "CSG" (NPL No. 7), and "Cooking" (NPL No. 8) as archived documents.
U.S. Appl. No. 60/179,057, filed Jan. 31, 2000, Wilmott et al.
U.S. Appl. No. 60/181,282, filed Feb. 9, 2000, Froseth et al.
U.S. Appl. No. 60/191,878, filed Mar. 23, 2000, Wilmott et al.
U.S. Appl. No. 60/216,847, filed Jul. 7, 2000, Wilmott et al.
"GetPlastic.com Opens First E-Market to Help Plastics Processors Procure High-Performance Resins, Create Custom Compounds," PR Newswire, Jun. 13, 2000, No. 11483828, 3 pages.
"LNP Introduces Web-Based Data," Flame Retardancy News, Oct. 1999, 9(10), No. 06783318, 2 pages.
"Need2Buy Releases 'Next Generation' E-Procurement Solution for Electronic Components Industry," Business Wire, Mar. 20, 2001, 3 pages.
Author Unknown, "Artesyn Technologies presents . . . E-Tools for Successfully Selling DCIDC Converters," NetSeminar Overview, 1999, 1 page.
Author Unknown, "National Semiconductor Corporation presents . . . Design Your Power Supply On Line at Power.National.Com," NetSeminar Overview, 2000, 2 pages.
Author Unknown, "25$^{th}$ Annual Product of the Year Awards," National Electronic Products, Mar. 15, 2004, 30 pages.
Author Unknown, "ADI- Car Alarms and other Security Systems," Mar. 15, 2004, 1 page.
Author Unknown, "ADI- Three Phase Trivector Energy Meter," Mar. 15, 2004, 1 page.
Author Unknown, "ADI Weigh Scale," Mar. 15, 2004, 1 page.
Author Unknown, "ADI-Audio Solutions," Mar. 15, 2004, p. 1.

Author Unknown, "ADI-Communications and Telephony Solutions," Mar. 15, 2004, 2 pages.
Author Unknown, "ADI-Development Tools and Evaluation Kits," Mar. 15, 2004, 6 pages.
Author Unknown, "ADI-Digital Potentiometers," Mar. 15, 2004, 3 pages.
Author Unknown, "ADI-iMEMS: Integrated Micro Electro Mechanical Acceleration Sensors," Mar. 15, 2004, 1 page.
Author Unknown, "ADI-Instrumentation Amplifier Selection Guide," Mar. 15, 2004, 4 pages.
Author Unknown, "ADI-Interface Products Selection Guide," Mar. 15, 2004, 4 pages.
Author Unknown, "ADI-Low-Power Digital-to-Analog Converters," Mar. 15, 2004, 4 pages.
Author Unknown, "ADI-Major Product Markets & Applications," Mar. 15, 2004, 1 page.
Author Unknown, "ADI-Motor Control," Mar. 15, 2004, 1 page.
Author Unknown, "ADI-Products and Datasheets," Mar. 15, 2004, 1 page.
Author Unknown, "ADI-Products and Datasheets: Selection Guides," Mar. 15, 2004, 1 page.
Author Unknown, "ADI-Signal Chains," Mar. 15, 2004, 2 pages.
Author Unknown, "ADI-Technical Support," Mar. 15, 2004, 1 page.
Author Unknown, Maxim Data Sheets, Mar. 15, 2004, 1 page.
Author Unknown, "Maxim Home Page, On-Line Technical Queries," Mar. 15, 2004, 1 page.
Author Unknown, "Maxim Max2680, Max2681, Max2682," Mar. 15, 2004, 2 pages.
Author Unknown, "Maxim Products," Mar. 15, 2004, 1 page.
Author Unknown, "Maxim Search Data Sheets," Mar. 15, 2004, 1 page.
Author Unknown, "Maxim Video Buffers," Mar. 15, 2004, 2 pages.
Author Unknown, "Maxim's Parametric Search," Mar. 15, 2004, 3 pages.
Author Unknown, "Section 1, System Overview and Benefits," AT&T, Jun. 1989, Issue 1, 43 pages.
BatchMaster eWorkplace Solutions, http://www.batchmaster,com, downloaded Feb. 27, 2001, 14 pages.
Frame, P., "GM Upshifting to Electronics," Automotive News, Sep. 17, 1990, Crain Communications, Inc., 3 pages.
Gregg, "Web Power Cuts Design Time," Transim Press, Electronics Weekly, Nov. 10, 1999, 1 page.
Hillier, T et al., "Laboratory Module," eWorkplace Solutions, Feb. 2000, 2 pages.
In the United States Patent and Trademark Office, U.S. Appl. No. 09/643,841: Non-Final Office Action, mailed Sep. 23, 2003.
In the United States Patent and Trademark Office, U.S. Appl. No. 09/643,841: Final Office Action, mailed Jun. 8, 2004.
In the United States Patent and Trademark Office, U.S. Appl. No. 09/643,841: Non-Final Office Action, mailed Dec. 30, 2004.
In the United States Patent and Trademark Office, U.S. Appl. No. 09/643,841: Final Office Action, mailed Jul. 28, 2005.
In the United States Patent and Trademark Office, U.S. Appl. No. 09/643,841: Notice of Allowance, mailed Mar. 20, 2006.
National Semiconductor Corporation, "National Semiconductor Corporation's Web Site Reaches Finalist Round in Second Annual NII Awards Program," National Semidconductor: The Sight & Sound of In formation, News Release, http://www.national.com/news/item/1996/9611/int96001.html, 1996, 2 pages.
National Semiconductor Corporation, "National Semiconductor Extends Simple Switcher DC/DC Converter Family for High-Voltage Applications," National Semidconductor: The Sight & Sound of In formation, News Release, http://www.national.com/news/item/0,1735.640.00.html, 2001, 2 pages.
National Semiconductor Corporation, "National Semiconductor Introduces WEBENCH 3.0, the Industry's Most Advanced Internet-Based Design, Prototyping, and Overnight Delivery Environment," National Semidconductor: The Sight & Sound of Information, News Release, http://www.national.com/news/item/0,1735,693.00.html, Nov. 5, 2001, 3 pages.
National Semiconductor Corporation, "National Semiconductor Redesigns Web Site to Reduce 'Time-to-Decision' for Engineers,"

(56) References Cited

OTHER PUBLICATIONS

National Semidconductor: News Release, http://www.national.com/news/1997/9703/web2.html, 1997, 3 pages.
National Semiconductor Corporation, "National Semiconductor Wins'1999 CIO Web Business 50/50' Award for Online Business Excellence," National Semiconductor: The Sight & Sound of Information, News Release, http://www.national.com/news/item/0,1735,397,00.html, 1999, 2 pages.
National Semiconductor Corporation, "National Semiconductor Wins 'Business on the Internet'—BOTI—Award for Best Extranet Application; Achieves Recognition for Saving Customers Time," National Semidconductor: The Sight & Sound of Information, News Release, http://www.national.com/news/item/0,1735,18,00.html, 1998, 2 pages.
National Semiconductor Corporation, "National Semiconductor's MacPhyter 10/100 Ethernet Controller Captures Top Retail Adapter Design Win in Fast Ethernet Market," National Semidconductor: The Sight & Sound of Information, News Release, http://web.archive.org/web/2000303204552/www.national.com/news/item/0,1735,432,00.html, 1999, 3 pages.
National Semiconductor Corporation, "National Semiconductor's New 1.3 MHz Simple Switcher Family Delivers High Performance and Power Density With Easy-to-Use Design Tools," National Semidconductor: The Sight & Sound of Information, News Release, http://www.national.com/news/item/O,I735,686,00.html, 2001, 2 pages.
National Semiconductor Corporation, "NEC Uses National Semiconductor Two-Chip Solution in World's First Bluetooth Enabled Notebook PCs with Built-In Antenna Shown at Cebit," National Semidconductor: The Sight & Sound of Information, News Release, http://web.archive.org/web/0000408155328/www.national.com/news/item/0,1735,473.00.html, 2000, 3 pages.
National Semiconductor Corporation, "Space-Saver Simple Switcher ® Power Converters from National Semiconductor Offer Guaranteed 1A and 3A Performance," National Semidconductor: News Release, http://www.national.com/news/1996/9605/a96001pm.html , 1996,2 pages.
National Semiconductor Corporation, "National Semiconductor Announces the Market's Most Integrated Digital Cordless Phone Solution for the 900MHZ and 2.4GHZ ISM Bands," National Semidconductor: The Sight & Sound of Information, News Release, http://web.archive.org/web/20001058214107/www.national.com/news/item/0,I753,518.00.html , 2000, 3 pages.
National Semiconductor Corporation, "National Semiconductor Introduces Power.National.Com—First Advanced Online Design Solution for Analog Engineers," National Semidconductor: The Sight & Sound of Information, News Release, Oct. 25, 1999, 3 pages.
National Semiconductor Corporation, "National Semiconductor Wins 'Outstanding Web Site' Award for Corporate Web Site Excellence," National Semidconductor: The Sight & Sound of Information,.News Release, http://www.national.com/news/item/0,1735,342,00.html, 1998, 2 pages.
National Semiconductor Corporation, "National Semicondutor's WEBENCH ® Online Design Tool Named 'Innovation of the Year,'" National Semidconductor: The Sight & Sound of Information, News Release, http://www.national.com/news/item/0,1735,744,00.html, 2002, 2 pages.
National Semiconductor Corporation, "NEC Uses National Semiconductor Two-Chip Solution in World's First Bluetooth Enabled Notebook PC with Built-in Antenna Shown at Cebit," National Semidconductor: News Release, http://web.archive.org/web/0000408155328/www.national.com/news/item/0,I735,473,00.html, 2000, 3 pages.
National Semiconductor, "Power.National.Com: Design Software for Simple Switcher DC-DC Converters," National Semidconductor: The Sight & Sound of Information, News Release, 2000, http://web.archive.org/web/20000901232837/www.national.com/appInfo/power/0,1768,383,00.html, 2 pages.

Penton Media, Inc., "Free Web-Based Tools Simulate PLLs and Power Cicuits," eepn, http://www.eepn.com/locator/Products/ArticleID/22705/22705.html, 2000, 2 pages.
Perry et al., "Design Your Power Supply on Line at Power.National.Com," National Semiconductor Corporation, Jul. 11, 2000, 2 pages.
Schweber, B., "Tools put supply-design resource at your fingertips," EDN.com, http://www.edn.com/index.asp?layout=articlePrint&articleID=CA46439, 1999, 1 page.
Staff, National Unveils WEBBENCH 2.0, ECN, http://www.ecnmag.com/index.asp?layout=articlePrint&articleID=CA56103 2000, 1 page.
Wright, J. R. et al., "A Knowledge-Based Configurator That Supports Sales, Engineering, and Manufacturing at AT&T Network Systems," AI Magazine, Fall 1993, 14(3), 69-80.
Interface Development Group, "Comparing the High Speed Comparators," National Semiconductor Application Note 87, http://web.archive.org.web/19991111033822/www.national.com/apnotes/Analog-Comparators_v2.html , Jun. 1973 (Includes Affidavit of Christopher Butler), 14 pages.
Internet World Magazine, "Voltage Goes Virtual," e-business, http://iw.com/magazine.php?inc=030100/3.01,ebusiness.html, 2000, 3 pages.
McGuinness D. L. et al. "Description Logic in Practice: A CLASSIC Application" Available on-line at least as early as Nov. 1997, See, e.g., http://web.archive.org/web/19971114095933/http://www.research.att.co/sw/tools/classic/papers/ijcai-video.ps. McGuinness '97 is an extended version of "Description Logic in Practice: A Classic Application," *Proceedings of the 14th International Joint Conference on Artificial Intelligence* (1995), (Includes Affidavit of Christopher Butler), 10 pages.
McGuinness, D. L. et al., "An Industrial-Strength Description Logic-Based Configurator Platform," IEEE, Jul./Aug. 1998, 69-77.
Morrison, G., "National Power ICs Take to the Internet," EDN.com, http://www.edn.com/index.asp?layout=articlePrint&articleID=CA48127, 1999, 2 pages.
National P/N 100314—"Low Power Quint Differential Line Receiver", http://web.archive.org/web/19990129052202/http://www.national.com/pf/10/100314.html National Semiconductor, available at least as early as Jan. 1999, (includes Affidavit of Christopher Butler), 5 pages.
National P/N LM161—"High Speed Differential Comparator", http://web.archive.org/web/19991010013450/http://www.national.com/pf/LM/LM161.html National Semiconductor, available at least as early as Oct. 1999, (Includes Affidavit of Christopher Butler), 5 pages.
National Semiconductor Company, "Webench™ , 2000," No Month Available, 2000, 2 pages.
National Semiconductor Corporation, "Models & Software," http://web.archive.org/web/1998/www.national.com/models, 1 page.
National Semiconductor Corporation, "National Expands Simple Switcher(REG) Family with Two New 5A Flyback Power Converters," National Semiconductor: The Sight & Sound of Information, News Release, http://www.national.com/news/1995/9509/a95003pm.html, 1995 , 2 pages.
"A/D Converters," Maxim Integrated Products, downloaded Jun. 1, 2009, 3 pages, http://web.archive.org/web/19991009030358/www.maxim-ic.com/Saqqara.htm.
"ADI—Industry Solutions: Technologies / Applications," 1995-2000, Analog Devices, Inc, 2 pages, http://web.archive.org/web/20000302091639/www.analog.com/industry/Industry_Solutions.html.
"ADI—Measurement & Control Systems," Analog Devices, Inc., 1995-2000, 1 page, http://web.archive.org/web/20000901051423/www.analog.com/industry/signal_chains/auto/industrial/ind_14.html.
"ADI—Measurement & Control Systems," Analog Devices, Inc., 1995-1999, 1 page, http://web.archive.org/web/19990508143405/www.analog.com/industry/signal_chains/auto/industrial/ind_14.html.
"ADI—Typical ATE Signal Chain," Analog Devices, Inc., 1995-1999, 1 page, http://web.archive.org/web/19991006022217/www.analog.com/industry/signal_chains/auto/instrumentation/inst_4.html.

(56) References Cited

OTHER PUBLICATIONS

"ADI—Typical ATE Signal Chain," Analog Devices, Inc., 1995-2000, 1 page, http://web.archive.org/web/20000901051522/www.analog.com/industry/signal_chains/auto/instrumentation/inst_4.html.
"ADI—ADSL," Analog Devices, Inc., 1995-2000, 1 page, http://web.archive.org/web/20000606154943/www.analog.com/industry/signal_chains/auto/communications/comms_1.html.
"ADI-ADSL," Analog Devices, Inc., 1995-1999, 1 page, http://web.archive.org/web/19990508131527/www.analog.com/industry/signal_chains/auto/communications/comms_1.html.
"ADI-Digital Still Camera," Analog Devices, Inc., 1995-2000, 1 page, http://web.archive.org/web/20000303235546/www.analog.com/industry/signal_chains/auto/consumer/cons_2.html.
"ADI-Industry Solutions," Analog Devices, Inc., 1995-1999, 1 page, http://web.archive.org/web/19990417141144/www.analog.com/industry/Industry_Solutions.html.
"ADI-Wireless Infrastructure: IF Sampling Diversity Receiver," Analog Devices, Inc., 1995-2000, 1 page, http://web.archive.org/web/20000510010949/www.analog.com/industry/signal_chains/auto/communications/comms_2.html.
"Advanced Search," "Advanced Search," Autobytel Inc., 1999-2006, 2 pages, http://web.archive.org/web/20060521232750/www.autobytel.com/content/research/Decision/index.cfm.
"Advanced Search," Autobytel Inc., 1999-2006, 2 pages, http://web.archive.org/web/20060527191852/www.autobytel.com/content/Research/Decision/index.cfm.
"Analog Devices brings Audio Solutions . . . to the Studio and the Home," Analog Devices, Inc., 1995-2000, 1 page, http://web.archive.org/web/20000817161010/www.analog.com/industry/audio/.
"Analog Devices," Analog Devices, Inc., 1995-1999, 1 page, http://web.archive.org/web/19990429060150/http:/www.analog.com/index.html.
"Analog Devices," Analog Devices, Inc., 1995-1999, 1 page, http://web.archive.org/web/19991104153958/http:/www.analog.com/index.html.
"Analog Devices: Today's Headlines," Analog Devices, Inc., 1995-1999, 1 page, http://web.archive.org/web/19990429060150/http:/www.analog.com/index.html.
"Analog Devices' Audio Products Portfolio," Analog Devices, Inc., 1995-2000, 3 pages, http://web.archive.org/web/20000901075854/www.analog.com/industry/audio/product_portfolio.html.
"Analog Search Engine," Analog Devices, Inc., 1995-1999, 1 page, http://web.archive.org/web/19990429132810/www.analog.com/misc/simple_search.html.
"Analog, Mixed Signal, RF, and Fiber ICs From DC to GHz," Maxim Integrated Products, 2000, 2 pages, http://web.archive.org/web/20000511114513/http:/www.maxim-ic.com/.
"Analog, Mixed Signal, RF, and Fiber ICs From DC to GHz," Maxim Integrated Products, 2000, 2 pages, http://web.archive.org/web/20000303050821/http:/www.maxim-ic.com/.
"Analog-to-Digital Converters," Maxim Integrated Products, 2001, 1 page, http://web.archive.org/web/20010606235321/para.maxim-ic.com/ADConverters.asp.
"Applications Active Matrix," Texas Instruments Incorporated, 1999, 1 page, http://web.archive.org/web/19990508044944/www.ti.com/sc/docs/apps/index.htm.
"Automotive Application Resources by Application," Texas Instruments Incorporated, 2000, 1 page, http://web.archive.org/web/20000414075551/www.ti.com/sc/docs/apps/automotive/automotive.html.
"Automotive Block Diagrams," Texas Instruments Incorporated, 2000, 1 page, http://web.archive.org/web/20000526020637/www.ti.com/sc/docs/apps/automotive/blkdiag.html.
"Automotive: Car Multi-Media," Texas Instruments Incorporated, 2000, 2 pages, http://web.archive.org/web/20000711080234/www.ti.com/sc/docs/apps/automotive/car_multi_media.html.
"Automotive: Car Radio," Texas Instruments Incorporated, 2000, 2 pages, http://web.archive.org/web/20000818083834/www.ti.com/sc/docs/apps/automotive/car_radio.html.

"Buffer Amplifiers for Pagers," Maxim Integrated Products, 2001, 1 page, http://web.archive.org/web/20010620102819/www.maxim-ic.com/DesignApps/EndEquipment/Pagers/BufferAmp.htm.
"Car Multi Media System—Codecs," Texas Instruments Incorporated, 2000, 1 page, http://web.archive.org/web/20000818133609/www.ti.com/sc/docs/psheets/diagrams/subsys/cmms_cdc.htm.
"Car Multi Media System—Video Decoder," Texas Instruments Incorporated, 2001, 1 page, http://web.archive.org/web/20010629145154/www.tl.com/sc/docs/psheets/diagrams/subsys/cmmsdcdr.htm.
"Car Prices and Research," Autobytel Inc.,1999-2006, 2 pages, http://web.archive.org/web/20060518135120/www.autobytel.com/content/resources/researchindex.cfm?id=abt&fuseaction=MakeList.
"Car Radio—ADC/DAC," Texas Instruments Incorporated, 2000, 1 page, http://web.archive.org/web/20000818133701/www.ti.com/sc/docs/psheets/diagrams/subsys/car_adc.htm.
"Car Radio—Power Amp," Texas Instruments Incorporated, 2000, 1 page, http://web.archive.org/web/20000818133655/www.ti.com/sc/docs/psheets/diagrams/subsys/car_pamp.htm.
"Category Tree," Analog Devices, Inc., 1995-2000, 1 page, http://web.archive.org/web/20000303055418/products.analog.com/products_html/list_gen_category_tree.html.
"Chevrolet Malibu," Autobytel.com, downloaded Jun. 1, 2009, 1 page, http://web.archive.org/web/20000602161656/www.autobytel.com/content/RBPath/selectSeries.cfm?id=abt&newUsed=new&make_vch=Chevrolet&postal_code_vch=&model_vch=Malibu&searchType=cat&sction=home&getAllSeries=&category=PASS&categoryName=Passenger+Car.
"Choose a Product Index: Communications Products," Analog Devices Inc., 1995-2000, 2 page, http://web.archive.org/web/20000308041518/products.analog.com/products_html/list_gen_36_2_1.html.
"Comparators: Step Search Selector," Saqqara Systems, Inc., downloaded Jun. 1, 2009, 2 pages, http://web.archive.org/web/19990202080117/209.1.238.248/scripts/cSelector.exe/comparators2/.
"Contact Maxim: On-Line Technical Queries,", Maxim Integrated Products, 1999, 1 page, http://web.archive.org/web/19991012153147/http:/maxim-ic.com/.
"Data Sheets," http://web.archive.org/web/19991013030248/maxim-ic.com/Datasheets.htm, 1 page, downloaded Jun. 1, 2009.
"Delivering Designs in Internet Time," National Semiconductor Corporation, Oct. 27, 1999, 41 pages.
"Display Power for Digital Cameras," Maxim Integrated Products, 2000, 1 page, http://web.archive.org/web/20000830123009/www.maxim-ic.com/DesignApps/EndEquipment/Digital/DisplayPower.htm.
"Display Power for Pagers," Maxim Integrated Products, 2000, 1 page, http://web.archive.org/web/20000830124354/www.maxim-ic.com/DesignApps/EndEquipment/Pagers/DisplayPower.htm.
"Downconverter, Demodulator, Receiver for Pagers," Maxim Integrated Products, 2000, 1 page, http://web.archive.org/web/20000830124201/www.maxim-ic.com/DesignApps/EndEquipment/Pagers/DwnConverter.htm.
"Easy PLL—Part Selector (Final)," National Semiconductor Corporation, downloaded May 27, 2009, 1 page, http://web.archive.org/web/20000901044000/www.national.com/appinfo/wireless/EasyPLL/easypll.cgi.
"Experience the Communications Breakthrough with Analog Devices," Analog Devices, Inc., 1995-2000, 1 page, http://web.archive.org/web/20000815214109/www.analog.com/industry/communications/.
"High Speed Amplifiers," Analog Devices, Inc., 1995-2000, 3 pages, http://web.archive.org/web/20000831045850/www.analog.com/support/standard_linear/selection_guides/chart.html.
"Information Appliances," National Semiconductor Corporation, downloaded May 27, 2009, 2 pages, http://web.archive.org/web/20000815214228/www.national.com/appinfo/solutions/.
"Information Appliances; IA Technology," National Semiconductor Corporation, downloaded May 27, 2009, 2 pages, http://web.archive.org/web/20000816235911/www.national.com/appinfo/solutions/0,2062,398,00.html.

(56) References Cited

OTHER PUBLICATIONS

"Interface Products Selection Guide," Analog Devices, Inc., 1995-1999, 4 pages, http://web.archive.org/web/19990508220544/www.analog.com/support/standard_linear/selection_guides/interface.html.
"Maxim Master Product Tree," Maxim Integrated Products, 2000, 2 pages, http://web.archive.org/web/20000817053442/para.maxim-ic.com/.
"Melody Lucasfilm THX Processor: Multichannel Audio-Post Processing Reference Design," Analog Devices, Inc., 1995-2009, 3 pages, http://web.archive.org/web/20011120160550/www.analog.com/pdf/briefs/html/thx_dec.html.
"Models and Software: Design Software for Simple Switcher DC-DC Converters," National Semiconductor Corporation, downloaded May 27, 2009, pp. 1-3, http://web.archive.org/web/20000301132222/www.national.com/sw/SimpleSwitcher/0,1619,0,00.html.
"Modern Times" National Semiconductor Corporation, 1995, 26 pages.
"National Semiconductor Product Catalog: Deflection—TimeBase(2)," National Semiconductor Corporation, downloaded May 27, 2009, 1 page, http://web.archive.org/web/19990203212907/www.national.com/catalog/AnalogDisplayCircuits_MonitorsCRT_DeflectionTimeBase.html.
"National Semiconductor Products Catalog: National Semiconductor Products," National Semiconductor Corporation, downloaded May 27, 2009, 2 pages, http://web.archive.org/web/20001110050900/www.national.com/catalog/.
"National Semiconductor," National Semiconductor Corporation, downloaded May 27, 2009, 1 page, http://web.archive.org/web/19991105212204/http://www.national.com/index.html.
"National Semiconductor: Sign on," National Semiconductor Corporation, downloaded May 27, 2009, 1 page, http://web.archive.org/web/19991105212204/http:/www.national.com/index.html.
"National Welcomes You," National Semiconductor Corporation, 2000, downloaded May 27, 2009, 1 page, http://web.archive.org/web/20000815063130/http:/www.national.com/.
"National Welcomes You," National Semiconductor Corporation, downloaded May 27, 2009, 1 page, http://web.archive.org/web/20000511020107/www.national.com/.
"New Car Buyer's Guide," Autobytel Inc., 1999-2006, 2 pages, http://web.archive.org/web/20060521233212/www.autobytel.com/content/research/buyersguide/index.cfm.
"New Car Purchase Center," Autobytel.com, downloaded Jun. 1, 2009, 1 page, http://web.archive.org/web/20000408144256/www.autobytel.com/content/buy/NewIndex.cfm?id=abt.
"Parametric Product Catalog," National Semiconductor Corporation, downloaded May 27, 2009, 2 pages, http://web.archive.org/web/19991004171048/www.national.com/catalog/.
"Parametric Product Catalog: Analog Display Circuits," National Semiconductor Corporation, downloaded May 27, 2009, 1 page, http://web.archive.org/web/19991006161509/www.national.com/catalog/AnalogDisplayCircuits.html.
"Parametric Product Catalog: LCD(3)," National Semiconductor Corporation, downloaded May 27, 2009, 1 page, http://web.archive.org/web/19991006181750/www.national.com/catalog/AnalogDisplayCircuits_GeneralPurposeDisplaysDrivers_LCD.html.
"Parametric Product Catalog: Logic," National Semiconductor Corporation, downloaded May 27, 2009, 1 page, http://web.archive.org/web/19991018211856/www.national.com/catalog/MilltaryAerospace.html.
"Parametric Product Catalog: National Semiconductor Products," National Semiconductor Corporation, downloaded May 27, 2009, 1 page, http://web.archive.org/web/19991004171048/www.national.com/catalog/.
"Parametric Product Catalog: Wireless Communications(25)," National Semiconductor Corporation, downloaded May 27, 2009, 1 page, http://web.archive.org/web/19991009103320/www.national.com/catalog/WirelessCommunications.html.

"Parametric Search," Maxim Integrated Products, 2000, 2 pages, http://webarchive.org/web/20000302042105/www.maxim-ic.com/MaximProducts/para.htm.
"Parametric Table for FCT—Advanced Search," National Semiconductor Corporation, 2000, downloaded May 27, 2009, 2 pages.
"Parametric Table for FCT," National Semiconductor Corporation, 2000, downloaded May 27, 2009, 2 page, http://web.archive.org/web/20001027104843/www.national.com/parametric/0,1850,2128,00.html.
"Parametric Table: LCD," National Semiconductor Corporation, downloaded May 27, 2009, 1 page, http://webarchive.org/web/20000229152650/www.national.com/parametric/0,1850,970,00.html.
"Parametric Table: LVDC Display Interface (OpenLDI)," National Semiconductor Corporation, downloaded May 27, 2009, 1 page, http://web.archive.org/web/20000303154720/www.national.com/parametric/0,1850,2703,00.html.
"Parametric Table: Single PLLs," National Semiconductor Corporation, downloaded May 27, 2009, 1 page, http://web.archive.org/web/20000302194152/www.national.com/parametric/0,1850,1951,00.html.
"Passenger Car," Autobytel.com, downloaded Jun. 1, 2009, 2 pages, http://web.archive.org/web/20000510131235/www.autobytel.com/content/RBPAth/selectModel.cfm?id=abt&searchType=cat&fromHomePage=yes&category=PASS&categoryName=Passenger+Car&newUsed=new.
"Please select a voltage for the device 'LM2676':" National Semiconductor Corporation, downloaded May 13, 2009, 1 page.
"Power-Webench Page Welcome to your Power Webench™ I," National Semiconductor Corporation, downloaded May 27, 2009, 1 page, http://web.archive.org/web/20000817172405/www.national.com/appinfo/power/webench/.
"Pricing and Research," Autobytel.com, downloaded Jun. 1, 2009, 1 page, http://web.archive.org/web/20000409000806/www.autobytel.com/content/resources/researchindex.cfm?id=abt&fuseaction=CatList.
"Product Center," Analog Devices, Inc., 1995-1999, 1 page, http://web.archive.org/web/19990427014038/www.analog.com/product/Product_Center.html.
"Product Folder: 54FCT138," National Semiconductor Corporation, downloaded May 27, 2009, 2 pages, http://web.archive.org/web/20001006175007/www.national.com/pf/54/54FCT138.html.
"Product Folder: LMX1501A," National Semiconductor Corporation, downloaded May 27, 2009, 3 pages, http://web.archive.org/web/20000303083553/www.national.com/pf/LM/LMX1501A.html.
"Product Folder: LMX2325," National Semiconductor Corporation, downloaded May 27, 2009, 3 pages, http://web.archive.org/web/20000304075734/www.national.com/pf/LM/LMX2325.html.
"Product Index: Audio, Microphone Pre-Amplifiers," Analog Devices, Inc., 1995-2000, 1 page, http://web.archive.org/web/20000418175330/products.analog.com/products_html/list_gen_181_2_1.html.
"Product Index: Communications Products, Cable Modem/CATV," 1995-2000, 1 page, http://web.archive.org/web/20000709033436/products.analog.com/products_html/list_gen_242_2_2_1.html.
"Product Index: Sensors & Signal Con, Accelerometers," Analog Devices, 1995-2000, 1 page, http://web.archive.org/web/20000304053953/products.analog.com/products_html/list_gen_121_2_1.html.
"Product Index: System Solutions, Algorithm Solutions," Analog Devices, Inc., 1995-2000, 2 pages, http://web.archive.org/web/20000516154457/products.analog.com/products_html/list_gen_202_2_2_1.html.
"Product Index: System Solutions, Audio Solutions," Analog Devices, Inc., 1995-2000, 1 page, http://web.archive.org/web/20000408200823/products.analog.com/products_html/list_gen_200_2_1.html.
"Product Index: System Solutions, Comms/Telephony Solutions," Analog Devices, Inc., 1995-2000, 1 page, http://web.archive.org/web/20000523100647/products.analog.com/products_html/list_gen_204_2_1.html.

(56) References Cited

OTHER PUBLICATIONS

"Product Index: System Solutions, Energy Meter Solutions," Analog Devices, Inc, 1995-2000, 1 page, http://web.archive.org/web/20000517020015/products.analog.com/products_html/list_gen_203_2_1.html.
"Product Index: System Solutions, GPS Solutions," Analog Devices, Inc., 1995-2000, 1 page, http://web.archive.org/web/20000523094528/products.analog.com/products_html/list_gen_205_2_1.html.
"Product Index: Systems Solutions, Video Conferencing," Analog Devices, Inc., 1995-2000, 1 page, http://web.archive.org/web/20000302200630/products.analog.com/products_html/list_gen_201_2_1.html.
"Products & Databases Parametric Search: Using ADI's Parametric Search," Analog Devices, Inc., downloaded May 27, 2009, 1 page, http://web.archive.org/web/20000304142419/catalog.analog.com/.
"Products & Databases," Analog Devices, Inc., 1995-2000, 1 page, http://web.archive.org/web/20000302135136/www.analog.com/product/Product_Center.html.
"Products and Information," Maxim Integrated Products, downloaded Jun. 1, 2009, 1 page, http://web.archive.org/web/19991013102332/maxim-ic.com/Products.htm.
"Products Overview," Texas Instruments Incorporated, 1999, 1 page, http://web.archive.org/web/19990508055810/www.ti.com/sc/docs/products/prodover.htm.
"Selection Guides," Analog Devices, Inc., 1995-1999, 1 page, http://web.archive.org/web/19990508192623/www.analog.com/product/selection_guides.html.
"Selection Guides," Analog Devices, Inc., downloaded May 28, 2009, 4 pages, http://web.archive.org/web/20010517130348/www.analog.com/product/selection_guides.html.
"Semiconductors," Texas Instruments Incorporated, 1999, 1 page, http://web.archive.org/web/19990427224930/www.ti.com/sc/docs/schome.htm.
"Sigma Delta Digital-To-Analog Converter Selection Guide," Analog Devices, Inc., 1995-2000, 2 pages, http://web.archive.org/web/20001014132954/www.analog.com/industry/audio/seletion_guide.html.
"Signal Chain Solutions," Analog Devices, Inc., 1995-2000, 1 page, http://web.archive.org/web/20000901075811/www.analog.com/industry/communications/wireless/wireless_chain.html.
"Simple Switchers Converters and More," National Semiconductor Corporation, downloaded May 27, 2009, 1 page, http://web.archive.org/web/20000115152402/www.national.com/appinfo/power/0,1768,265,00.html.
"System Block Diagrams," Texas Instruments Incorporated, 1999, 1 page, http://web.archive.org/web/20000415035012/www.ti.com/sc/docs/psheets/diagrams/cmms.htm.
"System Block Diagrams: Car Radio," Texas Instruments Incorporated, 2000, 1 page, http://web.archive.org/web/20000621212609/www.ti.com/sc/docs/psheets/diagrams/caradio.htm.
"System Diagrams: 5530 block List of Parts that Fit this block," National Semiconductor Corporation, downloaded May 27, 2009, 1 page, http://web.archive.org/web/20001001000328/www.national.com/diagrams/InformationAppliances_PersonalInternetAccess_5530.html.
"System Diagrams: Audio Codec/Amp Block List of Parts that Fit this Block," National Semiconductor Corporation, © 2001, 1 page, http://web.archive.org/web/20010219193410/www.national.com/diagrams/InformationAppliances_PersonalInternetAccess_AudioCodec_Amp.html.
"System Diagrams: LVDS block List of Parts that Fit this block," National Semiconductor Corporation, © 2001, 1 page, http://web.archive.org/web/20010219193936/www.national.com/diagrams/InformationAppliances_PersonalInternetAccess_LVDS.html.
"System Diagrams: Personal Internet Access," National Semiconductor Corporation, downloaded May 27, 2009, 1 page, http://web.archive.org/web/20000824150707/www.national.com/diagrams/IA_PersonalInternetAccess.html.
"System Diagrams: Radio Link block List of Parts that Fit this block," National Semiconductor Corporation, © 2001, 2 pages, http://web.archive.org/web/20010219194522/www.national.com/diagrams/InformationAppliances_PersonalInternetAccess_RadioLink.html.
"Technologies / Applications: Signal Chains," Analog Devices, Inc., 1995-2000, 2 pages, http://web.archive.org/web/20000510021331/www.analog.com/industry/signal_chains/auto/index.html.
"Technologies/Applications," Analog Devices, Inc., 1995-2000, 2 pages, http://web.archive.org/web/20000511132704/www.analog.com/industry/Industry_Solutions.html.
"Temperature Sensors for Printers and Faxes," Maxim Integrated Products, 2000, 1 page, http://web.archive.org/web/20000830125318/www.maxim-ic.com/DesignApps/EndEquipment/Printers/TempSensor.htm.
"Texas Instruments Homepage," Texas Instruments Incorporated, 2000, 2 page, http://web.archive.org/web/20000229100223/http://www.ti.com/.
"Texas Instruments Homepage: Headlines," Texas Instruments Incorporated, 1999, 1 page, http://web.archive.org/web/19991117072402/http:/www.ti.com/.
"Texas Instruments Welcomes You," Texas Instruments Incorporated, 2000, 1 page, http://web.archive.org/web/20000621152248/http://www.ti.com/.
"Texas Instruments: The World Leader in Digital Signal Processing Solutions," Texas Instruments Incorporated, 1999, 1 page, http://web.archive.org/web/19990428091847/http:/www.ti.com/.
"TI Semiconductors Engineering Design Center," Texas Instruments Incorporated, 1999, 1 page, http://web.archive.org/web/19990430044918/www.ti.com/sc/docs/eedesign.htm.
"TLC320AD58, 18-Bit Stereo Analog-To-Digital Converter," Texas Instruments Incorporated, 2000, 2 pages, http://web.archive.org/web/20001017230355/www.ti.com/sc/docs/products/analog/tlc320ad58.html.
"TPA005D2, 2 W Stereo Class-D Audio Amplifier," Texas Instruments Incorporated, 2000, 3 pages, http://web.archive.org/web/20001012044451/www.ti.com/sc/docs/products/analog/tpa005d02.html.
"Video Buffers: Step Search Selector," Saqqara Systems, Inc., downloaded Jun. 1, 2009, 2 pages, http://web.archive.org/web/19990128105448/209.1.238.248/scripts/cSelector.exe/Video_Buffers/.
"Video/High—Speed Amplifiers: Step Search Selector," Saqqara Systems, Inc., downloaded Jun. 1, 2009, 2 pages, http://web.archive.org/web/19990128071803/209.1.238.248/scripts/cSelector.exe/Video_Amps/.
"Welcome to Power Design Tools WebSIM," http://web.archive.org/web/19991007183131/www.pdt.com/national_sim/nsc_sim.html, downloaded May 27, 2009, 1 page.
"Welcome to your Power Webench™|" National Semiconductor Corporation, downloaded May 13, 2009, 1 page.
"What are you designing today? Digital Cameras," Maxim Integrated Products, 2000, 1 page, http://web.archive.org/web/20000817053455/www.maxim-ic.com/DesignApps/EndEquipment/Digital/StartPage.htm.
"What are you designing today? Printers and Faxes," Maxim Integrated Products, 2000, 1 page, http://web.archive.org/web/20000817053529/www.maxim-ic.com/DesignApps/EndEquipment/Printers/StartPage.htm.
"What are you designing today?" Maxim Integrated Products, 2000, 1 page, http://web.archive.org/web/20000817053514/www.maxim-ic.com/DesignApps/EndEquipment/Pagers/StartPage.htm.
"Wireless Infrastructure," Analog Devices, Inc., 1995-2000, 1 page, http://web.archive.org/web/20000817160941/www.analog.com/industry/communications/wireless/index.html.
"Wireless Infrastructure: Multimode/Multicarrier IF Sampling Receiver," Analog Devices, Inc., 1995-1999, 1 page, http://web.archive.org/web/19991004083507/www.analog.com/industry/signal_chains/auto/communications/comms_3.html.
"Wireless Infrastructure: Traditional Architecture," Analog Devices, Inc., 1995-2000, 1 page, http://web.archive.org/web/20000901051221/www.analog.com/industry/signal_chains/auto/communications/comms_13.html.

(56) References Cited

OTHER PUBLICATIONS

"World Leading Automatic Test Equipment (ATE) Components," Analog Devices, Inc., 1995-2000, 1 page, http://web.archive.org/web/20000817161019/www.analog.com/Industry/ate/.
"Industry Solutions: Signal Chains," Analog Devices, Inc., 1995-1999, 2 page, http://web.archive.org/web/19990508135138/www.analog.com/industry/signal_chains/auto/index.html.
Gibson, P., "Customer Relationship Management—Boston," National Semiconductor Corporation, Oct. 27, 1999, 59 pages.
Seybold et al., "Understanding the B2B and E-market Landscape," Patricia Seybold Group, Inc., 2000, 96 pages.
National Semiconductor, "Switchers Made Simple", Exhibit 1, http://web.archive.org/web/1998052.3202329/http://www.national.com/sw/SimpleSwitcher/0.1043.0.00.html, date accessed May 23, 1998, 3 pages.
National Semiconductor, "Welcome to National Semiconductor", Exhibit 2, http://web.archive.org/web/19980523191833/http://www.national.com/webteam/feedback.html, date accessed May 23, 1998, 1 page.
National Semiconductor, "www.national.com/design/—the Design Engineer Resource", Exhibit 3, http://web.archive.org/web19980523191839/www.national.com/design/, date accessed May 23, 1998, 1 page.
National Semiconductor, "National Semiconductor Models and Software", Exhibit 4, http://web.archive.org/web/19980523192853/www.national.com/models/, date accessed May 23, 1998, 1 page.
Symantec, "Symantec pcANYWHERE32 version 8.0 for Windows 95 and Windows NT", Exhibit 5, http://web.archive.org/web/19980110231023/www.symantec.com/pcanywhere/fs_pca3280.html, date accessed Jan. 10, 1998, 3 pages.
National Semiconductor, "Switchers Made Simple Software v. 5.0 (also known as LM267X Made Easy v.2.01 Software)", Exhibit 6, http://www.national.com/appinfo/power/, date accessed Jun. 19, 1998, 4 pages.
National Semiconductor, "National P/N LM2675—Simple Switcher Power Converter High Efficiency 1A Step-Down Voltage . . . ", Exhibit 7, http://web.archive.org/web/19981201090294/http://www.national.com/pf/LM/LM2675.html, date accessed Dec. 1, 1998, 4 pages.
Panasonic, "OEM Ceramic Capacitors", Exhibit B, http://web.archive.org/web/19991111215834/www.panasonic.com/industrial_oem/electronic_compotents/e . . . , date accessed Nov. 11, 1999, 1 page.
Coilcraft, "Request Sample", Exhibit 9, http://web.archive.org/web/19981205102727/www/webcom/com/liebman/us/reqsamp.html, date accessed Dec. 12, 1998, 3 pages.
Coilcraft, "Request Quotation", Exhibit 10, http://web.archive.org/web/19981205130735/www.webcom.com/liebman/us/regquote.html, date accessed Dec. 5, 1998, 2 pages.
Coilcraft, "Magnetics for LM259X and LM267X Series Simple Switcher® switching regulators—(Colicraft Chi . . . ", Exhibit 11, http://web.archive.org/web/19990203152931/www.webcom.com/liebman/us/lm259x.html, date accessed Feb. 3, 1999, 2 pages.
Coilcraft, "Simple Switchers Magnetics—Colicraft DO5022 Surface Mount Power Inductors", Exhibit 12, http://www.web.archive.org/web/19990507040604/www.webcom.com/liebman/us/ndo5022.html, date accessed May 7, 1999, 2 pages.
Colicraft, "Colicraft Designer's Kits", Exhibit 13, http://web.archive.org/web/19981212020215/order.coilcraft.com/, date accessed Dec. 12, 1998, 8 pages.
National Semiconductor, "National Welcomes You", Exhibit 14, http://web.archive.org/web/1999100223355/www.national.com/index.html, date accessed Oct. 2, 1999, 1 page.
National Semiconductor, "Welcome to National Semiconductor", Exhibit 15, http://web.archive.org/web/19990125091026/http://national.com/ date accessed Jan. 25, 1999, 1 page.
National Semiconductor, "National Semiconductor Products Catalog: National Semiconductor", Exhibit 16, http://web.archive.org/web/19991004171048/www.national.com.catalog/, date accessed Oct. 4, 1999, 2 pages.

National Semiconductor, "National Semiconductor Products Catalog: Analog—Display Circuits", Exhibit 17, http://web.archive.org/web/19991006161509/www.national.com/catalog/AnalogDisplayCircuits.html, date accessed Oct. 6, 1999, 1 page.
National Semiconductor, "National P/N MM5452—Liquid Crystal Display Drivers", Exhibit 18, http://web.archive.org/web/19991109122620/www.national.com/pf/MM/MM5452.html, date accessed Nov. 9, 1999, 2 pages.
McDonald, "WEBENCH Video—Exhibit 19", Transim Corp., Oct. 1999.
National Semiconductor, "Si Solutions", Exhibit 20, http://web.archive.org/web/19981203063505/www.national.com/diagrams/, date accessed Dec. 3, 1998, 1 page.
National Semiconductor, "Power Management", Exhibit 21, http://web.archive.org/web/19990202185041/www.national.com/diagrams/1.html, date accessed Feb. 2, 1999, 1 page.
National Semiconductor, "Navigator Parts List", Exhibit 22, http://web.archive.org/web/19990508102458/www.national.com/diagrams/2.html, date accessed May 8, 1999, 1 page.
National Semiconductor, "National Semiconductor Simple Switcher Converters", Exhibit 22, http://web.archive.org/web/20000115152402/www.national.com/appinfo/power/0,1768,265.00.html, date accessed Jan. 15, 2000, 1 page.
National Semoconductor, "National P/N LM2676—Simple Switcher High Efficiency 3A Step-Down Voltage Regulator", Exhibit 24, http://web.archive.org/web/19991104213412/www.national.com/pf/LM/LM2676.html, date accessed Nov. 4, 1999, 4 pages.
National Semiconductor, "Webench Gatew", Exhibit 25, http://web.archive.org/web/20000123022807/www.national.com/appinfo/power/webench/scripts/gateway.com, date accessed Jan. 23, 2000, 1 page.
National Semiconductor, "Press Release—National Semiconductor Redesigns Web Site to Reduce "Time-to-Decision" for Engineers", Exhibit 26, http://www.national.com/news/1997/9703/web2.html, date accessed Mar. 31, 1997, 3 pages.
National Semiconductor, "Power-Webench Page", Exhibit 27, http://web.archive.org/web/20000817172405/www.national.com/appinfo/power/webench/, date accessed Aug. 17, 2000, 1 page.
Hieber, "Modern Times Power Supply design in Internet Times using http://Power.National.Com", Power Point Presentation, National Semiconductor , Exhibit 28, 1999, 26 pages.
Hieber, "Modern Times: Power Supply Design on the Internet", Exhibit 29, http://power.national.com, date accesses Mar. 27, 2000, 8 pages.
National Semiconductor, "National Semiconductor Products Catalog: National Semiconductor Products", Exhibit 30, http://web.archive.org/web/19990423041920/www.national.com/catalog/index.html, date accessed Apr. 23, 1999, 1 page.
Gibson, "PowerPoint presentation: Relationship Management—Creating Time", Exhibit 31, www.national.com, Oct. 27, 1999, 59 pages.
Gibson, "PowerPoint presentation: Delivering Designs in Internet Time", Exhibit 32, www.national.com, Oct. 27, 1999, 41 pages.
National Semiconductor Corp., "The Design Engineer", Exhibit 33, www.national.com/design/, Jul. 23, 1999, 1 page.
Anderson, "Java for Business: Using Java to Win Customers, Cut Costs, and Drive Growth", Chapter 10, Exhibit 34, 1997, 25 pages.
National Semiconductor, "www.national.com/design/—the Design Engineer Resource", Exhibit 35, http://web.archive.org/web/19971210140744/www.national.com/design/, date accessed Dec. 10, 1997, 1 page.
National Semiconductor, "Si Solutions", Exhibit 36, http://web.archive.org/web/19990508070840/www.national.com/diagrams/, date accessed May 8, 1999, 1 page.
National Semiconductor, "Communications", Exhibit 37, http://webarchive.org/web/19990501225140/www.national.com/diagrams/524.html, date accessed May 12, 1999, 1 page.
National Semiconductor, NSC: Power Management\Distributed Power in Telecommunication\Step-Down Switching Converters, Exhibit 38, http://web.archive.org/web/19990220133429/www.national.com/diagrams/5.html, date accessed Feb. 20, 1999, 1 page.

(56) References Cited

OTHER PUBLICATIONS

National Semiconductor, "National P/N LM2574HV—Series Simple Switcher 0.5A Step-Down Voltage Regulator", Exhibit 39, http://web.archive.org/web/19990128180722/www.national.com/pf/LM/LM2574HV.html, date accessed Jan. 28, 1999, 4 pages.
National Semiconductor, "National Semiconductor Selection Guide: Analog—Amplifiers: High Speed Operational Amplifiers:", Exhibit 40, http://web.archive.org/web/19981203070922/www.national.com/catalog/sg2199.html, date accessed Dec. 3, 1998, 3 pages.
National Semiconductor, "National Semiconductor Design Engineering Resources", Exhibit 41, http://web.archive.org/web/19961019012403/www.national.com/design/index.html, date accessed Oct. 19, 1996, 1 page.
National Semiconductor, "National Semiconductor Implements Three Worldwide Extranet Services to Streamline Business-to-Business", Exhibit 42, http://www.national.com/news/item/0,1735,289,00.html, date accessed May 11, 1998, 3 pages.
National Semiconductor, "National Semiconductor Launches Buy.National.com", Exhibit 43, http://www.national.com/news/item/0,1735,353,00.html, date accessed May 1, 1999, 2 pages.
Gibson, "PowerPoint presentation: What Sells—Increasing Transactions and Views", Exhibit 44, www.national.com, Mar. 5, 1999, 61 pages.
National Semiconductor, "National Semiconductor Products Catalog: Analog—Amplifiers: High Speed Operational Amplifiers: Amp", Exhibit 45, http://web.archive.org/web/19981202011551/www.national.com/catalog/AnalogAmplifiers_HighSpeedOpe . . . , date accessed Dec. 2, 1998, 2 pages.
National Semiconductor, "National Semiconductor Power Management Home Page", Exhibit 46, http://web.archive.org/web/19990421013203/www.national.com/appinfo/power/index.html, date accessed Apr. 21, 1999, 1 page.
National Semiconductor, "Design Engineers—Information Tools, Design Tools", Exhibit 47, www.national.com, Nov. 11, 1999, 1 page.
Digital Designers, "Power Supply System Compatibility for Digital Designers", Exhibit 48, High Frequency Power Conversion 1994 Conference, Apr. 17-21, 1994, 112 pages.
National Semiconductor Corp., "The Design Engineer Resource—Primary and Secondary Tools", www.national.com/design/, Apr. 18, 1999, 1 page.
National Semiconductor, "National Semiconductor—Purchasing Resources", Exhibit 50, http://web.archive.org/web/20061206221819m_2/www.national.com/purchasing/, date accessed Dec. 6, 2006, 1 page.
United Sates District Court Eastern District of Texas Marshall Division, "Exhibit List in Support of National Semiconductor Invalidity Contentions for U.S. Patent No. 7,113,919; eTool Development Inc. V. National Semiconductor, Case No. 2:08-CV-196", May 19, 2009, 4 pages.
Slater, "Pconfig: a Web-based Configuration Tool for Configure-To Order Products", Knowledge-Based Systems, 1999, vol. 12, pp. 223-230.
Mittal, "Towards a Generic Model of Configuration Tasks", Knowledge Representation, Aug. 20-25, 1989, pp. 1395-1401.
Klein, "A Logic-based Description of Configuration: the Constructive Problem Solving Approach", Position Paper—AAAI 1996 Fall Symposium Workshop on Configuration, MIT, Nov. 1996, pp. 1-10b.
Attardi, "Web-based Configuration Assistants", Artificial Intelligence for Engineering Design, Analysis and Manufacturing, Sep. 1998, vol. 12, No. 4, 12 pages.
Ulrich, "The Role of Product Architecture in the Manufacturing Firm", Research Policy, 1995, vol. 24, pp. 419-440.
National Semiconductor Corp, "National P/N LMX3161—Single Chip Radio Transceiver", Exhibit 51, http://web.archive.org/web/19990129035523/www.national.com/pf/LM/LMX3161.html, Jan. 29, 1999, 3 pages.
National Semiconductor Corp., "National P/N LMV822—Low Voltage, Low Power, RRO, 5MHz OP Amps", Exhibit 52, http://web.archive.org/web/19990127110832/www.national.com/pf/LM/LMV822.html, Jan. 22, 1999, 3 pages.
National Semiconductor Corp., "Si Solutions", Exhibit 53, http://web.archive.org/web/19971210141103/www.national.com/diagrams.html, Dec. 10, 1997, 3 pages.
National Semiconductor Corp., "Design Software for Simple Switcher DC-DC Converters", Exhibit 54, http://web.archive.org/web/19990224233947/www.national.com/sw/SimpleSwitcher/0,1043,0,00.html, Feb. 24, 1999, 3 pages.
National Semiconductor Corp., "Reducing the Barriers to Simulation", Exhibit 55, http://web.archive.org/web/1999427155946/http://www.pdt.com/, Apr. 27, 1999, 1 page.
National Semiconductor Corp., "PDT Announces Breakthrough Simulation Technology, Delivers First True Simulation Over the Web", Exhibit 56, Transim Press Release, Mar. 15, 1999, 2 pages.
National Semiconductor Corp., "Switchers Made Simple", Exhibit 57, http://web.archive.org/web/19961019093743/www.national.com/models/switch/switch.html, Oct. 19, 1996, 1 page.
National Semiconductor Corp., "Welcome to National Semiconductor", Exhibit 58, http://web.archive.org/web/19981202072829/http://www.national.com/, Dec. 2, 1998, 1 page.
National Semiconductor Corp., "National Semiconductor Models and Software", Exhibit 59, http://web.archive.org/web/19981205190719/http://www.national.com/models/, Dec. 5, 1998, 1 page.
National Semiconductor Corp., "National P/N LM161—High Speed Differential Comparator", Exhibit 60, http://web.archive.org/web/19991010013450/http://www.national.com/pf/LM/LM161. html, Oct. 10, 1999, 3 pages.
National Semiconductor Corp., "Comparing the High Speed Comparators" Exhibit 61, www.national.com, Sep. 1, 2000, 8 pages.
National Semiconductor Corp., Exhibit 62—"Photographs of early SMS Pitch Pack" Oct. 1992, 4 pages.
In the United States District Court Eastern District of Texas Marshal Division, "Defendant's Amended Invalidity Contentions Pursuant to Patent Local Rule 3-3, 3-4 and 3-6(b), including Exhibit B Index", *eTool Development, INC and eTool Patent Holding Corp. v. National Semiconductor Corporation*, Case No. 2:08-CV-196, Jan. 29, 2010, 19 pages.
In the United States District Court Eastern District of Texas Marshal Division, "Defendant's Preliminary Invalidity Contentions Pursuant to Patent Local Rule 3-3, 3-4 and 3-6(b), including Exhibit B Index", *eTool Development, INC and eTool Patent Holding Corp. v. National Semiconductor Corporation*, Case No. 2:08-CV-196, May 19, 2009, 13 pages.
Jestice, "APEC '99: Fourteenth Annual Applied Power Electronics Conference and Exposition", Conference Proceedings, vol. 1, Mar. 14-18, 1999, pp. 71-74.
In the United States District Court Eastern District of Texas Marshal Division, Defendant's Preliminary Invalidity Contentions Pursuant to Patent Local Rule 3-3, 3-4 and 3-6(b), "Exhibit B1: Kolawa—US Patent No. 6,370,513", *eTool Development, INC and eTool Patent Holding Corp. v. National Semiconductor Corporation*, Case No. 2:08-CV-196, May 19, 2009, 37 pages.
In the United Slates District Court Eastern District of Texas Marshal Division, Defendant's Preliminary Invalidity Contentions Pursuant to Patent Local Rule 3-3, 3-4 and 3-6(b), "Exhibit B1 Supplemental: Kolawa—(US Patent No. 6,370,513) Alone or In Combination With Other Prior Art", *eTool Development, INC and eTool Patent Holding Corp. v. National Semiconductor Corporation*, Case No. 2:08-CV-196, Jan. 29, 2010, 174 pages.
In the United States District Court Eastern District of Texas Marshal Division, Defendant's Preliminary Invalidity Contentions Pursuant to Patent Local Rule 3-3, 3-4 and 3-6(b), "Exhibit B2 Grimes—US Patent No. 5,859,414", *eTool Development, INC and eTool Patent Holding Corp. v. National Semiconductor Corporation*, Case No. 2:08-CV-196, Jan. 29, 2010, 41 pages.
In the United States District Court Eastern District of Texas Marshal Division, Defendant's Preliminary Invalidity Contentions Pursuant to Patent Local Rule 3-3, 3-4 and 3-6(b), "Exhibit B2 Grimes—US Patent No. 5,859,414", *eTool Development, INC and eTool Patent Holding Corp. v. National Semiconductor Corporation*, Case No. 2:08-CV-198, May 19, 2009, 41 pages.

(56) References Cited

OTHER PUBLICATIONS

In the United States District Court Eastern District of Texas Marshal Division, Defendant's Preliminary Invalidity Contentions Pursuant to Patent Local Rule 3-3, 3-4 and 3-6(b), "Exhibit B3: Kolawa Patent and Grimes Patent Combination", *eTool Development, INC and eTool Patent Holding Corp. v. National Semiconductor Corporation*, Case No. 2:08-CV-196, Jan. 29, 2010, 50 pages.

In the United States District Court Eastern District of Texas Marshal Division, Defendant's Preliminary Invalidity Contentions Pursuant to Patent Local Rule 3-3, 3-4 and 3-6(b), "Exhibit B3: Kolawa Patent and Grimes Patent Combination", *eTool Development, INC and eTool Patent Holding Corp. v. National Semiconductor Corporation*, Case No. 2:08-CV-196, May 19, 2009, 50 pages.

In the United States District Court Eastern District of Texas Marshal Division, Defendant's Preliminary Invalidity Contentions Pursuant to Patent Local Rule 3-3, 3-4 and 3-6(b), "Exhibit B4: Henson—US Patent No. 6,167,383", *eTool Development, INC and eTool Patent Holding Corp. v. National Semiconductor Corporation*, Case No. 2:08-CV-196, May 19, 2009, 37 pages.

In the United States District Court Eastern District of Texas Marshal Division, Defendant's Preliminary Invalidity Contentions Pursuant to Patent Local Rule 3-3, 3-4 and 3-6(b), "Exhibit B4 Supplemental: Henson—US Patent No. 6,167,383) Alone or In Combination With Other Prior Art", *eTool Development, INC and eTool Patent Holding Corp. v. National Semiconductor Corporation*, Case No. 2:08-CV-196, Jan. 29, 2010, 113 pages.

In the United States District Court Eastern District of Texas Marshal Division, Defendant's Preliminary Invalidity Contentions Pursuant to Patent Local Rule 3-3, 3-4 and 3-6(b), "Exhibit B5: Helot—US Patent No. 7,328,171", *eTool Development, INC and eTool Patent Holding Corp. v. National Semiconductor Corporation*, Case No. 2:08-CV-196, May 19, 2009, 35 pages.

In the United States District Court Eastern District of Texas Marshal Division, Defendant's Preliminary Invalidity Contentions Pursuant to Patent Local Rule 3-3, 3-4 and 3-6(b), "Exhibit B5: Helot—US Patent No. 7,328,171", *eTool Development, INC and eTool Patent Holding Corp. v. National Semiconductor Corporation*, Case No. 2:08-CV-196, Jan. 29, 2010, 35 pages.

In the United States District Court Eastern District of Texas Marshal Division, Defendant's Preliminary Invalidity Contentions Pursuant to Patent Local Rule 3-3, 3-4 and 3-6(b), "Exhibit B6: Henson Patent and Helot Patent Combination", *eTool Development, INC and eTool Patent Holding Corp. v. National Semiconductor Corporation*, Case No. 2:08-CV-196, May 19, 2009, 48 pages.

In the United States District Court Eastern District of Texas Marshal Division, Defendant's Preliminary Invalidity Contentions Pursuant to Patent Local Rule 3-3, 3-4 and 3-6(b), "Exhibit B6: Henson Patent and Helot Patent Combination", *eTool Development, INC and eTool Patent Holding Corp. v. National Semiconductor Corporation*, Case No. 2:08-CV-196, Jan. 29, 2010, 48 pages.

In the United States District Court Eastern District of Texas Marshal Division, Defendant's Preliminary Invalidity Contentions Pursuant to Patent Local Rule 3-3, 3-4 and 3-6(b), "Exhibit B7: House—US Patent No. 6,785,805", *eTool Development, INC and eTool Patent Holding Corp. v. National Semiconductor Corporation*, Case No. 2:08-CV-196, May 19, 2009, 33 pages.

In the United States District Court Eastern District of Texas Marshal Division, Defendant's Preliminary Invalidity Contentions Pursuant to Patent Local Rule 3-3, 3-4 and 3-6(b), "Exhibit B7: House—US Patent No. 6,785,805", *eTool Development, INC and eTool Patent Holding Corp. v. National Semiconductor Corporation*, Case No. 2:08-CV-196, Jan. 29, 2010, 33 pages.

In the United States District Court Eastern District of Texas Marshal Division, Defendant's Preliminary Invalidity Contentions Pursuant to Patent Local Rule 3-3, 3-4 and 3-6(b), "Exhibit B8: Robertson—US Patent No. 6,594,799", *eTool Development, INC and eTool Patent Holding Corp. v. National Semiconductor Corporation*, Case No. 2:08-CV-196, May 19, 2009, 34 pages.

In the United States District Court Eastern District of Texas Marshal Division, Defendant's Preliminary Invalidity Contentions Pursuant to Patent Local Rule 3-3, 3-4 and 3-6(b), "Exhibit B8: Robertson—US Patent No. 6,594,799", *eTool Development, INC and eTool Patent Holding Corp. v. National Semiconductor Corporation*, Case No. 2:08-CV-196, Jan. 29, 2010, 34 pages.

In the United States District Court Eastern District of Texas Marshal Division, Defendant's Preliminary Invalidity Contentions Pursuant to Patent Local Rule 3-3, 3-4 and 3-6(b), "Exhibit B9: Wilmott—US Patent No. 6,782,307, and Provisional U.S. Appl. Nos. 60/216,847, 60/191,878 and 60/179,057", *eTool Development, INC and eTool Patent Holding Corp. v. National Semiconductor Corporation*, Case No. 2:08-CV-196, May 19, 2009, 31 pages.

In the United States District Court Eastern District of Texas Marshal Division, Defendant's Preliminary Invalidity Contentions Pursuant to Patent Local Rule 3-3, 3-4 and 3-6(b), "Exhibit B9: Wilmott—US Patent No. 6,782,307, and Provisional U.S. Appl. Nos. 60/216,847, 60/191,878 and 60/179,057", *eTool Development, INC and eTool Patent Holding Corp. v. National Semiconductor Corporation*, Case No. 2:08-CV-196, Jan. 28, 2010, 31 pages.

In the United States District Court Eastern District of Texas Marshal Division, Defendant's Preliminary Invalidity Contentions Pursuant to Patent Local Rule 3-3, 3-4 and 3-6(b), "Exhibit B10: Motomiya—US Patent No. 6,083,267", *eTool Development, INC and eTool Patent Holding Corp. v. National Semiconductor Corporation*, Case No. 2:08-CV-196, May 19, 2009, 35 pages.

In the United States District Court Eastern District of Texas Marshal Division, Defendant's Preliminary Invalidity Contentions Pursuant to Patent Local Rule 3-3, 3-4 and 3-6(b), "Exhibit B10: Motomiya—US Patent No. 6,083,267", *eTool Development, INC and eTool Patent Holding Corp. v. National Semiconductor Corporation*, Case No. 2:08-CV-196, Jan. 29, 2010, 35 pages.

In the United States District Court Eastern District of Texas Marshal Division, Defendant's Preliminary Invalidity Contentions Pursuant to Patent Local Rule 3-3, 3-4 and 3-6(b), "Exhibit B11: Delorme—US Patent No. 5,948,040", *eTool Development, INC and eTool Patent Holding Corp. v. National Semiconductor Corporation*, Case No. 2:08-CV-196, May 19, 2009, 30 pages.

In the United States District Court Eastern District of Texas Marshal Division, Defendant's Preliminary Invalidity Contentions Pursuant to Patent Local Rule 3-3, 3-4 and 3-6(b), "Exhibit B11: Delorme—US Patent No. 5,948,040", *eTool Development, INC and eTool Patent Holding Corp. v. National Semiconductor Corporation*, Case No. 2:08-CV-196, Jan. 29, 2010, 30 pages.

In the United States District Court Eastern District of Texas Marshal Division, Defendant's Preliminary Invalidity Contentions Pursuant to Patent Local Rule 3-3, 3-4 and 3-6(b), "Exhibit B12: Beall—US Patent No. 6,169,992", *eTool Development, INC and eTool Patent Holding Corp. v. National Semiconductor Corporation*, Case No. 2:08-CV-196, May 19, 2009, 36 pages.

In the United States District Court Eastern District of Texas Marshal Division, Defendant's Preliminary Invalidity Contentions Pursuant to Patent Local Rule 3-3, 3-4 and 3-6(b), "Exhibit B12: Beall—US Patent No. 6,169,992", *eTool Development, INC and eTool Patent Holding Corp. v. National Semiconductor Corporation*, Case No. 2:08-CV-196, Jan. 29, 2010, 36 pages.

In the United States District Court Eastern District of Texas Marshal Division, Defendant's Preliminary Invalidity Contentions Pursuant to Patent Local Rule 3-3, 3-4 and 3-6(b), "Exhibit B13: Lynch—US Patent No. 5,708,798", *eTool Development, INC and eTool Patent Holding Corp. v. National Semiconductor Corporation*, Case No. 2:08-CV-196, May 19, 2009, 78 pages.

In the United States District Court Eastern District of Texas Marshal Division, Defendant's Preliminary Invalidity Contentions Pursuant to Patent Local Rule 3-3, 3-4 and 3-6(b), "Exhibit B13 Supplemental: Lynch—(US Patent No. 5,708,798) in Combination with other Prior Art", *eTool Development, INC and eTool Patent Holding Corp. v. National Semiconductor Corporation*, Case No. 2:08-CV-196, Jan. 29, 2010, 115 pages.

In the United States District Court Eastern District of Texas Marshal Division, Defendant's Preliminary Invalidity Contentions Pursuant to Patent Local Rule 3-3, 3-4 and 3-6(b), "Exhibit B14: Puri—US Patent No. 6,064,982", *eTool Development, INC and eTool Patent Holding Corp. v. National Semiconductor Corporation*, Case No. 2:08-CV-196, May 19, 2009, 144 pages.

(56) References Cited

OTHER PUBLICATIONS

In the United States District Court Eastern District of Texas Marshal Division, Defendant's Preliminary Invalidity Contentions Pursuant to Patent Local Rule 3-3, 3-4 and 3-6(b), "Exhibit B14: Puri—US Patent No. 6,064,982", *eTool Development, INC and eTool Patent Holding Corp. v. National Semiconductor Corporation*, Case No. 2:08-CV-196, Jan. 29, 2010, 144 pages.

In the United States District Court Eastern District of Texas Marshal Division, Defendant's Preliminary Invalidity Contentions Pursuant to Patent Local Rule 3-3, 3-4 and 3-6(b), "Exhibit B15: Hennessey Patent and Blinn Patent Combination", *eTool Development, INC and eTool Patent Holding Corp. v. National Semiconductor Corporation*, Case No. 2:08-CV-196, May 19, 2009, 30 pages.

In the United States District Court Eastern District of Texas Marshal Division, Defendant's Preliminary Invalidity Contentions Pursuant to Patent Local Rule 3-3, 3-4 and 3-6(b), "Exhibit B15: Hennessey Patent and Blinn Patent Combination", *eTool Development, INC and eTool Patent Holding Corp. v. National Semiconductor Corporation*, Case No. 2:08-CV-196, Jan. 29, 2010, 30 pages.

In the United States District Court Eastern District of Texas Marshal Division, Defendant's Preliminary Invalidity Contentions Pursuant to Patent Local Rule 3-3, 3-4 and 3-6(b), "Exhibit B16: Motomiya Patent and Paseman Patent Combination", *eTool Development, INC and eTool Patent Holding Corp. v. National Semiconductor Corporation*, Case No. 2:08-CV-196, May 19, 2009, 49 pages.

In the United States District Court Eastern District of Texas Marshal Division, Defendant's Preliminary Invalidity Contentions Pursuant to Patent Local Rule 3-3, 3-4 and 3-6(b), "Exhibit B16: Motomiya Patent and Paseman Patent Combination", *eTool Development, INC and eTool Patent Holding Corp. v. National Semiconductor Corporation*, Case No. 2:08-CV-196, Jan. 29, 2010, 49 pages.

In the United States District Court Eastern District of Texas Marshal Division, Defendant's Preliminary Invalidity Contentions Pursuant to Patent Local Rule 3-3, 3-4 and 3-6(b), "Exhibit B17: Fredlund—US Patent No. 5,666,215", *eTool Development, INC and eTool Patent Holding Corp. v. National Semiconductor Corporation*, Case No. 2:08-CV-196, May 19, 2009, 30 pages.

In the United States District Court Eastern District of Texas Marshal Division, Defendant's Preliminary Invalidity Contentions Pursuant to Patent Local Rule 3-3, 3-4 and 3-6(b), "Exhibit B17: Fredlund—US Patent No. 5,666,215", *eTool Development, INC and eTool Patent Holding Corp. v. National Semiconductor Corporation*, Case No. 2:08-CV-196, Jan. 29, 2010, 30 pages.

In the United States District Court Eastern District of Texas Marshal Division, Defendant's Preliminary Invalidity Contentions Pursuant to Patent Local Rule 3-3, 3-4 and 3-6(b), "Exhibit B18: Barck—US Patent No. 7,003,548", *eTool Development, INC and eTool Patent Holding Corp. v. National Semiconductor Corporation*, Case No. 2:08-CV-196, May 19, 2009, 29 pages.

In the United States District Court Eastern District of Texas Marshal Division, Defendant's Preliminary Invalidity Contentions Pursuant to Patent Local Rule 3-3, 3-4 and 3-6(b), "Exhibit B18 Supplemental: Barck—(US Patent No. 7,003,548) Alone or in Combination with other prior art", *eTool Development, INC and eTool Patent Holding Corp. v. National Semicohductor Corporation*, Case No. 2:08-CV-196, Jan. 29, 2010, 106 pages.

In the United States District Court Eastern District of Texas Marshal Division, Defendant's Preliminary Invalidity Contentions Pursuant to Patent Local Rule 3-3, 3-4 and 3-6(b), "Exhibit B19: Gupta Patent and Barck Patent Combination", *eTool Development, INC and eTool Patent Holding Corp. v. National Semiconductor Corporation*, Case No. 2:08-CV-196, May 19, 2009, 30 pages.

In the United States District Court Eastern District of Texas Marshal Division, Defendant's Preliminary Invalidity Contentions Pursuant to Patent Local Rule 3-3, 3-4 and 3-6(b), "Exhibit B19: Gupta Patent and Barck Patent Combination", *eTool Development, INC and eTool Patent Holding Corp. v. National Semiconductor Corporation*, Case No. 2:08-CV-196, Jan. 29, 2010, 30 pages.

In the United States District Court Eastern District of Texas Marshal Division, Defendant's Preliminary Invalidity Contentions Pursuant to Patent Local Rule 3-3, 3-4 and 3-6(b), "Exhibit B20: Geller—US Patent No. 6,300,948", *eTool Development, INC and eTool Patent Holding Corp. v. National Semiconductor Corporation*, Case No. 2:08-CV-196, May 19, 2009, 29 pages.

In the United States District Court Eastern District of Texas Marshal Division, Defendant's Preliminary Invalidity Contentions Pursuant to Patent Local Rule 3-3, 3-4 and 3-6(b), "Exhibit B20: Geller—US Patent No. 6,300,948", *eTool Development, INC and eTool Patent Holding Corp. v. National Semiconductor Corporation*, Case No. 2:08-CV-196, Jan. 29, 2010, 29 pages.

In the United States District Court Eastern District of Texas Marshal Division, Defendant's Preliminary Invalidity Contentions Pursuant to Patent Local Rule 3-3, 3-4 and 3-6(b), "Exhibit B21: Hiroyuki—Japanese Published Application No. 2000-020589", *eTool Development, INC and eTool Patent Holding Corp. v. National Semiconductor Corporation*, Case No. 2:08-CV-196, May 19, 2009, 31 pages.

In the United States District Court Eastern District of Texas Marshal Division, Defendant's Preliminary Invalidity Contentions Pursuant to Patent Local Rule 3-3, 3-4 and 3-6(b), "Exhibit B21: Hiroyuki—Japanese Published Application No. 2000-020589", *eTool Development, INC and eTool Patent Holding Corp. v. National Semiconductor Corporation*, Case No. 2:08-CV-196, Jan. 29, 2010, 31 pages.

In the United States District Court Eastern District of Texas Marshal Division, Defendant's Preliminary Invalidity Contentions Pursuant to Patent Local Rule 3-3, 3-4 and 3-6(b), "Exhibit B22: Rose—PCT Publication No. WO 98/15904", *eTool Development, INC and eTool Patent Holding Corp. v. National Semiconductor Corporation*, Case No. 2:08-CV-196, May 19, 2009, 31 pages.

In the United States District Court Eastern District of Texas Marshal Division, Defendant's Preliminary Invalidity Contentions Pursuant to Patent Local Rule 3-3, 3-4 and 3-6(b), "Exhibit B22: Rose—PCT Publication No. WO 98/15904", *eTool Development, INC and eTool Patent Holding Corp. v. National Semiconductor Corporation*, Case No. 2:08-CV-196, Jan. 29, 2010, 31 pages.

In the United States District Court Eastern District of Texas Marshal Division, Defendant's Preliminary Invalidity Contentions Pursuant to Patent Local Rule 3-3, 3-4 and 3-6(b), "Exhibit B23: Webench Tools when used with the National website", *eTool Development, INC and eTool Patent Holding Corp. v. National Semiconductor Corporation*, Case No. 2:08-CV-196, May 19, 2009, 80 pages.

In the United States District Court Eastern District of Texas Marshal Division, Defendant's Preliminary Invalidity Contentions Pursuant to Patent Local Rule 3-3, 3-4 and 3-6(b), "Exhibit B23 Supplemental: Webench Tools when used with the National website", *eTool Development, INC and eTool Patent Holding Corp. v. National Semiconductor Corporation*, Case No. 2:08-CV-196, Jan. 29, 2010, 91 pages.

In the United States District Court Eastern District of Texas Marshal Division, Defendant's Preliminary Invalidity Contentions Pursuant to Patent Local Rule 3-3, 3-4 and 3-6(b), "Exhibit B24: Solutions Tools when used with the National Website", *eTool Development, INC and eTool Patent Holding Corp. v. National Semiconductor Corporation*, Case No. 2:08-CV-196, May 19, 2009, 79 pages.

In the United States District Court Eastern District of Texas Marshal Division, Defendant's Preliminary Invalidity Contentions Pursuant to Patent Local Rule 3-3, 3-4 and 3-6(b), "Exhibit B24; Solutions Tools when used with the National Website", *eTool Development, INC and eTool Patent Holding Corp. v. National Semiconductor Corporation*, Case No. 2:08-CV-196, Jan. 29, 2010, 75 pages.

In the United States District Court Eastern District of Texas Marshal Division, Defendant's Preliminary Invalidity Contentions Pursuant to Patent Local Rule 3-3, 3-4 and 3-6(b), "Exhibit B25: Switchers Made Simple Software v. 5.0", *eTool Development, INC and eTool Patent Holding Corp. v. National Semiconductor Corporation*, Case No. 2:08-CV-196, May 19, 2009, 65 pages.

In the United States District Court Eastern District of Texas Marshal Division, Defendant's Preliminary Invalidity Contentions Pursuant to Patent Local Rule 3-3, 3-4 and 3-6(b), "Exhibit B25 Supplemental: Switchers Made Simple Software v. 5.0 aka LM267 Made Easy V2.01 ("SMS")", *eTool Development, INC and eTool Patent Holding Corp. v. National Semiconductor Corporation*, Case No. 2:08-CV-196, Jan. 29, 2010, 92 pages.

(56) References Cited

OTHER PUBLICATIONS

In the United States District Court Eastern District of Texas Marshal Division, Defendant's Preliminary Invalidity Contentions Pursuant to Patent Local Rule 3-3, 3-4 and 3-6(b), "Exhibit B26: Combination System SMS 5.0 Software with pcANYWHERE Software", *eTool Development, INC and eTool Patent Holding Corp. v. National Semiconductor Corporation*, Case No. 2:08-CV-196, May 19, 2009, 67 pages.

In the United States District Court Eastern District of Texas Marshal Division, Defendant's Preliminary Invalidity Contentions Pursuant to Patent Local Rule 3-3, 3-4 and 3-6(b), "Exhibit B26: Combination System SMS 5.0 Software with pcANYWHERE Software", *eTool Development, INC and eTool Patent Holding Corp. v. National Semiconductor Corporation*, Case No. 2:08-CV-196, Jan. 29, 2010, 67 pages.

In the United States District Court Eastern District of Texas Marshal Division, Defendant's Preliminary Invalidity Contentions Pursuant to Patent Local Rule 3-3, 3-4 and 3-6(b), "Exhibit B27: SEYBOLD—Customers.com® Stratigic Planning Service: Understanding the B2B and E-Market Landscape, Focused Research Collection", *eTool Development, INC and eTool Patent Holding Corp. v. National Semiconductor Corporation*, Case No. 2:08-CV-196, May 19, 2009, 110 pages.

In the United States District Court Eastern District of Texas Marshal Division, Defendant's Preliminary Invalidity Contentions Pursuant to Patent Local Rule 3-3, 3-4 and 3-6(b), "Exhibit B27: SEYBOLD—Customers.com® Stratigic Planning Service: Understanding the B2B and E-Market Landscape, Focused Research Collection", *eTool Development, INC and eTool Patent Holding Corp. v. National Semiconductor Corporation*, Case No. 2:08-CV-196, Jan. 29, 2010, 110 pages.

In the United States District Court Eastern District of Texas Marshal Division, Defendant's Preliminary Invalidity Contentions Pursuant to Patent Local Rule 3-3, 3-4 and 3-6(b), "Exhibit B28 (Supplemental): MCGuinness and Wright in Combination with other prior art", *eTool Development, INC and eTool Patent Holding Corp. v. National Semiconductor Corporation*, Case No. 2:08-CV-196, Jan. 29, 2010, 124 pages.

National Semiconductor, "System Diagrams: Battery Monitoring", http://web.archive.org/web/20001121235000/www.national.com/diagrams/PM_BatteryMonitoring.html, May 14, 2009, 1 page.

National Semiconductor, "Systems Diagrams: Battery Power Supply", http://web.archive.org/web/20001122010900/www.national.com/diagrams/PM_BatteryPowerSupply.html, May 14, 2009, 1page.

National Semiconductor, "Simplis Simulation Login Page: Welcome to Power Design Tools WebSIM", http://web.archive.org/web/19991002040802/www.national.com/appinfo/power/http://web.archive.org/web/19991007183131/www.pdt.com/national_sim/nsc_sim.html, May 14, 2009, 1 page.

National Semiconductor, "National Semiconductors Products Catalog: Analog—Flat Panel Display", http://web.archive.org/web/19991007040406/www.national.com/catalog/AnalogFlatPanelDisplay.html, May 19, 2009, 1 page.

National Semiconductor, "National P/N LMX2325—PLLatinum 2.5 GHz Frequency Synthesizer for RF Personal Communications", http://web.archive.org/web/20000304075734/http://www.national.com/pf/LM/LMX2325.html#Datasheet, May 14, 2009, 3 pages.

National Semiconductor, "National P/N 54FCT138—1-of-8 Decoder/Demultiplexer", http://web.archive.org/web/20001006175007/http://www.national.com/pf/54/54FCT138.html#Datasheet, May 14, 2009, 2 pages.

National Semiconductor, "National Semiconductor Power Home Page: Power.National.Com", http://web.archive.org/web/20010124040200/www.national.com/appinfo/power/, May 14, 2009, 2 pages.

National Semiconductor, "National Semiconductor Power Home Page Power.National.Com", http://web.archive.org/web/20000919185443/www2.national.com/appinfo/power/, May 14, 2009, 2 pages.

National Semiconductor, "National Semiconductor Power Home Page Power.National.Com", http://web.archive.org/web/20000815214223/www.national.com/appinfo/power/, May 14, 2009, 2 pages.

National Semiconductor, "National Semiconductor Wireless.National.Com", http://web.archive.org/web/20000817130549/www.national.com/appinfo/wireless/, May 14, 2009, 2 pages.

National Semiconductor, "How to use Webench", http://web.archive.org/web/20000817172026/www.national.com/appinfo/webench/help/help.html, May 14, 2009

National Semiconductor, "ADI—Typical ATE Signal Chain" http://web.archive.org/web/20000901051522/www.analog.com/industrial/signal_chains/auto/instrumentation/inst_4.html, May 14, 2009.

National Semiconductor, "ADI—Digital Still Camera" http://web.archive.org/web/20000303235546/www.analog.com/industry/signal_chains/auto/consumer/cons_2.html, May 14, 2009, 1 page.

National Semiconductor, ADI-Product Center: Industry's First 32-Bit, Floating-Point Implementation of the Lucasfilm THX Multi-Channel Digital Audio Post-Processor http://web.archive.org/web/20000516060537/products.analog.com/products/info.asp?product=ADSST-MEL-THX, May 14, 2009.

National Semiconductor, "DSPTel Caller Identification (Type I, Type II)" http://web.archive.org/web/20000616082804/products.analog.com/products/info.asp?product=ADSST-CID, May 14, 2009, 3 pages.

National Semiconductor, "ADSST-EM-3010 SalemTM-3T Microcontroller + DSP-Based Tri-Vector Meter" http://web.archive.org/web/20000417100129/products.analog.com/products/info.asp?product=ADSST-EM-3010, May 14, 2009, 1 page.

National Semiconductor, "Using ADI's Parametric Search", http://web.archive.org/web/20000304142419/catalog.analog.com/, May 19, 2009, 1 page.

National Semiconductor, "Signal Chain Solutions", http://web.archive.org/web/20000901075811/www.analog.com/industry/communications/wireless/wireless_chain.html, May 14, 2009, 1 page.

National Semiconductor, "High Speed Amplifiers", http://web.archive.org/web/20000831045850/http://www.analog.com/support/standard_linear/selection_guides/chart.html#High, May 14, 2009, 3 pages.

National Semiconductor, "Selection Guides", http://web.archive.org/web/20010517130348/http://www.analog.com/product/selection_guides.html#video, May 14, 2009, 4 pages.

National Semiconductor, "Selection Guides", http://web.archive.org/web/20010517130348/http://www.analog.com/product/selection_guides.html#mititary, May 14, 2009, 4 pages.

National Semiconductor, "Selections Guides", http://web.archive.org/web/20010517150348/http://www.analog.com/product/selection_guides.html#energy, May 14, 2009, 4 pages.

National Semiconductor, "Maxim—Parametric Search—Product Table", http://web.archive.org/web/20010619084006rn_1/para.maxim-ic.com/ss.asp?FAM=Vid_Line&TREE=Amps.asp&HP=AmpComp.cfm&SORD=, May 14, 2009, 2 pages.

National Semiconductor, "Maxim—Pagers", http://web.archive.org/web/20000706205813/http://www.maxim-ic.com/, May 14, 2009, 1 page.

National Semiconductor, "Automotive: Car Multi-Media", http://web.archive.org/web/20000711080234/http://www.ti.com/sc/docs/apps/automotive/car_multi_media.html#Block_Diagrams, May 14, 2009, 1 page.

National Semiconductor, "Product Folder:TPA005DO2, 2 W Stereo Class-D Audio Amplifier", http://web.archive.org/web/20001012044451/http://www.ti.com/sc/docs/products/analog/tpa005d02.html#Datasheets, May 14, 2009, 3 pages.

Barlas, "Spend Analysis Software-Spend Analysis on a Data-warehouse for detailed spend analysis www.zycus.com", Line56.com National Semiconductor, http://www.line56.com/print/default.asp?ArticleID=4491, Mar. 14, 2003, 1-3.

LaSalle et al., "Turning Ordinary Products Into Extraordinary Experiences", Priceless, Harvard Business School Press, Copyright 2003, 6 pages.

(56) References Cited

OTHER PUBLICATIONS

National Semiconductor, "Webench Online Design Environment Design Today, Prototype Tomorrow", www.national.com, 2006, 1-4.

Perry, "Power Supply Design Using Webench", National Semiconductor, Online Seminar, http://web.archive.orgweb20050228033333www.national.comonlineseminar2003webenchtranscript.html, Copyright 2003, 8 pages.

Perry, "Power Supply Design Using Webench", National Semiconductor, Nov. 6, 2003, 1-60.

* cited by examiner

SUMMARY

Charts

— Vin=44 0V      - - - Vin=48 0V      ----- Vin=52 0V

Efficiency 91.00
90.00
89.00
88.00
87.00
86.00

Efficiency (%)

0.39  1.19  1.99  2.79  3.59

Bill of Materials

BOM Cost: $6.36 "Footprint is component footprint plus 1mm per side.

| Part | Man | Part | Qty | PW | Des | En | Top | Pri |
|------|-----|------|-----|----|----|----|----|-----|
| Coo | MuR | GR | 1 | 50. | Cap | 8 | – | Sel |
| Coo | MuR | GR | 1 | 50. | Cap | 10 | – | Sel |
| Coo | MuR | GR | 1 | 50. | Cap | 8 | – | Sel |
| On | MuR | GR | 1 | 50. | Cap | 23 | ▢ | Sel |
| Cout | MuR | GR | 3 | 50. | Cap | 23 | ▢ | Sel |
| D1 | Wis | 50W | 1 | 50. | WR | 10G | ▢ | Sel |

Operating Values

Modify Operating Point

Vin: 52.0   Iout: 3.995   Recalculation

Optimizer

Click here to start Design Optimization:

Schematic

1   FIT

Your Complete Design

Product Folder        View My Orders

ORDER Evaluation Boards, Samples, I

*Downloads:*

🖶 Design Documentation

⬇ Schematic CAD File Export

✉ Share this project

FROM FIG. 12A

POWER SUPPLY ARCHITECTURE SYSTEM DESIGNER

CROSS-REFERENCE TO RELATED APPLICATIONS

This application claims the benefit of U.S. Provisional Patent Application Ser. No. 61/359,207, filed Jun. 28, 2010, entitled "POWER SUPPLY ARCHITECTURE SYSTEM DESIGNER," the contents of which is hereby incorporated by reference in its entirety.

BACKGROUND

Traditionally power supply design tools have created one power supply design at a time. An example of such a power supply design tool is National Semiconductor's WEBENCH Power Designer. However, creating a power supply design for multiple loads one load at a time can be a slow and tedious process. Further, creating a power supply design for each load individually does not give any information about a system of power supplies as a whole.

BRIEF DESCRIPTION OF THE DRAWINGS

FIG. 7 illustrates an exemplary user interface for the input of design requirements illustrating the inclusion of multiple loads into the design requirements.

FIG. 9 illustrates an exemplary user interface illustrating additional generated power supply designs.

DETAILED DESCRIPTION

Figure 1:
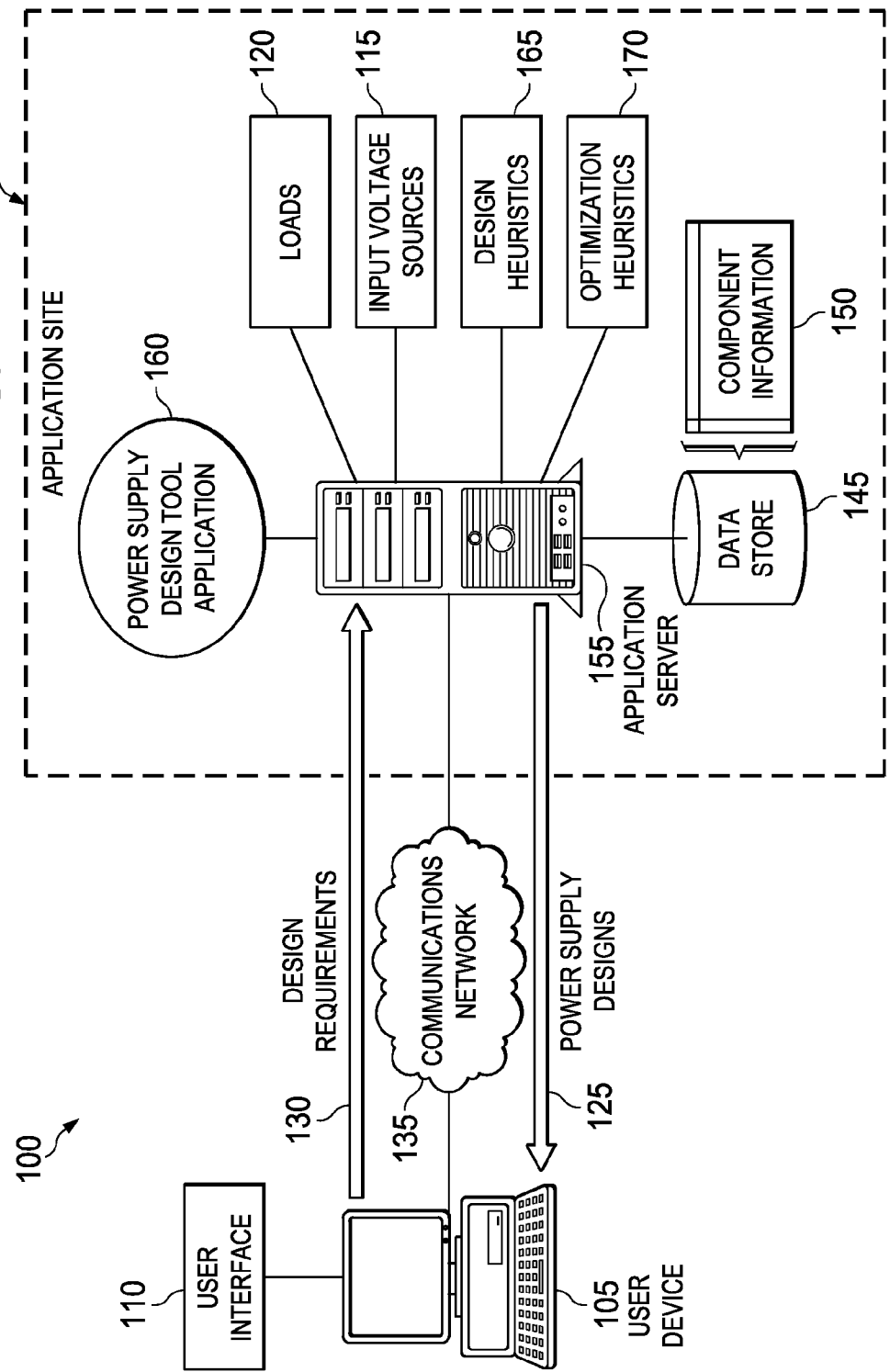
FIG. 1 illustrates an exemplary system for determining power supply architectures.

For a single load, a manufacturer of power supply components may be able to supply on the order of dozens of possible designs that satisfy a given set of power supply requirements. These design solutions may include various power supply components and supporting components to allow the power supply components to function for the particular application. Additionally, these different design solutions may take up different footprints, have different electrical efficiency ratings, and have different component costs.

Comparing each of the possible designs solutions by hand to determine an appropriate power supply design may require significant work. For example, using the WEBENCH Power Designer provided by National Semiconductor, a user may create each power supply design individually, simulate each individual design, and compare the resultant simulations to one another to determine the most preferred design. Depending on the number of possible designs, and the number of loads requiring power, this process may take many days or weeks.

To overcome these and other deficiencies in existing design tools, a design tool may be implemented that is configured to generate solutions on a dynamic basis, based on a request for solutions configured to power a set of multiple loads. The design tool may utilize various heuristics to selectively group the multiple loads, determine potential intermediate voltage rails, and dynamically compute a multitude of power supply design architectures that can power the set of load requirements. Each power supply architecture may include positions at which components configured to satisfy the load requirements are to be determined. Using the generated power supply design architectures and a database of component information, the design tool may utilize various heuristics to determine components to use to implement the power supply design architectures in light of design goals for the solutions, and may generate a set of different solutions that each are capable of powering the set of multiple loads.

Components may be added or removed from the database of component information to allow for the dynamic creation of different solutions. Further, because the solutions are created dynamically upon user request, the generated solutions are always up-to-date based on the component information in the database. In some instances, the design tool may be configured to prefer components from one or more vendors, manufacturers, or suppliers.

The design tool may further optimize the generated designs in accordance with additional design parameters indicating a tradeoff between various optimizations, such as power supply efficiency, component and printed circuit board footprint size, and overall component cost. The design tool may also provide a capability for graphical comparison and analysis of the resulting design solutions. Through use of the design tool, a user may quickly design and optimize a power supply configured to power a set of multiple loads and customized to the user's needs.

FIG. 1 illustrates an exemplary system 100 for determining power supply solutions for multiple power supply loads. As illustrated in FIG. 1 the exemplary system includes a user device 105 configured to provide a user interface 110 where the user interface 110 is configured to receive design requirements 130 relating to at least one input voltage source 115 and a plurality of loads 120 and display a set of power supply designs 125. The system 100 further includes a communications network 135 in selective communication with the user device 105 and an application site 140. The application site 140 includes a data store 145 configured to store component information 150. The application site 140 further includes an application server 155 configured to run a power supply design tool application 160. The power supply design tool application 160 may receive the design requirements 130, and may produce the set of power supply designs 125 responsive to the design requirements 130, relevant design heuristics 165 and optimization heuristics 170, as well as selected component information 150 from the data store 145. System 100 may take many different forms and include multiple and/or alternate components and facilities. While an exemplary system 100 is shown in FIG. 1, the exemplary components illustrated in Figure are not intended to be limiting. Indeed, additional or alternative components and/or implementations may be used.

The user device 105 may be a device configured to be operated by one or more users, such as a cellular telephone, laptop computer, tablet computing device, personal digital assistant, or desktop computer workstation, among others. The user device 105 may include one or more components capable of receiving input from a user, and providing output to the user.

The user interface 110 may be an interface configured to allow for the effective operation and control of the user device 105. The user interface 110 may further provide feedback and other output to the user to aid the user in making operational decisions with respect to the user device 105. Exemplary user interfaces 110 may include input devices such as keyboards, buttons, and microphones, and output devices such as display screens and loudspeakers. As a particular example, a user interface 110 may be implemented by way of one or more web pages displayed by the user device 105 by way of a web browser software program. Such a web-based user interface 110 may accept input from a user by way of one or more controls on a web page and may provide output by displaying web pages to the user including feedback or other outputs of the system 100. As another example, a user interface 110 may be implemented by way of a self contained rich internet application (RIA) utilizing an engine such as Adobe Flash, where the RIA may accept input from a user by way of one or more controls and provide output that may be viewed by the user on the user device 105.

An input voltage source 115 may be a device or system that produces or derives an electromotive force between its terminals. Input voltage sources 115 may be defined according to the voltage and maximum current draw they provide, and may further be defined according to a name to aid in identification. A load 120 may be an electrical or other circuit that requires electrical power to operate. Loads 120 may be defined as a required voltage and maximum current draw. Loads 120 may further be defined according to a name or other identifier to aid in their identification. A power supply may be a source of electrical power, and a power supply design 125 may be a circuit including various components that draw power from one or more input voltage sources 115 and supply electrical energy to at least one load 120.

The design requirements 130 may include information regarding a set of multiple loads 120 to be powered by one or more input voltage sources 115. The information may include minimum, maximum, and nominal input voltage, ambient temperature, maximum input current, and other design inputs about one or more input voltage sources 115. The information may also include details of the loads 120 to be powered, such as a required voltage, a required current, a name or other identifier, and other power supply attributes of the loads 120.

The communications network 135 may include a mixture of wired (e.g., fiber and copper) and wireless mechanisms that incorporate related infrastructure and accompanying network elements. Illustrative communication networks 135 may include the Internet, an intranet, the Public Switched Telephone Network (PSTN), and a cellular telephone network. The communications network 135 may include multiple interconnected networks and/or sub-networks that provide communications services, including data transfer and other network services to at least one user device 105 connected to the communications network 135.

The communications network 135 may be in selective communication with an application site 140. The application site 140 may be a hosting platform, such as a web hosting platform, configured to make applications available over the communications network 135. To perform the hosting functions, the application site 140 may include computing devices such as one or more data stores 145 and application servers 155.

The data store 145 may include one or more data storage mediums, devices, or configurations, and may employ various types, forms, and/or combinations of storage media, including but not limited to hard disk drives, flash drives, read-only memory, and random access memory. The data store 145 may include various technologies useful for storing and accessing any suitable type or form of electronic data, which may be referred to as content. Content may include computer-readable data in any form, including, but not limited to video, image, text, document, audio, audiovisual, metadata, and other types of files or data. Content may be stored in a relational format, such as via a relational database management system (RDBMS). As another example, content may be stored in a hierarchical or flat file system. In particular the data store 145 may store content including component information 150. Notably, the data store 145 maintains information with respect to individual components, not completed designs, solutions, or formulations.

The component information 150 may include information on the individual components, such as power supply regulators (switching regulators, low drop out regulators (LDOs), switched capacitors or other types of voltage regulators), capacitors, resistors, diodes, etc. Component information 150 may be received from manufacturers or suppliers in various forms, such as parts information sheets, parts catalogs, schematics, among others. The received component information 150 may be formatted and saved into the data store 145 for use in determining designs. Exemplary component information 150 may include part cost, whether the part is in stock, part dimensions and footprint, pin configuration, minimum and maximum ranges of operation, light output, heat sink requirements, efficiency information, graphs of various characteristics of operation, what manufacturers produce the component (or an equivalent component) and what suppliers or vendors supply the component, among other exemplary characteristics. The component information 150 includes information about the components themselves, not the components in combination with other components.

The application site 140 may further include an application server 155. The application server 155 may be implemented as a combination of hardware and software, and may include one or more software applications or processes for causing one or more computer processors to perform the operations of the application server 155 described herein.

A power supply design tool application 160 may be one application included on the application server 155, wherein the power supply design tool application 160 may be implemented at least in part by instructions stored on one or more computer-readable media. The power supply design tool application 160 may include instructions to cause the application server 155 to receive design requirements 130 indicating a set of multiple loads 120, query the data store 145 for component information 150 related to the design requirements 130, produce a set of power supply designs 125 responsive to the design requirements 130 and component information 150, and return the power supply designs 125 for further analysis and use.

The power supply design tool application 160 may utilize design heuristics 165 when determining the set of power supply designs 125 responsive to the design requirements 130. Design heuristics 165 may include rules related to the generation of different power supply architectures which may be appropriate to power the loads 120 specified by the design requirements 130. The design heuristics 165 may allow for the generation of a plurality of power supply architectures indicating potential arrangements of components between the one or more input voltage sources 115 and the plurality of loads 120 specified by the design requirements 130. For example, a design heuristic 165 may be utilized to determine intermediate rail voltages for possible power supply architectures. As another example, a design heuristic 165 may be utilized to break down the plurality of loads 120 specified by the design requirements 130 into one or more groups with smaller total currents.

The power supply design tool application 160 may utilize optimization heuristics 170 when determining the set of power supply designs 125 responsive to the design requirements 130. These optimizations may guide the determination of some or even all of the components 205 and supporting component of the power supply designs 125. Optimization heuristics 170 may be responsive to parameters indicative of tradeoffs between various design goals, and may be utilized to prefer one or more parameters over other parameters of a component or design. Design goals to be optimized by optimization heuristics 170 may include small component footprint, efficiency, cost, thermal dissipation, and power utilized, among others. As an example, an optimization heuristic 170 for designs with a smaller footprint may optimize for size by choosing components with relatively smaller footprints that still satisfy the design requirements 130, but at the expense of other parameters such as efficiency. As another example, an optimization heuristic 170 for designs with a higher efficiency may optimize by choosing components capable of being utilized at a relatively higher switching frequency while still satisfying the design requirements 130, but at the expense of other parameters such as cost. Optimization heuristics 170 may further be utilized by the power supply design tool application 160 to give preferred treatment to at least one component unrelated to its electrical or physical characteristics. The optimization heuristics 170 may be applied be a subset of components or even to all components. For example, an optimization heuristic 170 may prefer components from a particular manufacturer or supplier over those from another manufacturer or supplier.

Computer-executable instructions may be compiled or interpreted from computer programs created using a variety of well known programming languages and/or technologies, including, without limitation, and either alone or in combination, Java™, C, C++, Visual Basic, Java Script, Perl, PL/SQL, etc. The power supply design tool application 160 may accordingly be written at least in part according to a number of these and other programming languages and technologies, or a combination thereof.

In some instances, the power supply design tool application 160 is provided as software that when executed by a processor of the application server 155 provides the operations described herein. Alternatively, the power supply design tool application 160 may be provided as hardware or firmware, or combinations of software, hardware and/or firmware. An exemplary modularization of the power supply design tool application 160 is discussed in further detail below with respect to FIG. 4.

In general, computing systems and/or devices, such as user device 105, application server 155, and data store 145 may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices, such as data store 145 and application server 155 generally include computer-executable instructions, where the instructions may be executable by one or more computing devices such as those listed above. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores, such as such as data store 145 described herein, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

While FIG. 1 illustrates an exemplary system 100, other implementations may be used. In some implementations, the system 100 may be implemented as an off-line or self-contained computing device based configuration. In such an implementation, the application server 155 and power supply design tool application 160 may be implemented by a backend calculation engine running on the computing device. In some implementations, the power supply design tool application 160 may be executed by way of a self-contained RIA utilizing an engine such as Adobe Flash. For example, the RIA may be downloaded by a client from a server by way of a network such as the Internet or an intranet, and where most or substantially all of the calculations performed by the system 100 may be performed on the client using the RIA, without need to go back to the server again during a design session.

Further, additional elements may be included or elements shown in FIG. 1 may be omitted or modified. For example, one or more of the user device 105, data store 145, and application server 155 may be combined in certain implementations. As another example, a system may include multiple data stores 145 and/or application servers 155. In still further examples, power supply design tool application 160 may be implemented across multiple application servers 155. While communications network 135 is shown in the illustrated embodiment, in other embodiments the communications network 135 may be omitted entirely and the user device 105 may be connected directly to the application site 140. In still other examples, the power supply design tool application 160 may be executed in whole or in part by the user device 105.

Figure 2:
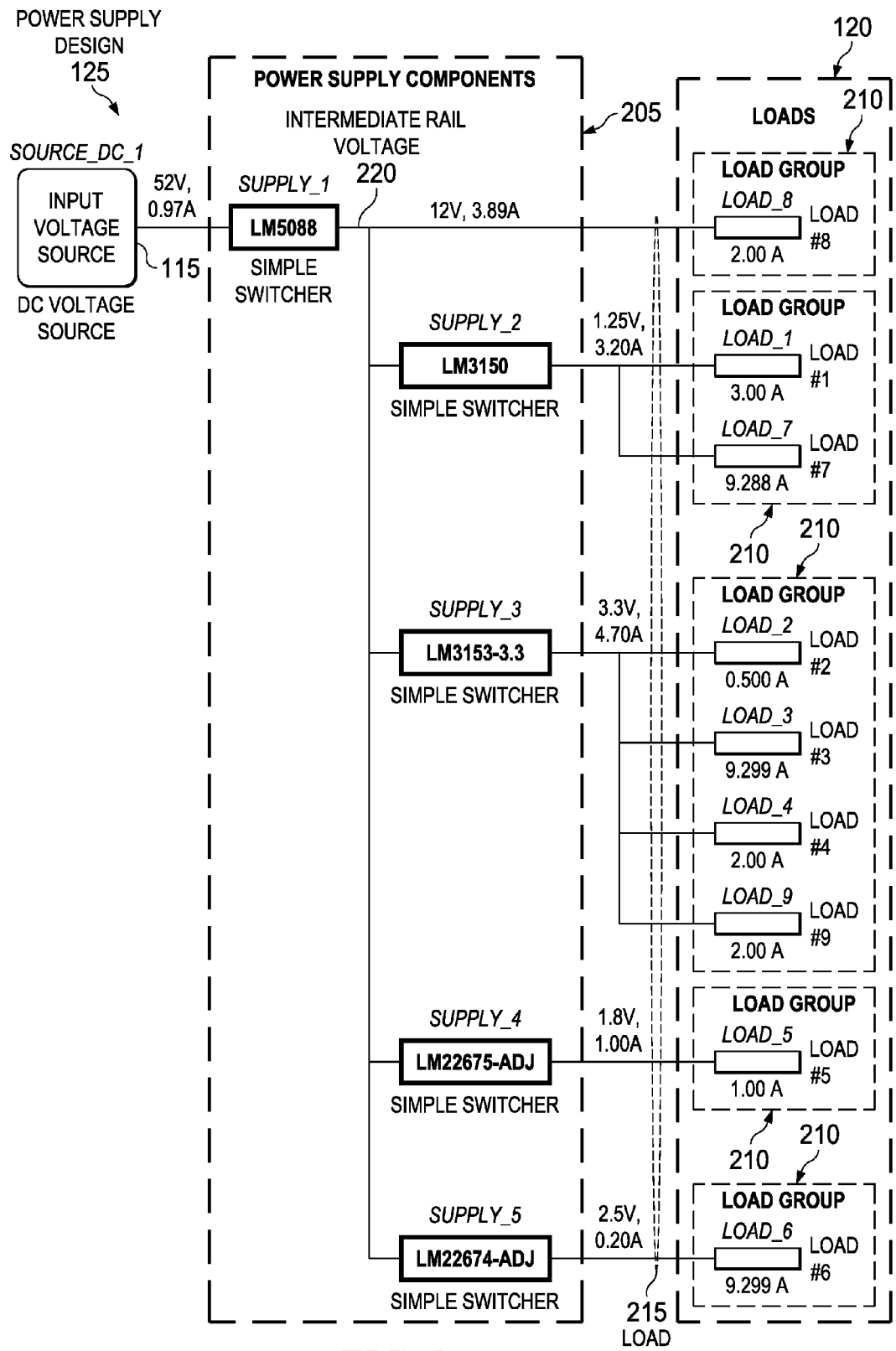
FIG. 2 illustrates an exemplary power supply design having multiple loads.

FIG. 2 illustrates an exemplary power supply design 125 that may be used to power an exemplary set of multiple loads 120. As shown in FIG. 2, the exemplary power supply design 125 is powered by a single input voltage source 115, and provides power to the following set of loads 120: a first load 120 requiring 1.25V at 3.2 A, a second load 120 requiring 3.3V at 0.5 A, a third load 120 requiring 3.3V at 0.2 A, a fourth load 120 requiring 3.3V at 2 A, a fifth load 120 requiring 1.8V at 1 A, a sixth load 120 requiring 2.5V at 0.2 A, a seventh load 120 requiring 1.25V at 3.2 A, an eighth load 120 requiring 12V at 3.91 A, and a ninth load 120 requiring 2.2V at 2 A. The power supply design 125 further illustrates the grouping of the multiple loads 120 into load groups 210, as well as the determined load requirements 215 for each load group 210 and intermediate rail voltage 220. It should be noted that the exemplary power supply design 125 is only one of many possible power supply designs 125 that may be used to power the illustrated multiple loads 120.

A power supply component 205 may be a component such as a switching regulator controller configured to provide a regulated output at a specified voltage and current. A power supply component 205 may accordingly provide a regulated output at the specified voltage for up to a maximum amount of current.

Because a power supply component 205 may provide a regulated output at a particular voltage, multiple loads 120 that share a common voltage may be grouped and accordingly powered from the same power supply component 205, provided that the power supply component 205 can supply the necessary current. A load group 210 is a grouping of one or more loads 120 according to common voltage. A load requirement 215 includes the requirements for the powering of a corresponding load group 210. For example, the load requirement 215 for a load group 210 may be determined according to the common voltage of the group and a sum of the currents of each load 120 of the load group 210.

For example, as shown in FIG. 2, the first load 120 requires 1.25V at 3 A and the seventh load 120 requires 1.25V at 0.2 A. These loads 120 may be grouped together into a load group 210 having a load requirement 215 of 1.25V at a combined current of 3.2 A. Load groups 210 may allow for the powering of multiple loads 120 by a single power supply component 205, thus reducing in the total number of required power supply components 205 for a power supply architecture 305. Further details regarding load groups 210 and load requirements 215 are discussed in detail below.

An intermediate rail voltage 220 may provide an intermediate voltage level between an input voltage source 115 and an output voltage to power a load 120 or load group 210. The intermediate rail voltage 220 may be used as an input to a power supply component 205 configured to produce an output for one or more of the loads 120 or load groups 210. An intermediate rail voltage 220 may be produced by way of a power supply component 205 configured to power the intermediate voltage level. Intermediate rail voltages 220 may require additional power supply components 205 to produce the intermediate rail voltages 220. However, the use of intermediate rail voltages 220 may allow for the use of more efficient, lower power, or lower cost power supply components 205 to supply the loads 120, where these power supply components 205 may not be usable or as efficient they were connected to the input voltage source 115 directly. Further details regarding intermediate rail voltages 220 are discussed in detail below.

The exemplary power supply design 125 includes an LM5088 power supply component 205 configured to generate a 12V intermediate rail voltage 220 and also to power the eighth load 120. The power supply design 125 further includes an LM3150 power supply component 205 configured to supply 1.25V to a load group 210 including the first and seventh loads 120 and drawing from the 12V intermediate rail voltage 220. The power supply design 125 further includes an LM3153-3.3 power supply component 205 configured to supply 3.3V to a load group 210 including the second, third, fourth, and ninth loads 120, also drawing from the 12V intermediate rail voltage 220. The power supply design 125 further includes an LM22675-ADJ power supply component 205 configured to supply 1.8V to the fifth load 120, also drawing from the 12V intermediate rail voltage 220. The power supply design 125 further includes an LM22674-ADJ power supply component 205 configured to supply 2.5V to the sixth load 120, also drawing from the 12V intermediate rail voltage 220.

It should be noted that the power supply design 125 illustrated in FIG. 2 is merely exemplary, and other power supply designs 125 configured to power the same or different sets of loads 120 are possible. For example, one or more of the power supply components 205 providing power to the multiple loads 120 may be powered from the input voltage source 115 directly, without making use of any intermediate rail voltages 220. As another example, more or fewer loads 120 may be powered by the intermediate rail voltages 220. As yet a further example, an intermediate rail voltage 220 may power another intermediate rail voltages 220, which in turn power one or more power supply components 205 providing power to one or more loads 120. Accordingly, in some examples a load requirement 215 may be a requirement for a power supply component 205 to supply power to one or more intermediate rail voltages 220 as well as to one or more loads 120 or load groups 210.

Figure 3:
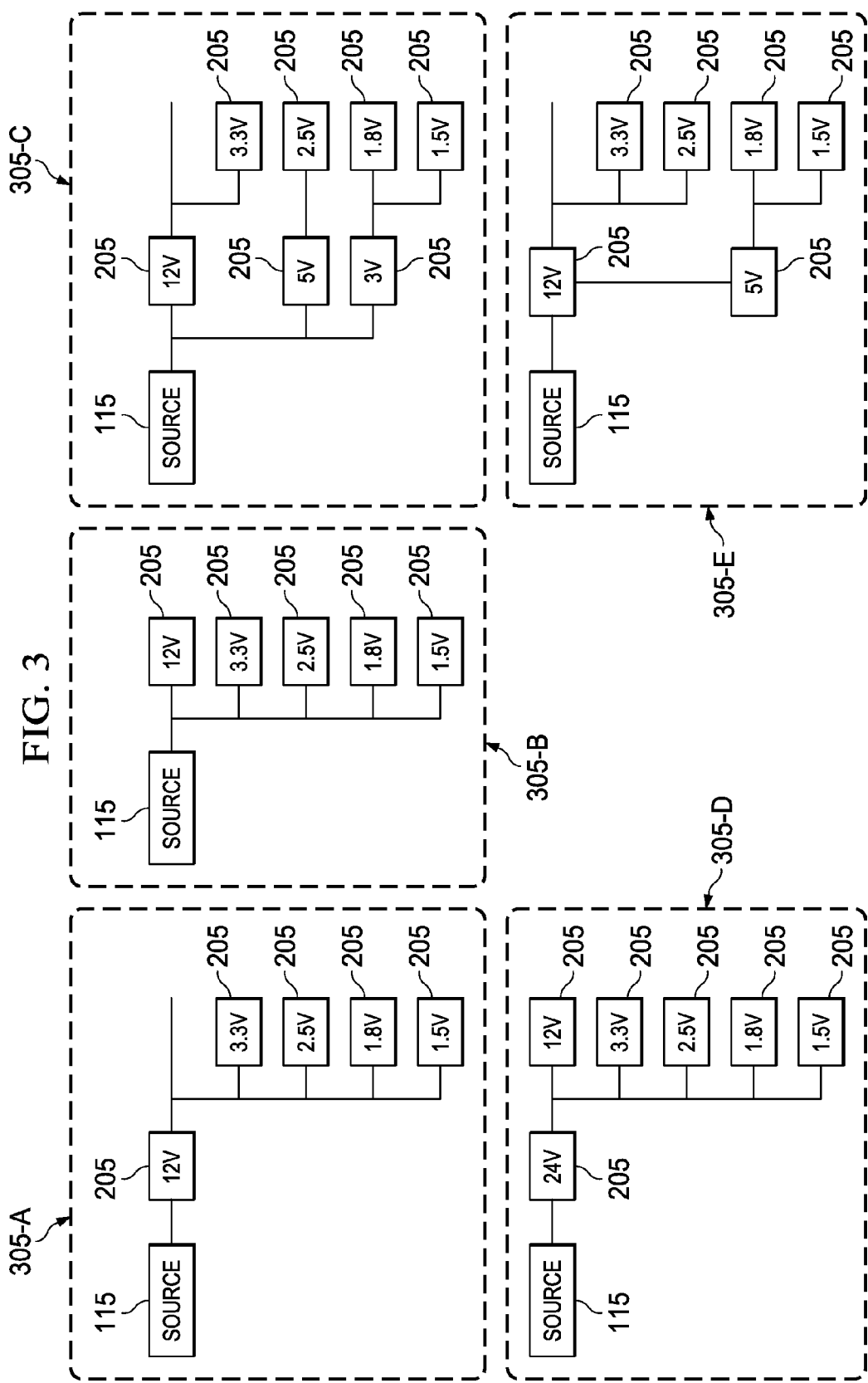
FIG. 3 illustrates five exemplary power supply architectures that may be used to power a set of multiple loads.

FIG. 3 illustrates five exemplary power supply architectures 305-A through 305-E that may be used to power the same set of loads 120 discussed above with respect to FIG. 2. The power supply architecture 305-A illustrates an exemplary power supply design 125 from which a power supply designs 125 such as the one shown in FIG. 2 may be constructed. Additionally, FIG. 3 further illustrates several additional power supply architectures 305-B through 305-E that may also be used to produce power supply designs 125 that power the multiple loads 120. For example, power supply designs 125 may be created according to power supply architecture 305-B having no intermediate rail voltage 220, power supply architecture 305-C having 3V, 5V, and 12V intermediate rail voltages 220, power supply architecture 305-D having a 24V intermediate rail voltage 220, and power supply architecture 305-E having 5V and 12V intermediate rail voltages 220.

Figure 4:
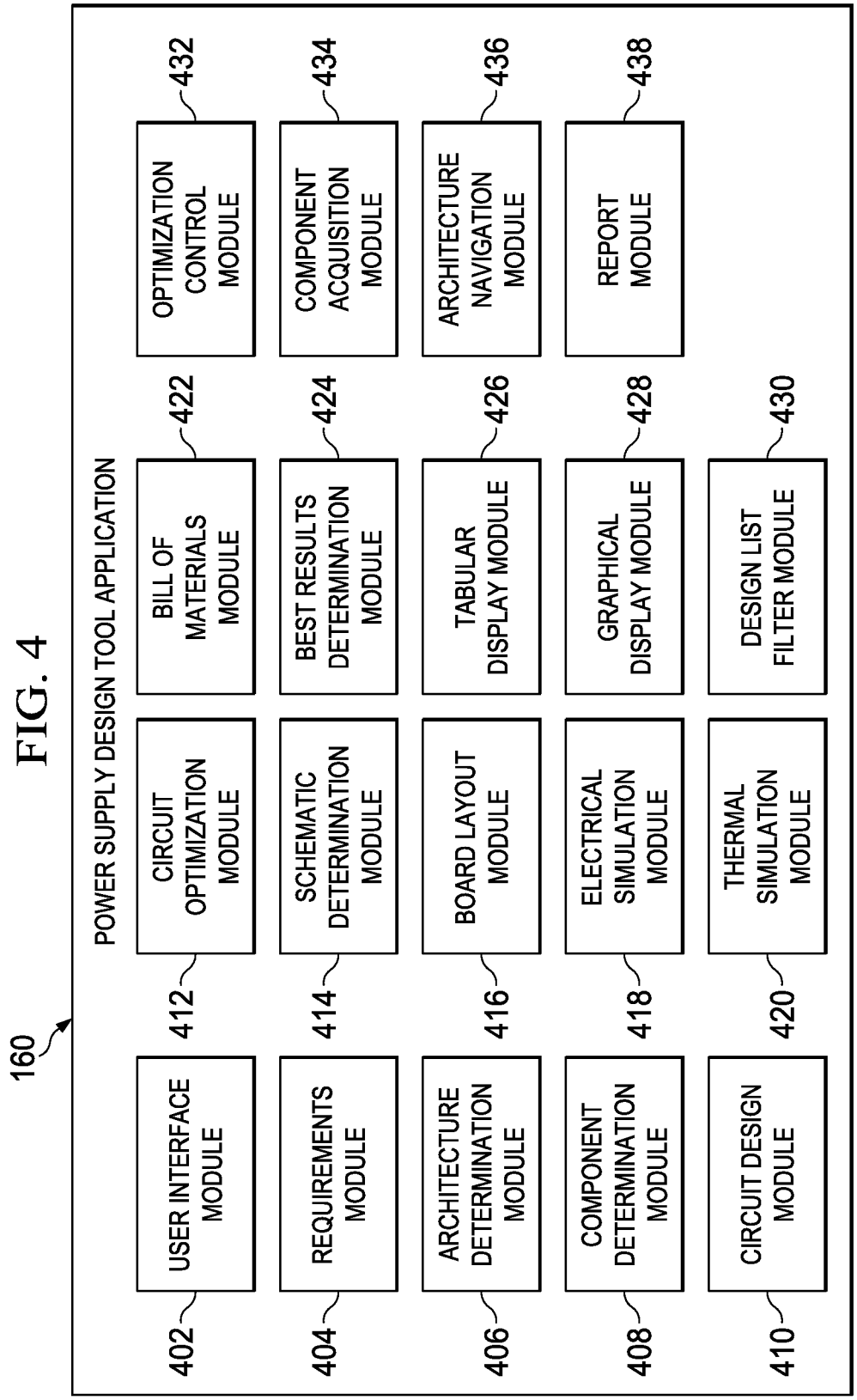
FIG. 4 illustrates an exemplary modularization of a power supply architecture design tool application.

FIG. 4 illustrates an exemplary modularization of the power supply design tool application 160. As shown in the Figure, the power supply design tool application 160 may include a user interface module 402, requirements module 404, an architecture determination module 406, a component determination module 408, a circuit design module 410, a circuit optimization module 412, a schematic determination module 414, a board layout module 416, an electrical simulation module 418, a thermal simulation module 420, a bill of materials module 422, a best results determination module 424, a tabular display module 426, a graphical display module 428, a design list filter module 430, an optimization control module 432, a component acquisition module 434, an architecture navigation module 436, and a report module 438. Although only one example of the modularization of the power supply design tool application 160 is illustrated and described, it should be understood that the operations thereof may be provided by fewer, greater, or differently named modules.

The user interface module 402 may be configured to provide the user interface 110 to be displayed by way of the user device 105. For example, the user interface module 402 may be implemented by way of one or more web pages configured to accept the design requirements 130 from a user and provide output to the user including power supply designs 125. The user interface module 402 may be implemented using technologies such as Java, AJAX, Adobe Flex, Adobe Flash, Microsoft.NET, among others. The user interface module 402 may be configured to generate web pages via the application server 155 to be transmitted to the user device 105 via the communications network 135. These web pages may then be viewed by the user on the user device 105 using a web browser program.

Exemplary user interfaces 110 allowing for the specification of design requirements 130 and the viewing of power supply designs 125 are illustrated with respect to FIGS. 6-12 described below. It should be noted that the while specific user interfaces 110 are illustrated in the exemplary Figures, the particular user interfaces 110 presented by the power supply architecture design tool application 160 and the user interface module 402 may vary from implementation to implementation.

The requirements module 404 may be configured to utilize the user interface module 402 to allow the user of the user device 105 to specify design requirements 130 for the power supply designs 125. For example, the requirements module 404 may cause the user interface module 402 to generate web pages configured for receiving the design requirements 130.

The requirements module 404 may be configured to allow a user to specify design requirements 130 including one or more input voltage sources 115. For example, a user may provide minimum, maximum, and nominal input voltage, ambient temperate, maximum input current and/or other critical design inputs about the input voltage source 115. The user may add additional input voltage sources 115 to the design requirements 130 if desired.

The requirements module 404 may further be configured to allow a user to specify design requirements 130 including a set of loads 120 to be provided power by the power supply design 125. For example, the user may provide voltage, current, name and other power supply attributes for multiple loads 120. In some examples, the requirements module 404 may allow for the import or upload of data regarding a set of multiple loads 120 from an input file, such as a text file or spreadsheet. One or more loads 120 may be assigned to a specific input voltage source 115 by a user if desired, or the loads 120 may be automatically assigned to input voltage sources 115.

The architecture determination module 406 may determine a variety of different power supply architectures 305 that may be appropriate to power the loads 120, based on one or more design heuristics 165 of the system 100. The architecture determination module 406 may selectively group the loads 120 into load groups 210 sharing common supplies, determine potential intermediate rail voltages 220, define load requirements 215 for each of the load groups 210 and intermediate rail voltages 220, and construct power supply architectures 305 based on at least a subset of the design requirements 130, loads 120, load groups 210, load requirements 215, and potential intermediate rail voltages 220. Based on the groupings and arrangements, the architecture determination module 406 may define one or more positions into which power supply components 205 are to be included, as well as load requirements 215 for each of the positions.

Based on one or more design heuristics 165 of the system 100, the architecture determination module 406 may selectively combine loads 120 specified by the design requirements 130 into load groups 210, where the grouped loads 120 in the load group 210 may utilize a common power supply. As an example, one or more system 100 design heuristics 165 may specify for the architecture determination module 406 to group loads 120 with the same voltage together on a common power supply. The architecture determination module 406 may accordingly determine a load requirement 215 for each load group 210 by summing the current requirements for each of the loads 120 in the load group 210. However, the design requirements 130 may specify that a load 120 requires a unique supply, in which case that load 120 would not be grouped with other loads 120 on a common supply.

To aid in the determination of whether to group loads 120 into load groups 210, the one or more design heuristics 165 of the system 100 may specify a threshold current value above which it would be less likely to find a suitable power supply component 205 for a power supply design 125. Accordingly, if a load group 210 results in a sum of the load 120 currents being above the threshold value, the architecture determination module 406 may break the loads 120 down into two or more load groups 210, each with a smaller total current, to allow for a greater number of possible power supply components 205 to be available to provide power to the load groups 210.

The architecture determination module 406 may accordingly determine load requirements 215 for each position in a power supply architecture 305 based at least in part on the summed currents for each load group 210.

Based on one or more design heuristics 165, the architecture determination module 406 may calculate one or more potential intermediate rail voltages 220. Using the calculated intermediate rail voltages 220, the architecture determination module 406 may generate various power supply architectures 305 having zero or more of the potential intermediate rail voltages 220. For example, FIG. 3 discussed above illustrates exemplary set of power supply architectures 305 capable of powering the same set of loads 120, where each exemplary power architecture 305-A through 305-E has a different configuration of intermediate rail voltages 220. Accordingly, power supply architectures 305 including various intermediate rail voltages 220 may allow for the generation of power supply designs 125 having different characteristics and tradeoffs.

An example of a design heuristic 165 that may be utilized to calculate power supply architectures 305 having intermediate rail voltage 220 may be to calculate appropriate intermediate rail voltage 220 according to the duty cycle of downstream regulators, targeting low, medium, and high duty cycle for the downstream supplies.

Another example of a design heuristic 165 that may be used to calculate power supply architectures 305 having intermediate rail voltage 220 may be to set different percentages of the difference between the input voltage source 115 and the loads 120 or load groups 210. Exemplary percentages for intermediate rail voltage 220 may include 75%, 50%, and/or 25% of the voltage of an intermediate rail voltage 220. For instance, if an input voltage source 115 is 50V, and one of the loads 120 requires a 10V supply, then possible power supply architectures 305 may include 40V, 30V, or 20V intermediate rail voltage 220 (i.e., 75%, 50%, and 25% of the 40V difference between the 50V input voltage and the 10V load voltage).

Using the calculated intermediate rail voltage 220, the architecture determination module 406 may generate various power supply architectures 305 by utilizing various combinations of the intermediate rail voltages 220. Using one of the combinations of zero or more intermediate rail voltages 220, the architecture determination module 406 may start at each load 120, or load group 210, and may sum up the currents or use the summed current from a corresponding load requirement 215. Then for each load 120 or group of loads 120, the architecture determination module 406 may determine to use the voltage of an intermediate rail voltage 220, if it exists, whose voltage is above that of a particular load 120. If no intermediate rail voltage 220 is present, then the architecture determination module 406 may utilize the input voltage source 115 as the input voltage for the supply for the load 120. In some instances, architecture determination module 406 may further determine whether or not to use the voltage of an intermediate rail voltage 220 if it can support the total current required and/or if the total required current is below a threshold value. Thus, the architecture determination module 406 may determine a power supply architecture 305 for the combination of zero or more intermediate rail voltages 220.

For each position in the determined power supply architecture 305, the architecture determination module 406 may further determine a load requirement 215 (e.g., voltage and current) for power supply components 205 that may fill the position. For example, a load requirement 215 for a position may be a requirement for a power supply component 205 to supply power to one or more loads 120. As another example, a load requirement 215 for a position may be a requirement for a power supply component 205 to supply power to an intermediate rail voltage 220. As yet another example, a load requirement 215 for a position may be a requirement for a power supply component 205 to supply power to one or more intermediate rail voltages 220 as well as to one or more loads 120.

The architecture determination module 406 may determine a plurality of potential power supply architectures 305 according to different combinations of input voltage sources 115 and intermediate rail voltages 220 with the loads 120 specified by the design requirements 130. Each of the determined power supply architectures 305 may accordingly include one or more positions at which a power supply component 205 may be required. In some instances, a design heuristic 165 indicates a maximum number of power supply architectures 305 to be determined by the architecture determination module 406.

Referring back to FIG. 2, there are five positions in which a power supply component 205 may be required, four of which provide power to loads 120 directly, and one of which also provides an intermediate rail voltage 220. Because the group of 1.25V volt supplies includes a load requiring 3 A and a load requiring 0.2 A, the power supply component 205 for the 1.25V position labeled "Supply_2" has a load requirement of 1.25V at 3.2 A. Similarly, the group of 3.3V loads at the position labeled "Supply_3" has a load requirement of 3.3V at 4.7 A. Additional exemplary power supply architectures 305 are shown in FIG. 3 as well, including power supply architecture 305-B with five positions in which a power supply component 205 may be required and no intermediate rail voltages 220, and power supply architecture 305-C having seven positions in which a power supply component 205 may be required and three intermediate rail voltages 220.

The component determination module 408 may be configured to determine one or more power supply components 205 that could be used to build circuits for a given power supply architecture 305. For instance, for each of the potential power supply architectures 305 determined by the architecture determination module 406, the component determination module 408 may determine power supply components 205 to provide power to one or more loads 120, load groups 210, and/or intermediate rail voltages 220.

More specifically, the component determination module 408 may determine a power supply component 205 that could satisfy the load requirements 215 for a particular position by applying filters to component information 150 stored in data store 145. The load requirements 215 may include output voltage and output current fields based on the grouped design requirements 130 for the loads 120. The filters may compare values specified in the load requirements 215 against values in corresponding information in the component information 150.

As another example, the component determination module 408 may utilize values from the load requirements 215 as inputs to one or more design heuristics 165, where the outputs of the one or more design heuristics 165 may be used to determine which power supply components 205 could potentially satisfy the load requirements 215 for a particular position. For instance, when designing a boost regulator circuit, a design heuristic 165 may be used to determine which power supply components 205 used in boost regulators may meet the switch current requirements implicit in the load requirements 215 for a particular position. Accordingly, to determine which power supply components 205 may be used in that position, the input voltage, output voltage and output current specified for the position may be used to calculate a required switch current rating, where the required switch current rating is compared against the switch current ratings in the component information 150 stored in data store 145 to select only those power supply components 205 that can satisfy the requirements for the position.

As yet a further example, the component determination module 408 may filter components to include only components from preferred vendors, manufacturers, or suppliers.

Thus, for each position in the power supply architecture 305 in which a power supply components 205 would be required, a list of possible power supply components 205 for each position in the power supply architecture 305 may be determined. For example, as shown in FIG. 2, an LM3150 power supply component 205 may be used to meet the load requirements 215 for the position labeled "Supply_2," and an LM3153-3.3 power supply component 205 may be used to meet the load requirements 215 for the position labeled "Supply_3." In some examples, the component determination module 408 may further maintain a list of reasons for the exclusion of power supply components 205 that may be unsuitable for use in a particular position, so that a user may be informed why a particular power supply component 205 is not indicated as being available for use.

A circuit may contain many more supporting components in addition to a particular power supply component 205 that may be used to satisfy at least a subset of the design requirements 130. Based on the determined power supply components 205, the circuit design module 410 may be utilized to determine the supporting components, or parameters and bounds for the supporting components. The circuit design module 410 may further be configured to determine a circuit topology indicating how those additional supporting components may be arranged to create the circuit with the power supply components 205.

The circuit design module 410 may utilize design heuristics 165 and including various rules and mathematical formulas to select adequate values for the additional components. For example, if the design requirements 130 indicate that a load 120 is to be provided a minimal output voltage ripple, a design heuristic 165 may indicate that a larger output capacitor value may be chosen as a supporting component. As another example, if the design requirements 130 indicate that a power supply may be required to withstand sudden change in input voltage (i.e., transient response) then a design heuristic 165 may indicate that a smaller output capacitor value may be chosen as a supporting component.

In some instances, rather than determine a particular value for a supporting component, the circuit design module 410 may instead utilize design heuristics 165 determine a range of potential values for an additional component of the circuit. For example, for a certain design, an output capacitor must have a capacitance greater than or equal to 100 µF and an equivalent series resistance of less than or equal to 100 mΩ. These rules may then be used by the circuit design module 410 to select supporting components from the parts described in the component information 150 of the data store 145.

The circuit optimization module 412 may be configured to aid in the determination of power supply components 205 and supporting components. For example, the circuit optimization module 412 may determine supporting components that satisfy the range of potential values determined by the circuit design module 410, while also accounting for design preferences indicated in the design requirements 130 through use of optimization heuristics 170. These optimizations and design preferences may accordingly guide the determination of some or even all of the components 205 and supporting components of the power supply designs 125.

Parameters of a component part may be determined based on the component information 150 stored in the data store 145. Accordingly, selection of component parts for a design may be based on an algorithm in which a target value is set for the parameters of the component part. The closer a component parameter is to a target value, the higher the score for that parameter. A weight may also be assigned to each parameter of a component. Thus, a final score for each component may be determined based on the initial score and the weight (e.g., determined as a product of the initial score and the weight). If two parameters with a same deviation from a target value have different weights, the one with a higher weight would receive a higher overall score. This weighted scoring algorithm allows selection of components taking into account multiple parameters at once, keeping a balance between important characteristic factors of the component part such as footprint, parasitic resistance, capacitance, and inductance.

As an example, a design requirement 130 may indicate a preference for power supply designs 125 having high efficiency or low voltage ripple. Accordingly, an optimization heuristic 170 may set a low target for an equivalent series resistance (ESR) parameter of an output capacitor to reduce power dissipation and/or ripple. An optimization heuristic 170 may further set a high weighting for the ESR parameter in relation to other parameters. Using these optimization heuristics 170, capacitors with low ESR would typically achieve higher scores than capacitors with higher ESR, giving the resultant designs improved efficiency.

The optimization heuristics 170 may further allow consideration of other parameters, such as size, capacitance, price, vendor, supplier, manufacturer and part availability in order to determine an overall score for a component. As an example, design requirements 130 may indicate a preference for designs having high efficiency, low cost, and parts that are in stock. Accordingly, one or more optimization heuristics 170 may place a relatively higher weight on a part being in stock at a fulfillment warehouse, a relatively higher weight on a part having a low price, and a relatively higher weight on a part having a low ESR. In such an example, a capacitor having a low ESR, but being out of stock at the fulfillment warehouse and having a high price may receive a lower overall score than a part one that is in stock, less expensive, but with a higher ESR.

In some instances, one or more of the architecture determination module 406, the component determination module 408, the circuit design module 410, and the circuit optimization module 412 may utilize a cutoff to generate up to a maximum number of power supply designs 125. This cutoff may indicate a maximum total number of power supply designs 125 to include in the universe of possible solutions. In other instances, a cutoff may indicate a maximum number of power supply designs 125 per power supply architecture 305.

The schematic determination module 414 may be configured to produce a schematic diagram including the particular power supply components 205 and supporting components determined by the component determination module 408, circuit design module 410, and circuit optimization module 412. An exemplary schematic determination module 414 may be the schematic generator included in the WEBENCH Power Designer provided by National Semiconductor. In some examples, the schematic determination module 414 may be configured to generate a schematic that may be displayed to a user in a user interface 110 on a web page, by way of the user interface module 402.

For example, the schematic determination module 414 may be configured to draw an electrical schematic by way of the user interface module 402, using vector-based drawing techniques within a web browser application executed by a user device 105. The electrical schematic may show wires and components such as voltage regulator devices and capacitors. In some examples, the schematic determination module 414 may be configured to provide a scale adjustment to allow for a user to adjust the scale at while a schematic is drawn, and zoom in and out of the schematic.

The schematic determination module 414 may further be configured to draw feature blocks that represent collections of components in an included electrical schematic or sub-circuit, rather than drawing each individual component of a sub-circuit. For example, each position in a power supply architecture 305 into which a power supply component 205 is included may be represented as a feature block in the schematic, rather than as a full schematic indicating each supporting component of the power supply component 205. As some further examples, a feature block may represent a sub-circuit configured to create an intermediate rail voltage 220, a sub-circuit configured to provide a power output to a load 120 from an intermediate rail voltage 220, or a sub-circuit configured to provide a power output to a load 120 from an input voltage source 115 directly.

In some instances, the schematic determination module 414 may be configured such that each sub-circuit configured to provide an intermediate rail voltage 220 and/or a power output for a load 120 may be represented as feature block in the electrical schematic. A schematic including such feature blocks would accordingly allow for a higher-level representation of the power supply design 125 to be displayed. The schematic determination module 414 may further be configured to display the corresponding sub-circuit for a feature block upon indication by the user. In some instances, it may be possible for a hierarchy to be created in which feature blocks include sub-circuits that in turn also have included feature blocks including their own sub-circuits.

The schematic determination module 414 may be configured to provide a level-of-detail adjustment to allow for a user to adjust the level of detail at while a schematic is drawn. For example, at a higher level of detail, some or all levels sub-circuits may be represented as their individual components, while at a lower level of detail, a greater number or level of sub-circuits may be represented as feature blocks.

The schematic determination module 414 may further be configured to allow for the selective editing of various components or wires of a schematic diagram, and the schematic determination module 414 may visually indicate which components and/or wires in the schematics may be modifiable. For example, components that are modifiable may be illustrated in color, while components that are non-modifiable may be presented in a black-and-white format. As another example, components that are modifiable may be presented accompanied by a particular graphic.

For components that are indicated as being editable, the schematic determination module 414 may allow for the user to substitute another component for the indicated component. Additionally, one or more ends of a wire included in the schematic may be capable of being moved by a user to allow for additional customization of the schematic.

The board layout module 416 may be configured to create a printed circuit board (PCB) layout according to a determined schematic, such as an electrical schematic determined by the schematic determination module 414. The board layout module 416 may determine an appropriate PCB layout according to various parameters, including the topology the circuit, the IC selected, the size of the selected components, whether the design requires a large amount of copper to dissipate heat or a heat sink to dissipate heat, and the like.

In some examples, the board layout module 416 may be configured to receive an indication of a size of a board on which to layout the components. For instance, the board layout module 416 may provide controls, by way of user interface module 402, to allow for user specification of one or more of PCB width, PCB height, and PCB mounting depth. In other examples, the board layout module 416 may automatically determine where the components are placed on a printed circuit board and delete the portions of the board not used by the components. Thus, the board layout module 416 may be configured to automatically crop the PCB layout based on the components used in the circuit.

In some examples, the board layout module 416 may be configured to determine a PCB layout according to a predetermined landing area approach. In such an approach, a PCB layout of the design is created with a mount for a particular integrated circuit (such as an LM2678 semiconductor) and also with landing pads for various supporting components to be used with the particular IC. The landing pads may be designed to accommodate a variety of combinations of supporting components, which vary in size and shape, by creating the landing pads for the supporting components large enough and spaced closely enough to accommodate different sizes of components that may potentially be used with the IC. Thus, a single PCB board may be used to accommodate many different schematics, having various sizes and varieties of surface mount components.

The electrical simulation module 418 may be configured to allow for an electrical simulation of an electrical schematic, allowing for a user to observe the performance of the circuit under simulated operating conditions. An exemplary electrical simulation module 418 may be the circuit simulation functionality included in the WEBENCH Power Designer provided by National Semiconductor. For example, the electrical simulation module 418 may be utilized to determine an electrical efficiency of a power supply design 125.

The thermal simulation module 420 may be configured to identify heat problems on a PCB early on in the design process and correct the issues before a PCB goes into production. Early diagnosis of a thermal issue may save a time and avoid costly quality accidents. The thermal simulation module 420 may be configured to simulate the thermal behavior of an electronic PCB having various components. The thermal simulation module 420 may use thermal models for components to aid in the analysis. For PCBs that are laid out using a standard PCB layout, the thermal simulation module 420 may further utilize a thermal model for the standard PCB layout.

Based on the PCB and components, the thermal simulation module 420 may utilize a conduction, radiation and convection solver. For instance, the thermal simulation module 420 may utilize the WebTHERM module provided by Flomerics, Inc. to conduct the thermal simulations. The output of the thermal simulation may be illustrated graphically by way of the user interface module 402, such as by a plot of the PCB under the design's steady state electrical load 120 conditions, illustrating an estimate of the generated heat.

The bill of materials module 422 may be configured to determine a bill of materials (BOM) including the list of parts used for each of the power supply designs 125. The bill of materials module 422 may further determine a total cost of the design and a total number of components for the design. For example, the bill of materials module 422 may query the data store 145 for component information 150 related to pricing of the utilized components, and may determine an overall cost of the power supply design 125 based on a total sum of the cost of each utilized component.

In some examples, the bill of materials module 422 may be configured to prefer components from particular vendors, suppliers, manufacturers over other components. As one possibility, the bill of materials module 422 may list components only from a preferred vendor whenever possible.

The best results determination module 424 may be utilized to determine one or more best results from a set of power supply designs 125. For instance, the best results determination module 424 may determine a ranking of the individual designs in the set of power supply designs 125. The best results determination module 424 may determine the ordering and recommended designs by using a weighted scoring system. As an example, a design requirement 130 may indicate a preference for power supply designs 125 having high efficiency. Accordingly, based on the design requirement 130, the best results determination module 424 may rank the power supply designs 125 according to electrical efficiency for the overall power supply designs 125, where the overall efficiencies may be determined by the electrical simulation module 418.

The best results determination module 424 may determine the ordering while accounting for multiple variables simultaneously. Similar to as discussed above with regard to component selection, the best results ordering may use an algorithm in which a target value is set for one or more parameters of a power supply design 125. The closer a parameter of the power supply design 125 is to the corresponding target, the higher the score for that parameter. A weight may also be assigned to each parameter. Thus, a final score for each power supply design 125 may be determined based on the initial score and the weight (e.g., as a product of the score and weight values). For example, if two parameters with a same deviation from a target value have different weights, the one with the higher weight would receive a higher overall score. This weighted scoring algorithm allows ordering of power supply designs 125 taking into account multiple parameters at once, keeping a balance between important characteristic factors of the component part such as footprint, parasitic resistance, capacitance, and inductance.

The best results determination module 424 may utilize a cutoff to provide up to a maximum number of power supply designs 125. In some instances, a cutoff may indicate a maximum total number of power supply designs 125 to include in the universe of possible solutions. In other instances, a cutoff may indicate a maximum number of power supply designs 125 per power supply architecture 305.

The best results determination module 424 may indicate the power supply design 125 having the best ranking as being the recommended design. Further, the power supply design 125 out of a set of power supply designs 125 for one particular power supply architecture 305 may be indicated as being the recommended design for that power supply architecture 305.

The tabular display module 426 may be configured to display a list of the determined power supply designs 125 by way of the user interface module 402. For example, the tabular display module 426 may present a use interface including a table of power supply designs 125 with key parameters displayed, with each row in the table indicating a particular power supply design 125 and associated values and key parameters. Key parameters may include system footprint determined by the board layout module 416, system BOM cost and system component count determined by the bill of materials module 422, system efficiency determined by the electrical simulation module 418, among others.

The values in the table may be arranged according to the ranking determined by the best results determination module 424. For examples, values in the table may be arranged with the best recommendations at the top of a sortable list. As an example, a design requirement 130 may indicate a preference for designs having high efficiency. Accordingly, based on ranking determined by the best results determination module 424, the power supply designs 125 may be displayed in order according to electrical efficiency.

The graphical display module 428 may be configured to provide a graph of the determined power supply designs 125 by way of the user interface module 402. The graphical display module 428 may represent the tradeoffs between the various power supply designs 125 by representing various key parameters as the X and Y axes of the graph. The graphical display module 428 may further represent the points within the graph as items of varying size and/or color to indicate a third key parameter as a third dimension. Thus, the graph can contain more than two dimensions by using circles of different diameters for each data point to signify larger or smaller values and/or different colors to represent differences in the values being plotted.

As an example, the axes may default to system footprint and system efficiency, with a circle around each data point of variable size to represent the BOM cost. The size of the circle may accordingly vary in size to become larger for a higher BOM cost and smaller for a lower BOM cost. The graphical display module 428 may be configured to allow a user to configure the axes of the graph, allowing the user to visualize other parameters in the design such as the $V_{out}$ peak to peak ripple, frequency, BOM count, among others.

The design list filter module 430 may be configured to allow for the filtering of the determined power supply designs 125 displayed by the tabular display module 426 and graphical display module 428. For example, the design list filter module 430 may provide slider controls, check boxes and other controls by way of the user interface module 402 that may be used to specify filter criteria for the displayed power supply designs 125. These controls may allow a user of the user device 105 to narrow down the list of power supply designs 125 according to the specified filter criteria. Because the filtering is performed based on the determined set of power supply designs 125 that form the universe of possible solutions, filtering of the power supply designs 125 may be performed by the user device 105 without requiring any additional database access or interaction with the data store 145.

Exemplary filter criteria may include minimum and maximum efficiency, minimum and maximum footprint, minimum and maximum BOM cost, minimum and maximum BOM count, minimum and maximum ripple, minimum and maximum switching frequency, minimum and maximum crossover frequency, and minimum and maximum phase angle. Further exemplary filter criteria may include additional features that may be present on a utilized power supply component 205 package, such as: on/off pin, error pin, soft start, external synchronization, module, adjustable primary leakage inductance limit, adjustable frequency, synchronized switching, controller, and integrated switch. Still further filter criteria may include component vendor, supplier or manufacturer.

The optimization control module 432 may be configured to allow a user to specify system level goals such as small footprint, low cost, or high efficiency. The optimization control module 432 may utilize the user interface module 402 to present a control, such as a knob, to a user device 105, and may receive input from the user from the control. The control may allow the user to select a tradeoff indicating a preference for at least one key parameter over a preference for at least one other key parameter. For example, the control may allow the user to prefer designs with small footprint over designs with high efficiency.

In some instances, based on the input from the control, the optimization control module 432 may be configured to cause the power supply design tool application 160 to calculate additional power supply designs 125 containing power supplies optimized according to the new system level goals indicated by the user. These additional power supply designs 125 may then be added to power supply designs 125.

In other instances, the power supply design tool application 160 may be configured to pre-calculate power supply designs 125 optimized according to each of the potential system level goals or sets of optimizations settings that may be indicated by the user. Then, based on the input from the control, the optimization control module 432 may be configured to cause the power supply design tool application 160 to filter the displayed power supply designs 125 according to the particular optimization settings chosen by the user by way of the optimization control module 432. By performing the filtering based on the pre-calculated power supply designs 125 optimized according to various optimizations settings, the filtering may be performed by the user device 105 without requiring any additional database access or interaction with the data store 145.

An exemplary optimization control module 432 may present a knob providing for selection of one of the following sets of optimizations to use as the system design goals: a first optimization with the goals of smallest possible footprint accomplished through use of the highest possible switching frequencies; a second optimization with the goals of lowest possible cost with frequency pushed higher for smaller components; a third optimization with the goals of a balance of efficiency, footprint, low complexity, and cost; a fourth optimization with the goals of lowest possible cost with frequency pushed lower for increased efficiency; and a fifth optimization with the goals of highest possible efficiency, largest components.

The component acquisition module 434 may be configured to allow a user to purchase the list of parts used in a selected power supply design 125. Using the BOM for a power supply design 125, the component acquisition module 434 may be configured to confirm whether the parts are in stock by querying the component information 150 stored in data store 145. If the parts are determined to be in stock, the component acquisition module 434 may allow the user to purchase a set of parts for building all or a portion of the power supply design 125. The component acquisition module 434 may further be configured to provide assembly instructions for the board that shows the locations of all the components, soldering instructions, an electrical schematic, top-side and bottom-side copper layout diagrams, instructions for building and testing the circuit. In some examples, the component acquisition module 434 may provide an option for the user to receive an assembled version of the power supply design 125. In some examples, the component acquisition module 434 may prefer to order components from preferred vendors, suppliers or manufacturers.

The architecture navigation module 436 may be configured to allow for navigation of the electrical schematic, such as the schematic determined by the schematic determination module 414. Upon selection of one of the power supply designs 125, such as through use of the tabular display module 426 and the graphical display module 428, the architecture navigation module 436 may be configured to display, by way of the user interface module 402, a user interface 110 including a feature block diagram illustrating the power supply architecture 305 of the selected design. For example, the schematic determination module 414 may determine an electrical schematic where each position in power supply design 125 into which a power supply component 205 and supporting components are included is represented as a feature block.

Further, the architecture navigation module 436 may be configured to receive selections of the feature blocks in the diagram, and display particular attributes for the selected feature block. The architecture navigation module 436 may further be configured to display charts and graphs depicting the relative contribution of each power supply component 205 to the power supply design 125 according to various key parameters, such as power dissipation, BOM cost, footprint, and component count.

The report module 438 may be configured to create a report summarizing the attributes of one or more designs. For example, the report module 438 may be utilized by a user to view a report summarizing the attributes of a selected design from the set of power supply designs 125. The report may include system level attributes such as a feature block diagram, system efficiency, system BOM cost, and system component cost. The report may further include specific information about the input voltage sources 115 including the input voltage range. In addition, the report may include information about each specific power supply from the set of power supply designs 125, including the corresponding schematic, BOM, and associated component information including electrical characteristics such as inductance, DC resistance, current rating, voltage rating, etc. Other information about each power supply may be included as well, such as operating values including duty cycle, efficiency, BOM cost, BOM footprint, currents through components, and power dissipation for components. The operating values may be included in a table or as plots of the operating value vs. other facts such as load 120 current for different voltages. The report may also contain simulation results, such as from the electrical simulation module 418 and/or thermal simulation module 420, which may be represented in numeric form, tabular form such as via tabular display module 426, and/or graphical form such as via graphical display module 428. Reports generated by the report module 438 may be provided in various formats, such as the portable document format (PDF).

Figure 5:
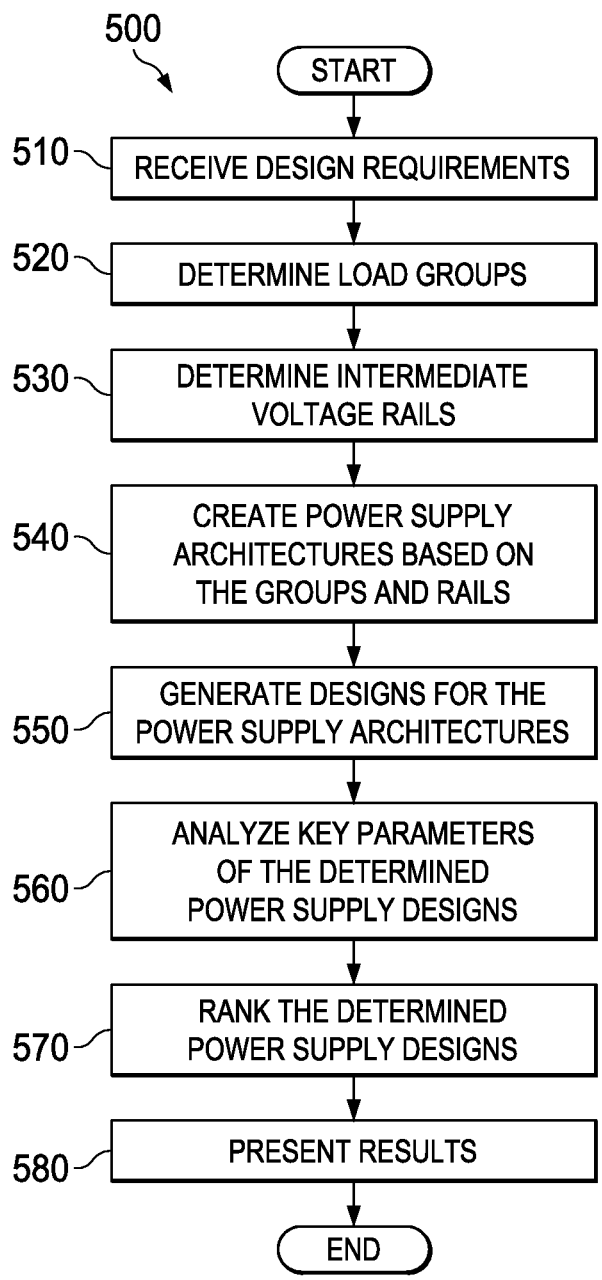
FIG. 5 illustrates an exemplary process flow for determining a power supply for multiple loads.

FIG. 5 illustrates an exemplary process flow 500 for determining a power supply for multiple loads 210. The process 500 may be performed by various systems, such as the by the system 100 described above with respect to FIG. 1.

In block 510, a power supply design tool application 160 receives design requirements 130 from a user device 105. For example, a communications network 135 may be in selective communication with a user device 105 and an application site 140. The application site 140 may serve as a hosting platform for an application server 155 running the power supply design tool application 160. A user interface module 402 and a requirements module 404 of the power supply design tool application 160 may be configured to provide a user interface 110 to a user device 105, such as a web page, where the user interface 110 may allow the user of the user device 105 to specify the design requirements 130 for a power supply design 125. The design requirements 130 may include information regarding a set of multiple loads 120 to be powered by one or more input voltage sources 115.

In block 520, the power supply design tool application 160 groups the set of multiple loads 120 into one or more load groups 210 having corresponding load requirements 215. For example, based on the loads 120 specified by the design requirements 130, the power supply architecture design tool application 160 may utilize an architecture determination module 406 to selectively group loads 120 sharing a common voltage into load groups 210.

In some instances, the design requirements 130 may specify that a load 120 requires a unique supply, in which case that load 120 would not be grouped with other loads 120 into a load group 210. Additionally, the one or more design heuristics 165 of the system 100 may specify a threshold current value above which it would be less likely to find a suitable power supply component 205 for a power supply design 125. Accordingly, if a load group 210 results in a sum of the load 120 currents being above the threshold value, the architecture determination module 406 may break the loads 120 down into two or more load groups 210, each with a smaller total current, to allow for a greater number of possible power supply components 205 to be available to provide power to the load groups 210.

The power supply architecture design tool application 160 may determine a load requirement 215 for a load group 210 according to the common voltage of the load group 210 and a sum of the currents of each load 120 of the load group 210.

In block 530, the power supply design tool application 160 determines intermediate rail voltages 220. For example, the power supply architecture design tool application 160 may determine one or more potential intermediate rail voltages 220 according to one or more design heuristics 165. An example of a design heuristics 165 that may be utilized by the power supply design tool application 160 to calculate intermediate rail voltage 220 may be to determine potential intermediate rail voltages 220 according to the duty cycle of downstream regulators, targeting low, medium, and high duty cycle for the downstream supplies. Another example of a design heuristic 165 that may be utilized by the power supply architecture design tool application 160 to calculate intermediate rail voltage 220 may be to determine potential intermediate rail voltages 220 according different percentages of the difference between the input voltage source 115 and the loads 120 or load requirements 215.

In block 540, the power supply design tool application 160 determines power supply architectures 305 that may be used to satisfy the received design requirements 130. The architecture determination module 406 may generate various power supply architectures 305 by utilizing various combinations of the intermediate rail voltages 220. Using one of the combinations of zero or more intermediate rail voltages 220, the architecture determination module 406 may start at each load 120, or load group 210, and may sum up the currents or use the summed current from a corresponding load requirement 215. Then for each load 120 or group of loads 120, the architecture determination module 406 may determine to use the voltage of an intermediate rail voltage 220, if it exists, whose voltage is above that of a particular load 120. If no intermediate rail voltage 220 is present, then the architecture determination module 406 may utilize the input voltage source 115 as the input voltage for the supply for the load 120. In some instances, architecture determination module 406 may further determine whether or not to use the voltage of an intermediate rail voltage 220 if it can support the total current required and/or if the total required current is below a threshold value. Thus, the architecture determination module 406 may determine a power supply architecture 305 for the combination of zero or more intermediate rail voltages 220. For each position in the determined power supply architecture 305, the architecture determination module 406 may further determine a load requirement 215 (e.g., voltage and current) for power supply components 205 that may fill the position.

The architecture determination module 406 may determine a plurality of potential power supply architectures 305 according to different combinations of input voltage sources 115 and intermediate rail voltages 220 with the loads 120 specified by the design requirements 130. FIG. 3 illustrates an exemplary plurality of potential power supply architectures 305 for a set of load requirement 215. Each of the determined power supply architectures 305 may accordingly include one or more positions at which a power supply component 205 may be required. In some instances, a design heuristic 165 indicates a maximum number of power supply architectures 305 to be determined by the architecture determination module 406.

In block 550, the power supply design tool application 160 generates power supply designs 125 for the determined power supply architectures 305. For example, the power supply design tool application 160 may utilize a component determination module 408, a circuit design module 410, and a circuit optimization module 412 to determine one or more power supply components 205 and supporting components that could be used to build circuits for a given power architecture 305, optimized according to the design goals indicated in the design requirements 130.

For each of the potential power supply architectures 305 determined by the architecture determination module 406, the component determination module 408 may determine power supply components 205 to provide power to one or more loads 120, load groups 210, and/or intermediate rail voltages 220. The circuit design module 410 may utilize design heuristics 165 and including various rules and mathematical formulas to select adequate values for the additional components. For example, the circuit optimization module 412 may determine supporting components that satisfy the range of potential values determined by the circuit design module 410, while also accounting for design preferences indicated in the design requirements 130 through use of optimization heuristics 170. These optimizations and design preferences may accordingly guide the determination of some or even all of the components 205 and supporting components of the power supply designs 125.

In block 560, the power supply design tool application 160 performs analysis of key parameters of the determined power supply designs 125. For example, the power supply design tool application 160 may utilize a schematic determination module 414 to produce an electrical schematic diagram, and a board layout module 416 to create a PCB layout according to the determined schematic. The power supply design tool application 160 may utilize an electrical simulation module 418 to determine an electrical efficiency of an electrical schematic, and a thermal simulation module 420 to simulate the thermal behavior of the PCB layout. The power supply design tool application 160 may also utilize a bill of materials module 422 to determine a BOM including the list of parts used and the total part count for each of the power supply designs 125.

In block 570, the power supply design tool application 160 ranks the determined power supply designs 125 based on the design goals indicated in the design requirements 130. For example, the power supply design tool application 160 may utilize a best results determination module 424 to determine one or more best results from a set of power supply designs 125. The best results determination module 424 may determine a ranking of the individual designs in the set of power supply designs 125. The best results determination module 424 may further determine an overall best design, and/or one or more recommended designs. Additionally, for each of the determined power supply architectures 305, the best results determination module 424 may determine the best design out of the power supply designs 125 for each power supply architecture 305.

In block 580, the power supply design tool application 160 presents the power supply designs 125 to the user. For example, the power supply design tool application 160 may send the power supply designs to the user device 105 that form the universe of possible solutions for the design requirements 130. The user device 105 may utilize a tabular display module 426 to display a table of the power supply designs 125 and key parameters, with each row in the table indicating a particular power supply design 125 and associated values. The power supply design tool application 160 may also utilize a graphical display module 428 to provide a graph of the determined power supply designs 125 representing tradeoffs between the various power supply designs 125 according to key parameters. In some examples, the power supply design tool application 160 presents only the best power supply design 125 for each determined power supply architecture 305. The power supply design tool application 160 may further indicate which power supply design 125 out of the presented power supply designs 125 is determined to be the best design. Because the universe of possible power supply designs 125 has already been computed by the power supply design tool application 160, the user device 105 may perform filtering of the determined power supply designs 125 displayed by the tabular display module 426 and graphical display module 428 without additional access or interaction with the data store 145. After block 580, the process 500 ends.

Figure 6:
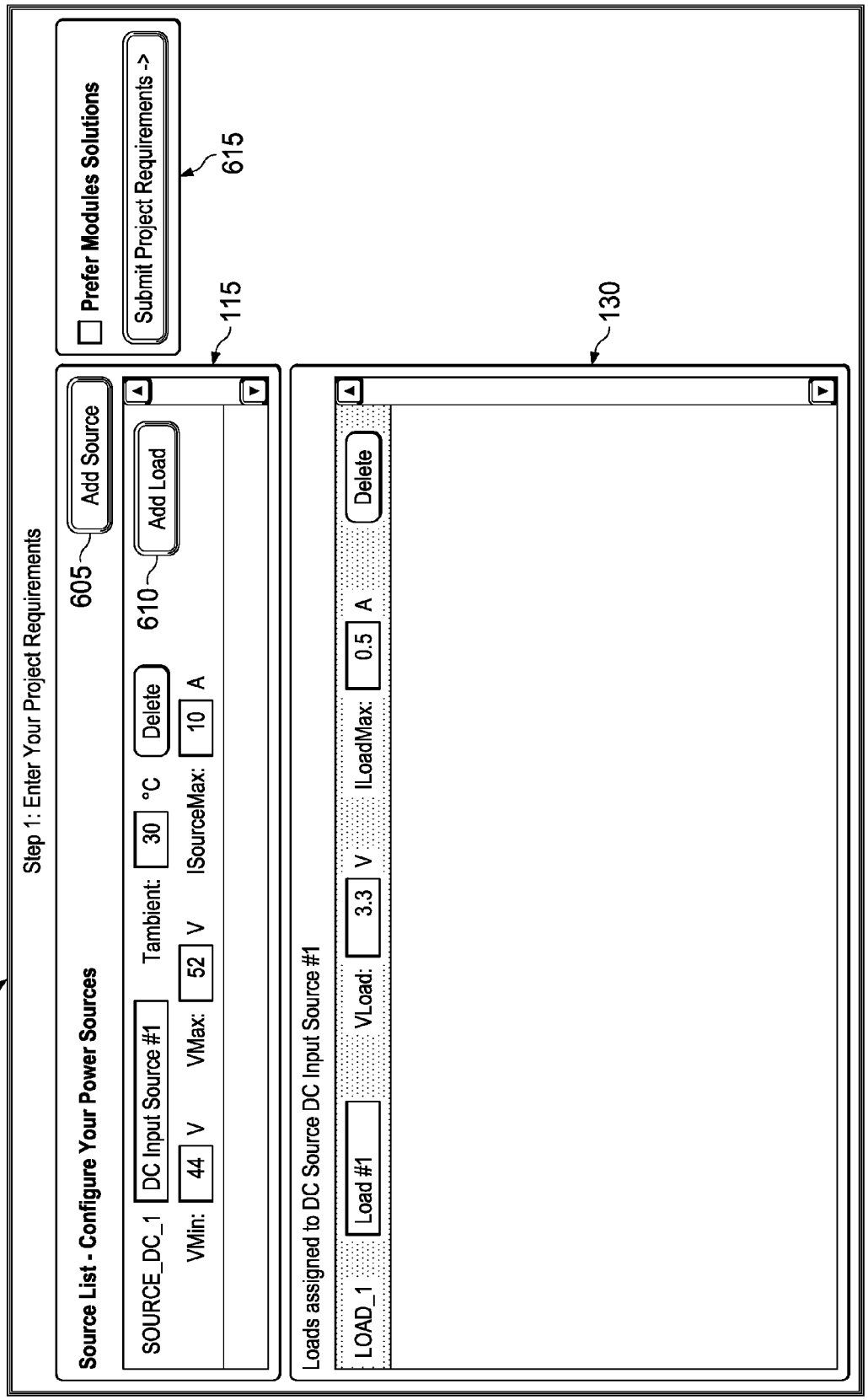
FIG. 6 illustrates an exemplary user interface for the input of design requirements.

FIG. 6 illustrates an exemplary user interface 110-A for the input of design requirements 130. For example, the user interface 110-A may be generated by a user interface module 402 of a power supply design tool application 160, and may allow for a user of a user device 105 to input design requirements 130. As shown, the user interface 110-A may provide for the input of one or more input voltage sources 115, and a plurality of loads 120 assigned to the corresponding input voltage sources 115 by way of an add source control 605, an add load control 610, and a submit project requirements control 615.

The user may utilize an add source control 605 to add an input voltage source 115 to the design requirements 130. Each input voltage source 115 added to the design requirements 130 may allow for the specification of a name, an ambient temperature, a minimum voltage, and a maximum voltage.

The user may further utilize an add load control 610 to add an additional load 120 to the design requirement 130. Each load 120 added to the design requirements 130 may allow for the specification of a name, a voltage for the load 120, a maximum current for the load 120, an optional percentage maximum for voltage ripple, optional filtration, an indication that a particular load 120 requires a separate supply for use in grouping the loads 120, and a number of milliseconds of soft start time.

Once the user has completed specification of the design requirements 130, the user may select the submit project requirements control 615. Upon selection of the submit project requirements control 615, the power supply design tool application 160 may determine a set of generated power supply designs 125 according to the design requirements 130.

Figure 7:
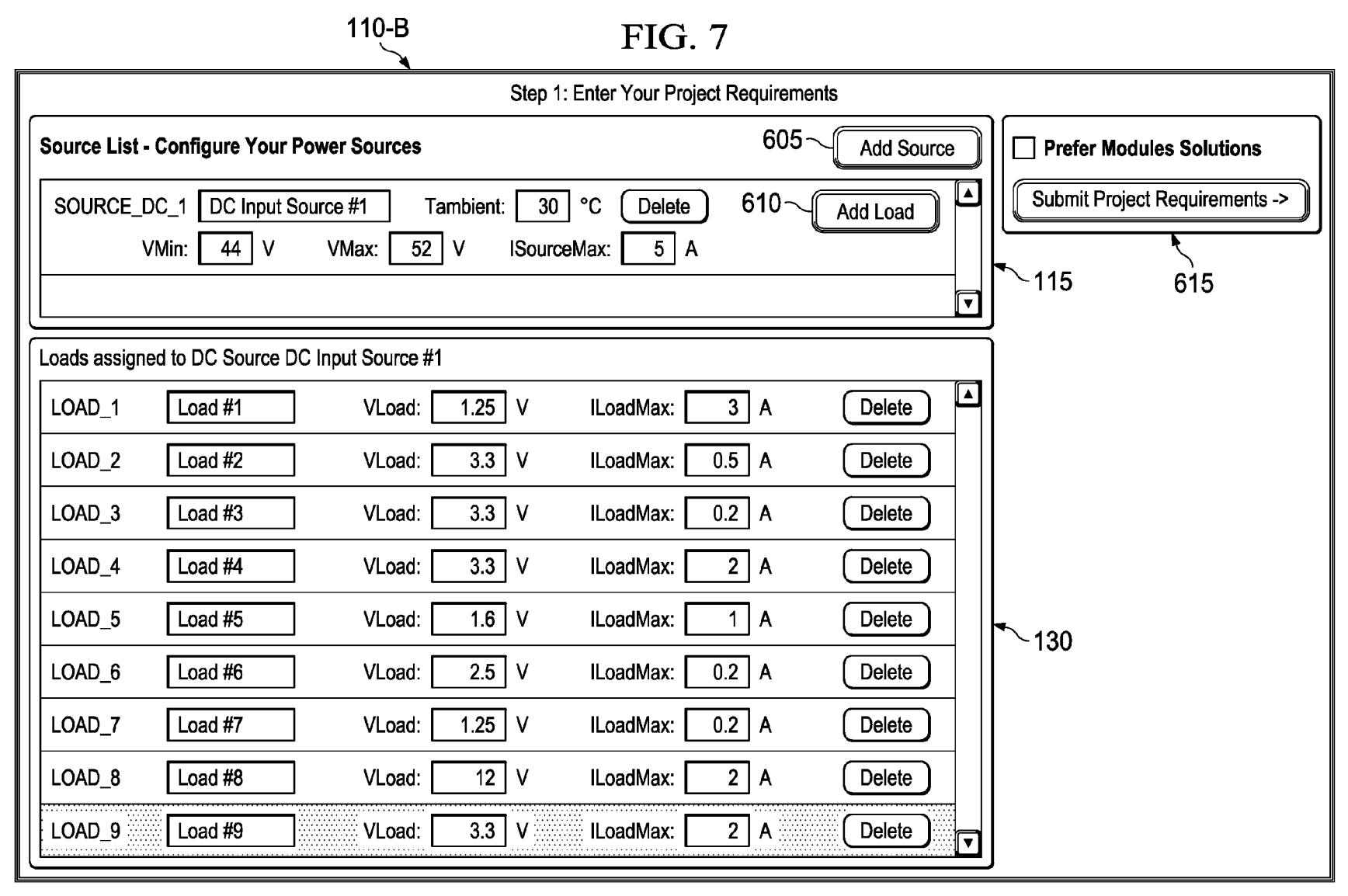

FIG. 7 illustrates an exemplary user interface 110-B for the input of design requirements 130, illustrating the inclusion of multiple loads 120 into the design requirements 130. As shown in user interface 110-B, the set of loads 120 from user interface 110-C are added to the design requirements 130. If additional loads 120 or input voltage sources 115 are required, then the user interface 110-B may allow for their inclusion by way of an add source control 605 and/or an add load control 610 as discussed about with respect to user interface 110-A in FIG. 6. Once the user has completed specification of the design requirements 130, the user may select the submit project requirements control 615.

Figure 8:
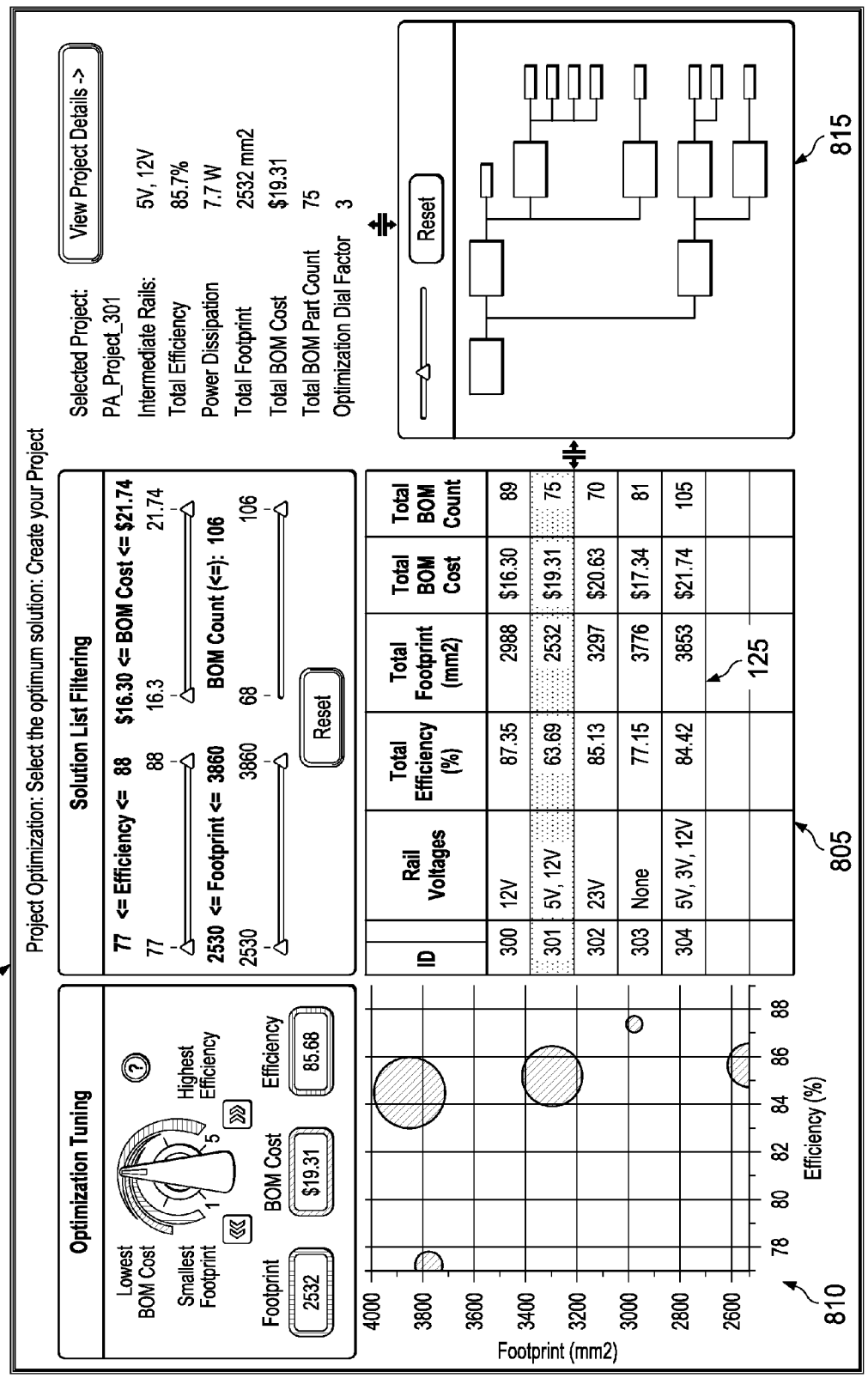
FIG. 8 illustrates an exemplary user interface illustrating a set of generated power supply designs.

FIG. 8 illustrates an exemplary user interface 110-C illustrating a set of generated power supply designs 125. As shown in the user interface 110-C, five power supply designs 125 are included in a tabular list 805 and a graphical display 810 of the power supply designs 125. The tabular list 805 may be created by a tabular display module 426 of the power supply design tool application 160, and the graphical display 810 may be created by a graphical display module 428 of the power supply design tool application 160. The user interface 110-C further includes a schematic diagram 815 that may be created by a schematic determination module 414 illustrating a selected power supply design 125.

Notably, rather than displaying fifty or more power supply designs 125 for each of the determined power supply architectures 305, the tabular list 805 instead may display a best design for each of the different determined power supply architectures 305. For example, the exemplary tabular list 805 as shown includes a best design for power supply architectures 305 having a 12V intermediate rail voltage 220, a best design for power supply architectures 305 having both 5V and 12V intermediate rail voltages 220, a best design for power supply architectures 305 having a 5V intermediate rail voltage 220, a best design for power supply architectures 305 having a 23V intermediate rail voltage 220, and a best design for power supply architectures 305 having no intermediate rail voltages 220. The tabular list 805 may further include values for key parameters of the power supply designs 125 such as efficiency, footprint, BOM cost, and BOM count.

These details of the power supply designs 125 may further be displayed graphically in the graphical display 810. For example, in the graphical display 810 the X-axis may represent system efficiency, and the Y-axis may represent system footprint. The circle size in the graphical display 810 may indicate system BOM cost, where a larger circle represents a larger cost, and a smaller circle represents a smaller cost. The axis and the circles may be reconfigured to display different key parameters as well. For example, any of the X-axis, the Y-axis, and the circle size may be reconfigured to represent any of total efficiency, power dissipation, total footprint, total bill of materials cost, total component count, among others key parameters.

Further details of a selected one of the power supply designs 125 may also be illustrated in the user interface 110-C, including by way of the schematic diagram 815 of the selected power supply design 125 that may be created by a schematic determination module 414, as well as other key parameters of the selected power supply design 125, such as the intermediate rail voltages 220, total efficiency, power dissipation, total footprint, total bill of materials cost, total component count, and an optimization factor relating to the optimizations used to determine the selected power supply design 125.

Figure 9:
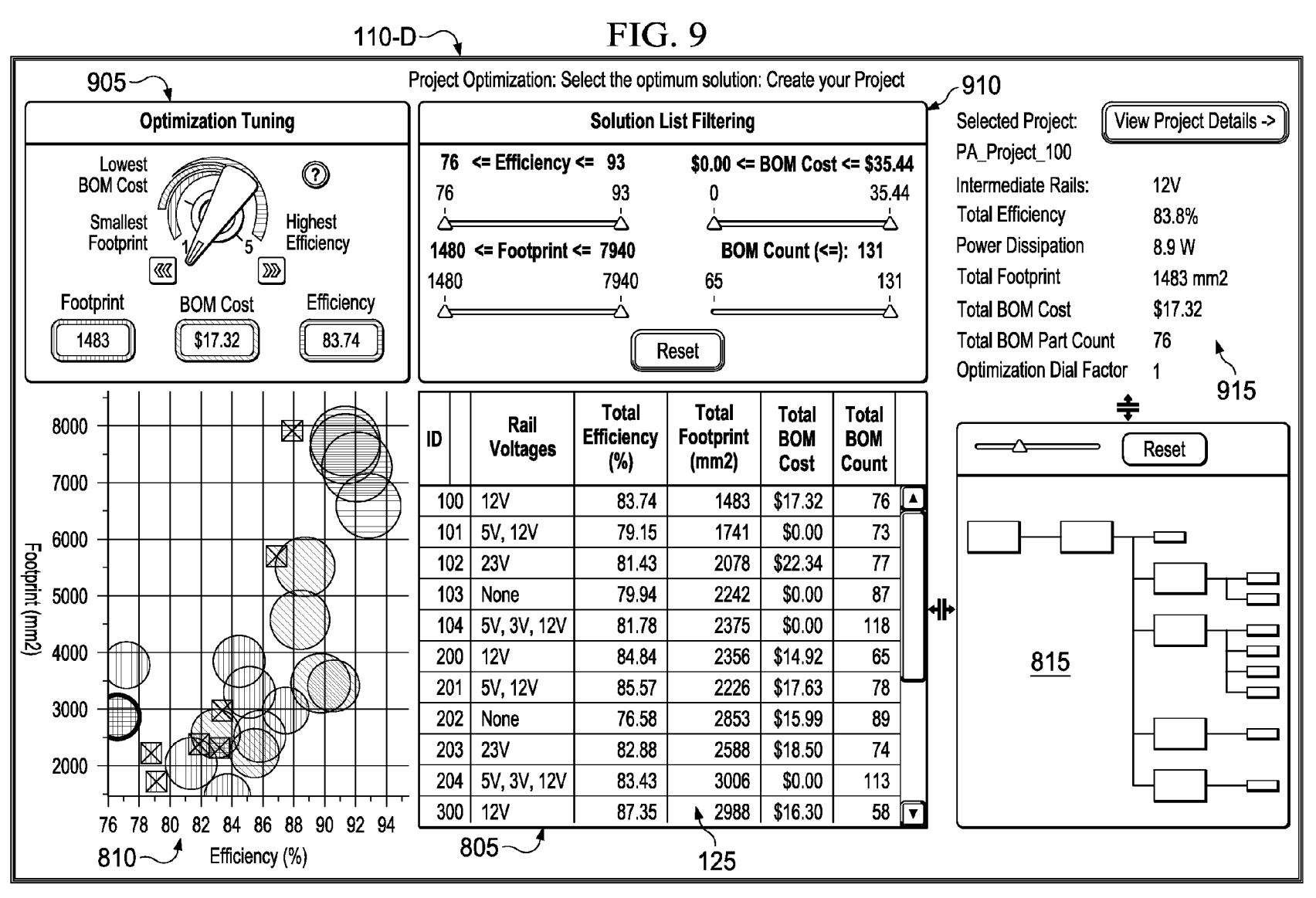

FIG. 9 illustrates an exemplary user interface 110-D illustrating additional generated power supply designs 125. These additional power supply designs 125 may be added by submitting additional design requirements 130 configured to optimize the power supply designs 125 for different values of key parameters. For example, additional power supply designs 125 may be generated upon selection of a different optimization setting from an optimization tuning dial 905 provided by an optimization control module 432 of the power supply architecture design tool application 160. As shown in user interface 110-D, the additional power supply designs 125 may be added to the tabular list 805 and graphical display 810. Notably, the existing recommended designs optimized for previous design requirements 130 are retained in the displayed power supply designs 125. This allows for the comparison of the best power supply designs 125 optimized according to different optimization settings.

It should be noted that in other examples, the power supply design tool application 160 may be configured to pre-calculate power supply designs 125 optimized according to each of the potential system level goals or sets of optimizations settings indicated by the user. Then, based on the input from the control, the optimization control module 432 may be configured to cause the power supply design tool application 160 to filter the displayed power supply designs 125 according to the particular optimization settings chosen by the user by way of the optimization control module 432.

The user interface 110-D may also allow for the filtering of the set of power supply designs 125 illustrated in the tabular list 805 and graphical display 810 by way of filtering controls 910. The filtering may be performed by a design list filter module 430 of the power supply design tool application 160, and may allow for filtering of the power supply designs 125 by the user device 105 according to parameters such as minimum and maximum efficiency, minimum and maximum footprint, minimum and maximum BOM cost, and minimum and maximum BOM count. Because the filtering is performed based on the determined set of power supply designs 125 that form the universe of possible solutions, filtering of the power supply designs 125 may be performed by the user device 105 without requiring any additional database access or interaction with the data store 145.

Further details of a selected power supply design 125 may be illustrated upon selection of a project details control 915 of the user interface 110-D.

Figure 10:
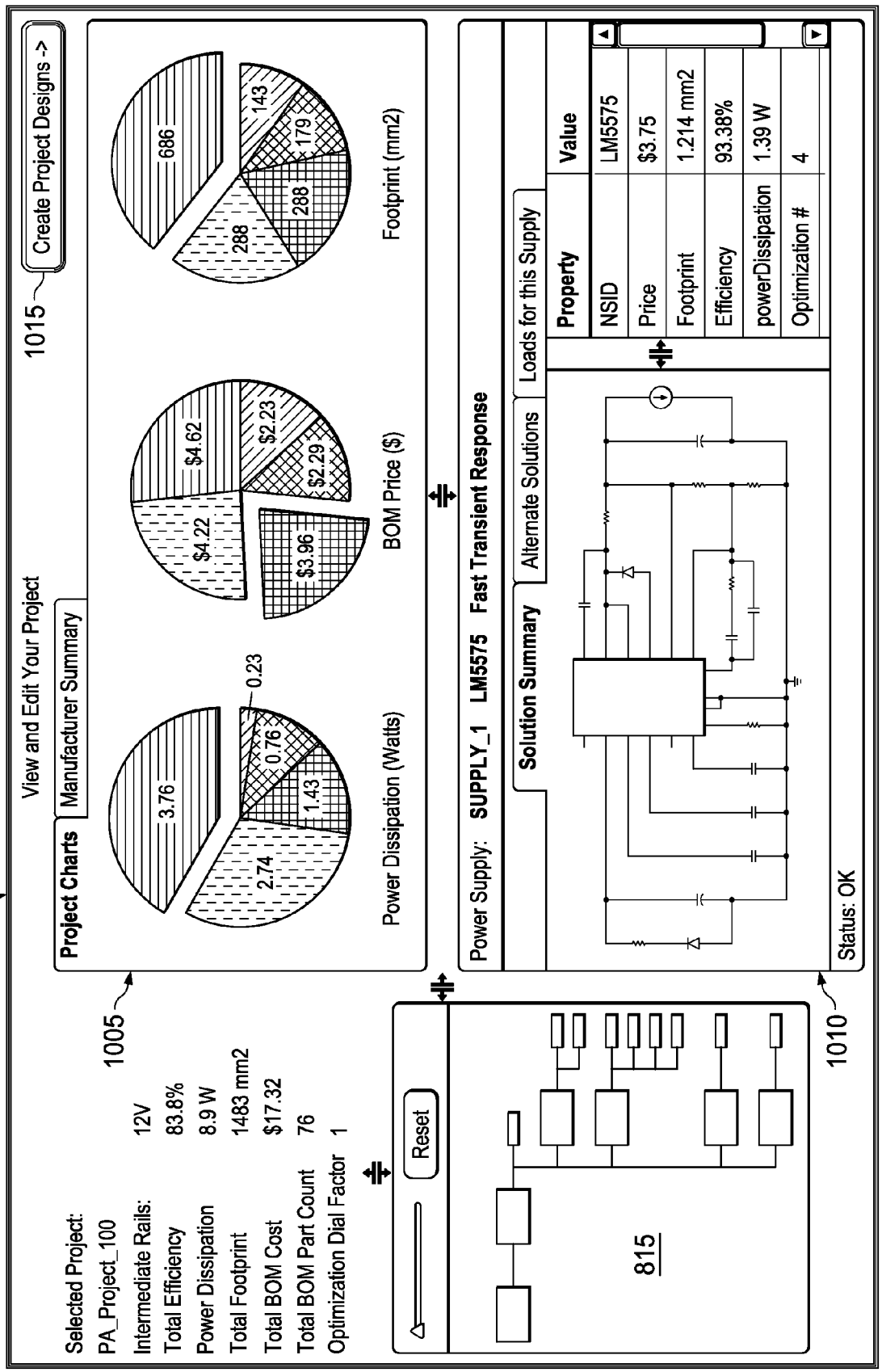
FIG. 10 illustrates an exemplary user interface illustrating exemplary project details for one of the power supply designs, including project charts related to key parameters of the one power supply design.

FIG. 10 illustrates an exemplary user interface 110-E illustrating such further details for one of the power supply designs 125, including project charts 1005 related to key parameters of the one power supply design 125. As shown in user interface 110-E, the power supply design tool application 160 may include a schematic diagram 815 of the selected power supply design 125, project charts 1005 relating to the selected power supply design 125, and solution information 1010 relating to the selected power supply design 125. These controls may allow for visualization of aspects of the selected power supply design 125, including the relative contributions of component supplies to the total values of various key parameters.

The schematic diagram 815 may display of the selected power supply design 125 with each power supply component 205 or functional block of the schematic indicated in a different color or other visual identification.

The user interface 110-E may further include project charts 1005 determined by the architecture navigation module 436 that graphically represent the relative contribution of each feature block to the whole power supply design 125. For example, the project charts 1005 may represent the relative contributions of each feature block according to key parameters, such as power dissipation, BOM cost, and footprint. Through use of the project charts 1005, a user may determine the relative contributions of each power supply design 125 according to the key parameters.

The user may further determine whether one of the supplies in the power supply design 125 is making too large of a contribution and may take corrective action. For example, if one power supply component 205 is responsible for most of the footprint, the user may select another power supply component 205 with a smaller footprint, if one is available. For example, an alternate solutions tab of the solution information 1010 may allow the user to choose another power supply component 205.

Upon selection of a create project details control 1015, the power supply design 125 may be input into a circuit design tool for further analysis, such as the WEBENCH Power Designer provided by National Semiconductor.

Figure 11:
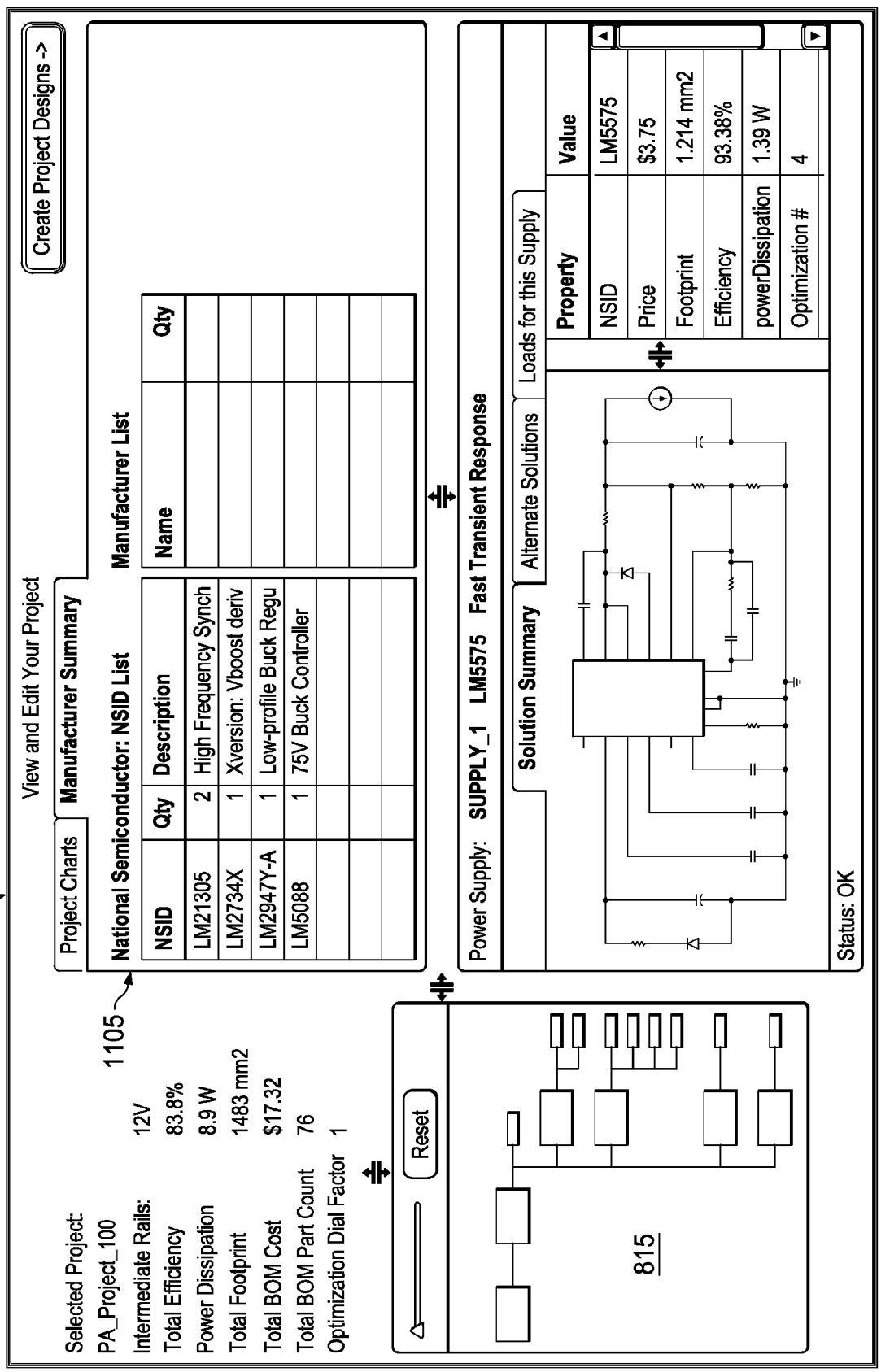
FIG. 11 illustrates an exemplary user interface illustrating an exemplary manufacturer summary of the parts utilized for one of the power supply designs.

FIG. 11 illustrates an exemplary user interface 110-F illustrating a manufacturer summary of the parts utilized for one of the power supply designs 125. As shown in the user interface 110-F, a manufacturer summary control 1105 may include a listing of the power supply components 205 of the selected power supply design 125 by identifier, quantity, and description, as well as by manufacturer name and quantity from the corresponding manufacturer.

Figure 12A:
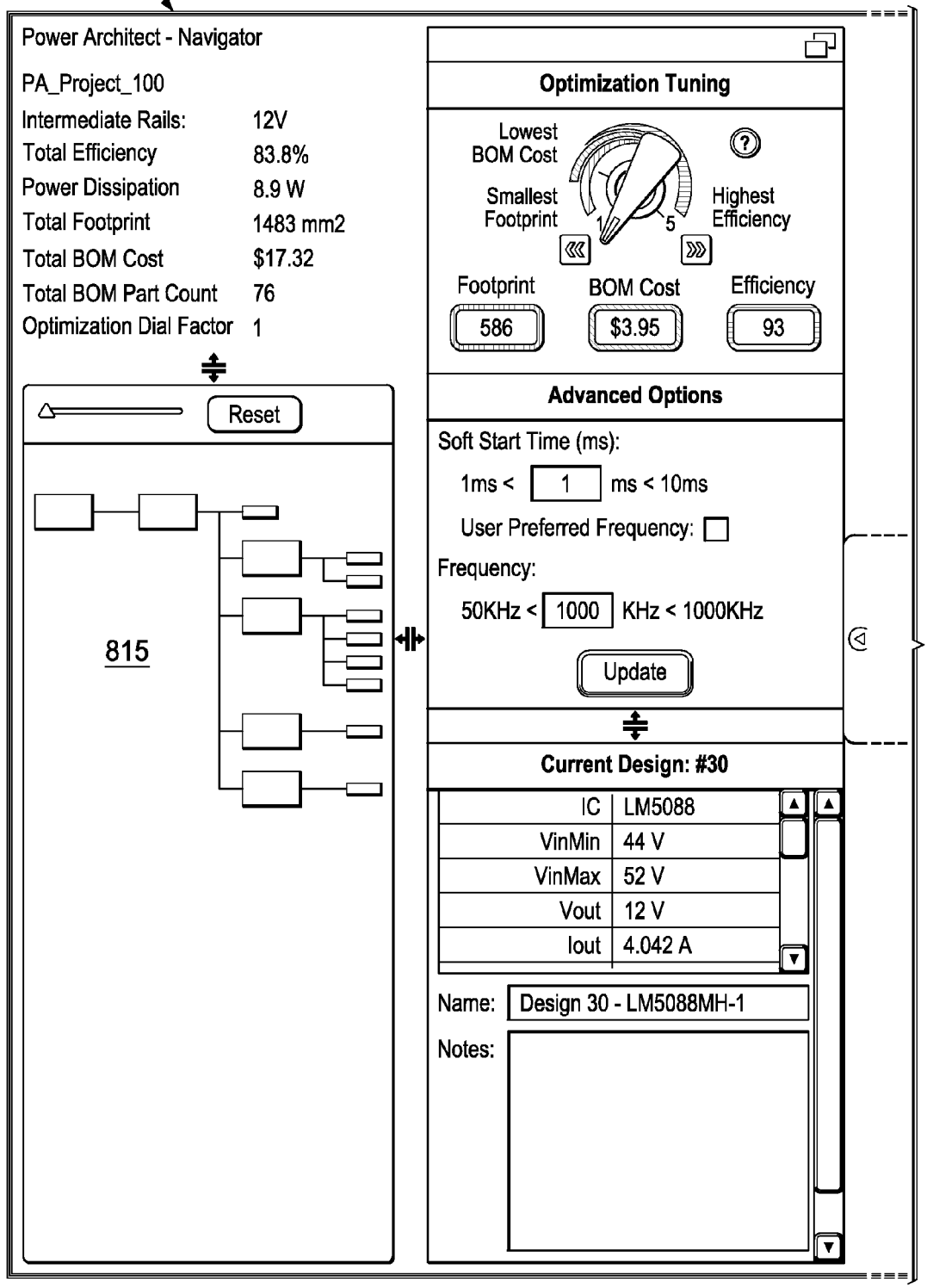
FIG. 12 illustrates an exemplary user interface illustrating a summary of information related to one of the power supply designs.

FIG. 12 illustrates an exemplary user interface 110-G illustrating a summary of information related to one of the power supply designs 125. As shown in the user interface 110-G the designed power supply design 125 has been input into the WEBENCH Power Designer circuit design tool provided by National Semiconductor for further design, review, and purchase. Accordingly, the power supply design tool application 160 may be utilized to allow for the generation of a power supply design 125 in accordance with the design requirements 130 of the user.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
   a database configured to store information including characteristics of a plurality of components; and
   a server in communication with the database and configured to:
   receive design parameters indicative of a plurality of power supply loads to be powered;
   determine a plurality of power supply architectures that may be used to provide power supply solutions satisfying the plurality of loads, each power supply architecture including at least one position requiring a component configured to satisfy a load requirement;
   for each one of at least a subset of the plurality of power supply architectures, determine, based on the characteristics of the plurality of components, at least one component configured to satisfy the corresponding load requirement for each position of the one of the power supply architectures; and
   generate at least one power supply design in accordance with the power supply architectures and the determined components.

2. The system of claim 1, wherein each component configured to satisfy a load requirement includes a power supply switcher component.

3. The system of claim 1, wherein the server is further configured to:
  group a plurality of power supply loads into a load group according to a common voltage shared by each power supply load in the load group; and
  sum the current for the load group to determine a total current for the load group.

4. The system of claim 3, wherein the server is further configured to determine a load requirement for the load group including the summed current and the common voltage.

5. The system of claim 3, wherein the server is further configured to:
  determine whether the design requirements specify that a load requires a unique supply; and
  prevent the load requiring a unique supply from being grouped with other loads.

6. The system of claim 3, wherein the server is further configured to:
  determine whether the summed current for the load group is above a threshold value; and
  if so, break the load group into at a plurality of load subgroups, each load subgroup having a total current not exceeding the threshold value.

7. The system of claim 1, wherein the server is further configured to:
  receive design parameters indicative of at least one input voltage source; and
  determine the plurality of power supply architectures further based on the at least one input voltage source.

8. The system of claim 1, further comprising a user device in communication with the server and configured to send a request to the server including the design parameters; wherein the server is further configured to send the generated at least one power supply design to the user device responsive to the request.

9. The system of claim 8, wherein the user device is further configured to:
  receive filter criteria; and
  filter the generated at least one power supply design according to the filter criteria, without additional access or interaction with the database.

10. The system of claim 1, wherein the server is further configured to optimize the generated at least one power supply design in accordance with at least one design parameter indicative of a design optimization.

11. The system of claim 10, wherein the at least one design parameter indicative of a design optimization indicates to optimize for at least one of power supply efficiency, footprint size, and component cost.

12. The system of claim 10, wherein the server is further configured to optimize the generated at least one power supply design to give preferred treatment to at least one component unrelated to its electrical or physical characteristics.

13. The system of claim 11, wherein the server is further configured to:
  receive an additional design parameter indicative of a second design optimization; and
  for each one of at least the subset of the plurality of power supply architectures, generate at least one additional design in accordance with the each one of power supply architectures accounting for the additional design optimization.

14. The system of claim 1, wherein the server is further configured to:
  receive a design parameter indicative of a design optimization; and
  filter the displayed power supply designs according to the design optimization, without additional access or interaction with the database.

15. The system of claim 1, wherein the server is further configured to determine at least one recommended power supply design based on evaluation of the at least one power supply design against the design parameters.

16. The system of claim 1, wherein the server is further configured to determine the plurality of power supply architectures by calculating intermediate rail voltages.

17. The system of claim 16, wherein server is further configured to calculate intermediate rail voltages by a heuristic configured to at least one of:
  calculate the intermediate rail voltages based on the duty cycle of downstream regulator targeting low, medium, and high duty cycle for the downstream supplies; and
  utilize at least one predefined percentage of voltage difference between an input voltage specified by the design requirements and a voltage specified for one of the plurality of power loads.

18. The system of claim 16, wherein the server is further configured to:
  create a combination including at least one intermediate rail voltage; and
  determine to use one of the at least one intermediate rail voltage to power an input voltage of a load if the one of the at least one of the intermediate rail voltage is of a voltage above that of the input voltage of the load.

19. A method, comprising:
  receiving, at a computing device including a design tool application, design parameters indicative of a plurality of power supply loads to be powered;
  grouping the plurality of power supply loads into load groups based at least in part on the design parameters;
  determining intermediate rail voltages based at least in part on the design parameters;
  determining, by the design tool application, a plurality of power supply architectures that may be used to provide power supply solutions satisfying the plurality of loads based on the load groups and intermediate rail voltages, each power supply architecture including at least one position requiring a component configured to satisfy a load requirement; and
  for each one of at least a subset of the plurality of power supply architectures, determining, based on the characteristics of the plurality of components, at least one component satisfying the corresponding load requirement for each position of the one of the power supply architectures; and
  generating at least one power supply design in accordance with the power supply architectures and the determined components.

20. The method of claim 19, further comprising:
  summing the current for each load in a load group to determine a total current for the load group; and
  determining a load requirement for the load group including the summed current at the grouped voltage.

21. The method of claim 19, further comprising optimizing the generated at least one design in accordance with at least one design parameter indicating a design optimization.

22. The method of claim 19, further comprising:
  calculating power supply designs optimized according to each of a plurality of design optimizations that may be indicated by the user; and
  filtering the displayed power supply designs in accordance with at least one design parameter indicating a design optimization.

23. The method of claim 22, further comprising, for one of the at least a subset of the plurality of power supply architectures:
  calculating a first power supply design optimized according to a first one of the plurality of design optimizations that may be indicated by the user; and
  calculating a second power supply design optimized according to a second one of the plurality of design optimizations that may be indicated by the user.

24. The method of claim 19, further comprising optimizing the generated at least one power supply design in accordance with at least one design parameter indicating a design optimization.

25. The method of claim 19, further comprising:
  receiving an additional design parameter indicating a design optimization; and
  for each one of at least the subset of the plurality of power supply architectures, generating at least one additional power supply design in accordance with the each one of power supply architectures accounting for the additional design optimization.

26. The method of claim 19, further comprising determining at least one recommended power supply solution based on evaluation of the power supply architectures against the design parameters.

27. The method of claim 19, further comprising ranking the generated at least one power supply design in accordance with at least one design parameter indicating a design optimization.

28. The method of claim 27, further comprising displaying the generated at least one power supply design ranked according to the generated ranking.

29. The method of claim 19, further comprising:
  calculating intermediate rail voltages capable of being used by power supply architectures; and
  determining the plurality of power supply architectures by utilizing different combinations of at least a subset of the intermediate rail voltages.

30. The method of claim 19, further comprising calculating intermediate rail voltages by at least one of:
  calculating the intermediate rail voltages based on the duty cycle of downstream regulator targeting low, medium, and high duty cycle for the downstream supplies; and
  utilizing at least one predefined percentage of voltage difference between an input voltage specified by the design requirements and a voltage specified for one of the plurality of power loads.

31. A computer-readable medium tangibly embodying computer-executable instructions configured to cause a computing device to:
  receive information relating to a plurality of loads to be powered by a power supply;
  group the plurality of power supply loads into load groups based at least in part on the design parameters;
  determine intermediate rail voltages based at least in part on the design parameters;
  determine a plurality of power supply architectures that may be used to provide power supply solutions satisfying the plurality of loads based on the load groups and intermediate rail voltages, each power supply architecture including at least one position requiring a component configured to satisfy a load requirement;
  for each one of at least a subset of the plurality of power supply architectures, determine, based on the characteristics of the plurality of components, at least one component configured to satisfy the corresponding load requirement for each position of the one of the power supply architectures; and
  generate at least one power supply design in accordance with the power supply architectures and the determined components.

32. The computer-readable medium of claim 31, further comprising instructions configured to cause the computing device to:
  generate a requirements web site configured to receive the design parameters; and
  send the requirements web site to a user device.

33. The computer-readable medium of claim 31, further comprising instructions configured to cause the computing device to:
  generate a results web site configured to cause a user device to display the generated at least one design in accordance with the plurality of power design parameters; and
  send the results web site to the user device.

* * * * *